US009734440B2

(12) United States Patent
Bogart

(10) Patent No.: US 9,734,440 B2
(45) Date of Patent: *Aug. 15, 2017

(54) RASTER IMAGE PROCESSOR WITH PRINTHEAD PROFILE COMPENSATION FOR A MULTI LEVEL DIGITAL PRINTING MACHINE

(71) Applicant: Mitchell J. Bogart, Sharon, MA (US)

(72) Inventor: Mitchell J. Bogart, Sharon, MA (US)

(73) Assignee: Rampage LLC, Sharon, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/700,141

(22) Filed: Apr. 30, 2015

(65) Prior Publication Data

US 2016/0125278 A1 May 5, 2016
US 2017/0169317 A9 Jun. 15, 2017

Related U.S. Application Data

(63) Continuation-in-part of application No. 14/534,587, filed on Nov. 6, 2014, now Pat. No. 9,053,410.
(Continued)

(51) Int. Cl.
*G06K 15/00* (2006.01)
*H04N 1/405* (2006.01)
*G06K 15/02* (2006.01)

(52) U.S. Cl.
CPC ....... *G06K 15/1881* (2013.01); *H04N 1/4057* (2013.01)

(58) Field of Classification Search
None
See application file for complete search history.

(56) References Cited

U.S. PATENT DOCUMENTS 5,291,311 A 3/1994 Miller
5,696,612 A 12/1997 Thornton
(Continued)

FOREIGN PATENT DOCUMENTS

EP 0483132 8/1997
EP 2303583 5/2012
(Continued)

OTHER PUBLICATIONS

Kartheek Chandu, et. al., Direct Multi-Bit Search (DMS) Screen Algorithm, IEEE International Conference on Image Processing, 2012, pp. 817-820, IEEE, US.
Barry Trager et. al., A GPU Based Implementation of Direct Multi-Bit Search (DMS) Screen Algorithm, Electronic Imaging, 2013, vol. 8655, pp. 86550Z-1 to 86550Z-10, SPIE-IS&T.
Global Graphics Software Ltd, Multilevel Screening, Web Site, www.globalgraphics.com/technology/screening/multi-level, Global Graphics Software Ltd., Date Unknown, United Kingdom.
(Continued)

*Primary Examiner* — Vincent Rudolph
*Assistant Examiner* — Michael Burleson
(74) *Attorney, Agent, or Firm* — Steven N. Fox, Esq.

(57) ABSTRACT

System and method of calibration, screening, and compensation for multiple gray-level digital presses. Unequal quantization of the input range is employed with compensated overlapping of sub-ranges. Multiple instances of bi-level screening algorithms, tone modification functions, and a recombination algorithm are employed to produce calibrated screening on individual tone ranges. The method works with any bi-level screening algorithm and devices with any number of gray-levels. Quality imaging results from high detail, high tonal accuracy, low screening noise, and lack of printed artifacts. Dynamic re-calibration is facilitated. The elimination of the constraint of evenly spaced gray-levels has advantages of cost and yield for print head fabricators and digital press manufacturers. Multiple implementations are given for hardware and software embodiments. The present invention, which comprises a print profile for each colorant, is extended to comprise additional print profiles, as
(Continued)

needed, specifying the print characteristic of a single or group of aberrant nozzles.

24 Claims, 62 Drawing Sheets

Related U.S. Application Data

(60) Provisional application No. 62/067,790, filed on Oct. 23, 2014, provisional application No. 61/993,976, filed on May 15, 2014, provisional application No. 61/932,848, filed on Jan. 29, 2014.

(56) References Cited

U.S. PATENT DOCUMENTS

| | | | |
|---|---|---|---|
| 5,847,724 A | 12/1998 | Mantell | |
| 5,901,275 A | 5/1999 | Broddin | |
| 6,014,226 A | 1/2000 | Harrington | |
| 6,084,693 A | 7/2000 | Zimmermann | |
| 6,108,008 A * | 8/2000 | Ohta | H04N 1/6058 345/590 |
| 6,437,872 B1 * | 8/2002 | Davidson | G06K 15/1852 358/1.15 |
| 6,538,677 B1 | 3/2003 | Thompson | |
| 6,575,095 B1 | 6/2003 | Mahy | |
| 6,962,400 B2 | 11/2005 | Minnebo | |
| 7,031,025 B1 | 4/2006 | He | |
| 7,136,189 B2 | 11/2006 | Sharma | |
| 7,342,685 B2 | 3/2008 | Minnebo | |
| 7,369,276 B2 | 5/2008 | Couwenhoven | |
| 7,557,961 B2 | 7/2009 | Kuwahara | |
| 7,580,074 B2 | 8/2009 | Kuo | |
| 8,282,182 B2 | 10/2012 | Chandu | |
| 8,447,204 B2 | 5/2013 | Qiao | |
| 9,013,756 B2 | 4/2015 | Stevens | |
| 2004/0090654 A1 | 5/2004 | Minnebo | |
| 2004/0218221 A1 | 11/2004 | Hirano | |
| 2008/0259361 A1 | 10/2008 | Kakutani | |
| 2011/0058190 A1 * | 3/2011 | Yamada | H04N 1/608 358/1.9 |
| 2011/0141525 A1 | 6/2011 | Ng | |

FOREIGN PATENT DOCUMENTS

| | | |
|---|---|---|
| JP | 2010-230840 | 10/2010 |
| WO | WO03028362 | 4/2003 |
| WO | WO2013103559 | 7/2013 |

OTHER PUBLICATIONS

Yee S. Ng et, al., Advances in Technology of Kodak Nexpress Digital Production Color Presses, Society for Imaging Science and Technology, 2007, pp. 489-493, Eastman Kodak Company, US.

Hwai-Tzuu Tai et. al., Border Enhanced Screening Technology (BEST), IS&T's PICS Conference Proceedings 2001, pp. 42-45, NexPress Solutions LLC, US.

Tadahiko Kimoto, Multi-Level Halftoning by IGS Quantization, Journal of Signal and Information Processing, 2013, vol. 4, pp. 351-358, Scientific Research Publishing, Inc., US.

Henry R. Kang, Digial Color Halftoning, SPIE/IEEE Series on Imaging Science and Engineering, 2009, Chapter 18, pp. 445-470, SPIE Press, US.

Adobe Systems, Inc., Postscript Language Reference Manual, Third Edition, 1999, US.

Ostromoukhov et. al., Multi-Level Colour Halftoning Algorithms, Symposium on Advanced Imaging and Network Technologies, SPIE vol. 2949, 1996, pp. 332-340, Germany.

Guo-Yau Lin et. al., Multilevel Screen Design Using Direct Binary Search, J. Opt. Soc. Am. A, vol. 19, No. 10, 2002, pp. 1969-1982,US.

Global Graphics Software Ltd, Harlequin RIP—Proof Ready Plugin for Epson Variable Size Droplet Printers—Releasee Notes, Version 1.2r1, 2004, United Kingdon.

Gooran, A Novel Hybrid Amplitude Modulated/Frequency Modulated Halftoning Based on Multilevel Halftoning, Journal of Imaging Science and Technology, vol. 50, No. 2, pp. 157-167, 1996, US.

Rodriguez et. al., Blue-Noise Multitone Dithering, IEEE Transactions on Image Processing, vol. 17, No. 8, 2008, US.

Hewlett-Packard Development Company, L.P., Scalable Web Press Technologies, 18 Pages, 2008, US.

Cone, Piezography K7 System, Piezography Blog, 3 Pages, 2009, Country of Publication Unknown.

Wong et. al., Feature-Preserving Multilevel Halftoning Algorithm, Journal of Electronic Imaging, vol. 21. No. 4, 2012, US.

Elias et. al., Multilevel Halftoning Applied to Achromatic Inks in Multi-channel Printing, Advances in Printing and Media Technology—A1 Printing Science and Technology, vol. XLI, pp. 25-32, 2014, UK.

Fung et. al., Multilevel Halftoning Using Multiscale Error Diffusion, The Hong Kong Polytechnic University, 3 Pages, Date of Publication Unknown, Hong Kong.

Global Graphics SE, Defendants' Answer, Amended Counterclaims and Jury Demand, Mar. 1, 2017, US.

Elias, Halftoning for Multi-Channel Printing—Algorithm Development, Implementation and Verification, Linkoping University—Department of Science and Technology, Thesis No. 1694, 2014, Sweden.

* cited by examiner

|  | Pix 0 | Pix 1 | Pix 2 | Pix 3 |  | Pix w-1 |
|---|---|---|---|---|---|---|
| line 0 | CMYK Value (125,56,37,10) | CMYK Value (100,62,204,68) | CMYK Value (44,124,225,98) |  | ... |  |
| Line 1 | CMYK Value (64,122,86,104) | CMYK Value (55, 155, ,25,105) | CMYK Value (88,77,108,126) |  | ... |  |
| Line 2 | CMYK Value (130,44,120,80) | CMYK Value (44,77,204,128) | CMYK Value (66,240,128,50) |  | ... |  |
| Line 3 |  |  |  |  | ... |  |
| ... Line h-1 |  |  |  |  | ... |  |
|  |  |  |  |  | ... |  |

Generic Raster Image File Produced By Rendering Module
(w pixels wide by h lines high)

(Prior Art)

FIG. 2

Cyan

|  | Pix 0 | Pix 1 | Pix 2 | Pix 3 |  | Pix w-1 |
|---|---|---|---|---|---|---|
| line 0 | 3 | 2 | 1 |  | ... |  |
| Line 1 | 1 | 3 | 0 |  | ... |  |
| Line 2 | 0 | 2 | 1 |  | ... |  |
| Line 3 |  |  |  |  | ... |  |
| ... |  |  |  |  | ... |  |
| Line h-1 |  |  |  |  | ... |  |

Magenta

|  | Pix 0 | Pix 1 | Pix 2 | Pix 3 |  | Pix w-1 |
|---|---|---|---|---|---|---|
| line 0 | 3 | 2 | 2 |  | ... |  |
| Line 1 | 1 | 3 | 0 |  | ... |  |
| Line 2 | 2 | 2 | 3 |  | ... |  |
| Line 3 |  |  |  |  | ... |  |
| ... |  |  |  |  | ... |  |
| Line h-1 |  |  |  |  | ... |  |

Yellow

|  | Pix 0 | Pix 1 | Pix 2 | Pix 3 |  | Pix w-1 |
|---|---|---|---|---|---|---|
| line 0 | 1 | 1 | 1 |  | ... |  |
| Line 1 | 1 | 1 | 1 |  | ... |  |
| Line 2 | 1 | 1 | 1 |  | ... |  |
| Line 3 |  |  |  |  | ... |  |
| ... |  |  |  |  | ... |  |
| Line h-1 |  |  |  |  | ... |  |

Black

|  | Pix 0 | Pix 1 | Pix 2 | Pix 3 |  | Pix w-1 |
|---|---|---|---|---|---|---|
| line 0 | 0 | 1 | 0 |  | ... |  |
| Line 1 | 0 | 1 | 0 |  | ... |  |
| Line 2 | 1 | 2 | 1 |  | ... |  |
| Line 3 |  |  |  |  | ... |  |
| ... |  |  |  |  | ... |  |
| Line h-1 |  |  |  |  | ... |  |

Screened 2-bit output data for a 4 level digital press.
Each pixel has a value 0-3, with a set of raster data for each printing ink (Prior Art)

FIG. 4

Equal partitioning of tone range for a
4-level press having 3 dot sizes

Ideal press responses for the solid patches of Cyan dots,
for the 3 dot sizes of a 4-level press.

Non-ideal press responses for the solid patches of Cyan dots,
for the 3 dot sizes of a 4-level press.

Tone Modification Function for First Printable Tone Level

Tone Modification Function for Second Printable Tone Level

Tone Modification Function for Third Printable Tone Level

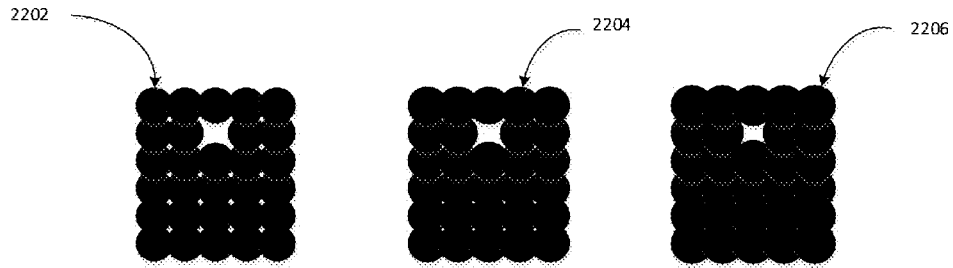

When large dots are made to overlap, the added printing strength or coverage of increasing numbers of dots is non-linear. It decreases as 100% is approached.

This requires additional linearization similar to conventional Dot Gain Curve Compensation used for lithographic printing

FIG. 22

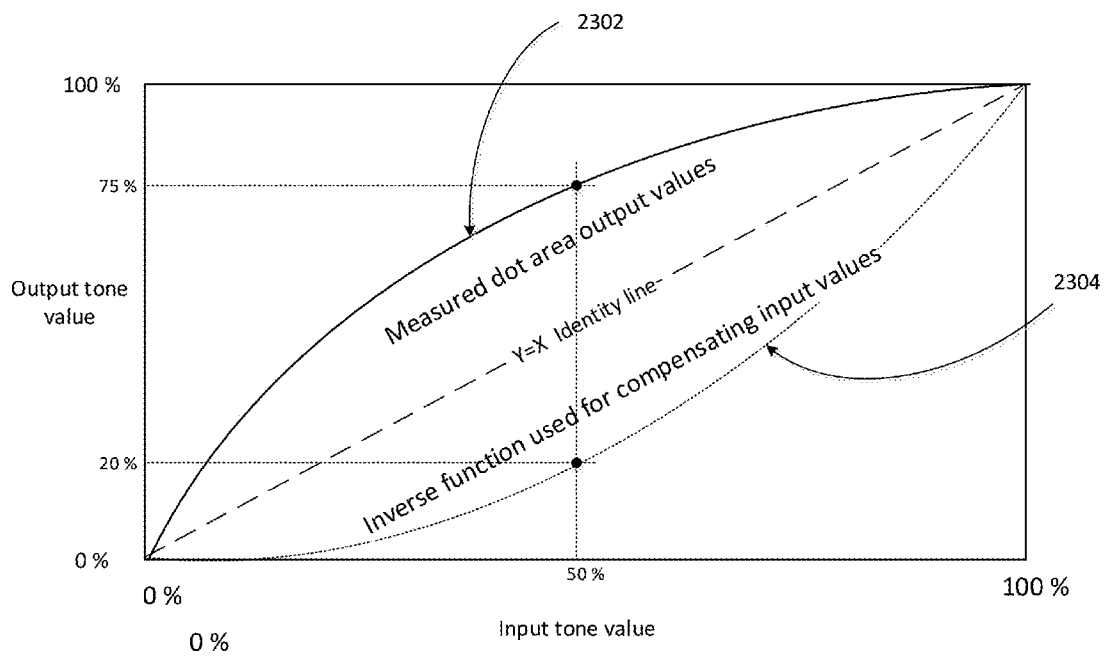

Conventional Dot Gain Curve Compensation

A non-linear dot area response curve and its conventional inverse compensation function

FIG. 23

Two implementations of a tone modification function.

A lookup table is used as an optimized replacement for a subtractor and multiplier pair.

Both simple overlap AND transition point shifting used together in the invention Tone Modification Function for First Printable Tone Level (Small Dots)

Tone Modification Function for Second Printable Tone Level (Medium Dots)

Tone Modification Function for Third Printable Tone Level (Large Dots)

Tone Modification Functions after adding Overlap and Transition Point Shifting

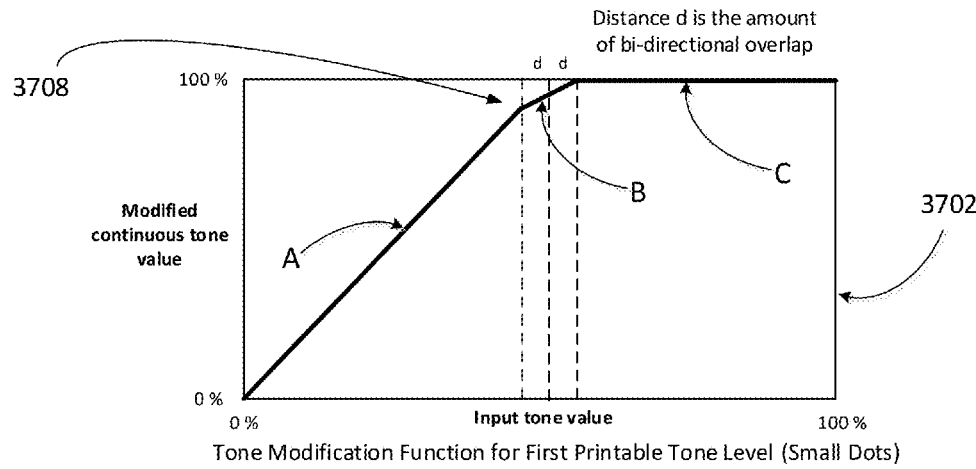
FIG. 37A
Tone Modification Function for First Printable Tone Level (Small Dots)
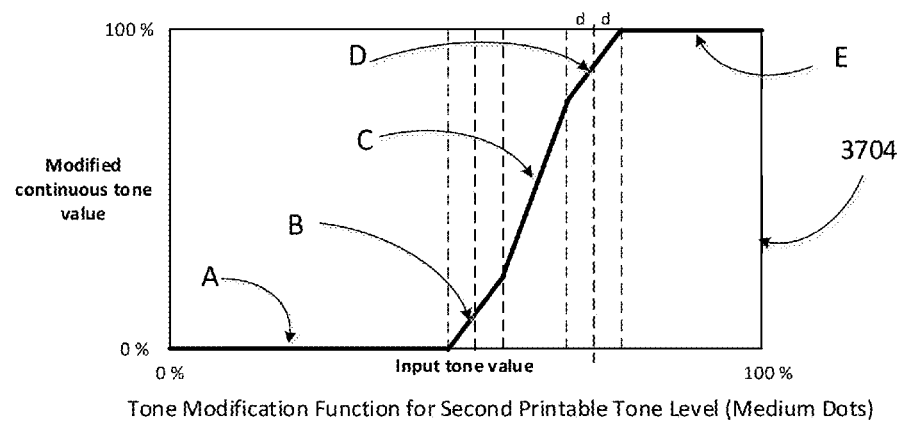
FIG. 37B
Tone Modification Function for Second Printable Tone Level (Medium Dots)
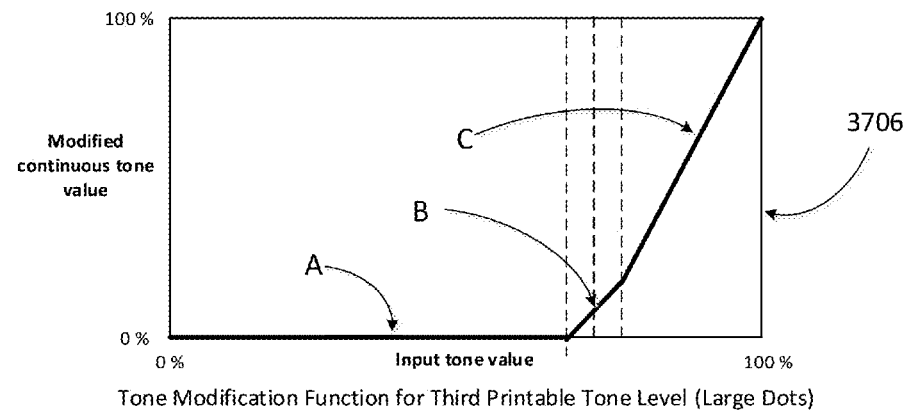
FIG. 37C
Tone Modification Function for Third Printable Tone Level (Large Dots)
Tone Modification Functions for
Compensated Overlap and Transition Point Shifting
FIG. 37

Example screening parameter calculations for tone modification functions (before screening starts)
Transition point shifting with Simple overlap

Measured Densities of solid fields (Cyan):
All large dots: 2.60
All medium dots: 1.08
All small dots: 0.475

Nominal settings:
Dmax (maximum ink density)     2.50
Overlap for small to medium dots  2.0%
Overlap for medium to large dots  2.0%

| Parameter | Value | Data type | Calculation |
|---|---|---|---|
| SmallDotPeak | 685 | 10-bit integer | M-D equation (0.475, with Dmax = 2.5) → 67% <br> 67 * 1023 / 100 → 685 |
| MediumDotPeak | 941 | 10-bit integer | M-D equation (1.08, with Dmax = 2.5) → 92% <br> 92 * 1023 / 100 → 941 |
| OverlapStoM | 20 | 10-bit integer | 2.0% of 1023 → 20 |
| OverlapMtoL | 20 | 10-bit integer | 2.0% of 1023 → 20 |
| MediumDotStart | 665 | 10-bit integer | SmallDotPeak – OverlapStoM →  665 |
| LargeDotStart | 921 | 10-bit integer | MediumDotPeak - OverlapMtoL →  921 |
| SDotSlope | 1.4934 | floating point | 1023.0 / SmallDotPeak → 1.4934 |
| MDotSlope | 3.707 | floating point | 1023.0/ (MediumDotPeak-MediumDotStart) →3.707 |
| LDotSlope | 10.03 | floating point | 1023.0/(1023.0 - largeDotStart) → 10.03 |

Example Calibration and Screening Parameter
calculations for a single colorant

FIG. 38

The Input file: the Musicians CMYK test image with ramps from 0% to 100% placed around the perimeter. This image functions as the rendered, unscreened data.

Cyan

Magenta

Yellow

Black

Cyan after the Small Tone Modification Function

Cyan after the Medium Tone Modification Function

Cyan after the Large Tone Modification Function

Cyan Small dot data after 1-bit half-toning

Cyan Medium dot data after 1-bit half-toning

Cyan Large dot data after 1-bit half-toning

Cyan After Combination of Small, Medium and Large Dots

Magenta After Combination of Small, Medium and Large Dots

Yellow After Combination of Small, Medium and Large Dots

Black After Combination of Small, Medium and Large Dots

Single CMYK Composite Image Composed of Four Output Images.

Digital Press Profile for normal nozzles

Maximum measured densities for all colorants and dot sizes
Density values correspond to dot areas of:

| | 48% | 70% | 100% |
|---|---|---|---|
| Ink | Small | Medium | Large |
| Cyan | 0.283 | 0.520 | 2.50 |
| Magenta | 0.283 | 0.520 | 2.50 |
| Yellow | 0.283 | 0.520 | 2.50 |
| Black | 0.283 | 0.520 | 2.50 |

FIG. 59A

Digital Press Profile for aberrant nozzles

Maximum measured densities for all colorants and dot sizes
Density values correspond to dot areas of:

| | 35% | 55% | 100% |
|---|---|---|---|
| Ink | Small | Medium | Large |
| Cyan | 0.186 | 0.345 | 2.50 |
| Magenta | 0.186 | 0.345 | 2.50 |
| Yellow | 0.186 | 0.345 | 2.50 |
| Black | 0.186 | 0.345 | 2.50 |

FIG. 59B

Tone Modification Function for First Printable Tone Level
for normal nozzles

Tone Modification Function for Second Printable Tone Level
for normal nozzles

Tone Modification Function for Third Printable Tone Level
for normal nozzles

Tone Modification Function for First Printable Tone Level
for an aberrant nozzle Tone Modification Function for Second Printable Tone Level
for an aberrant nozzle Tone Modification Function for Third Printable Tone Level
for an aberrant nozzle

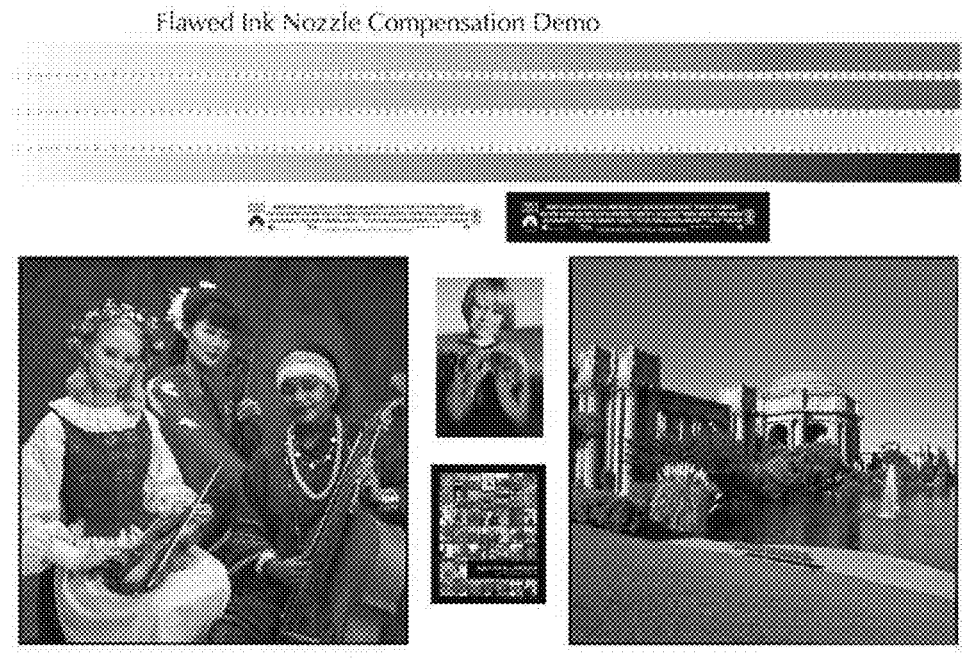
FIG. 63A – Screened proof file (resolution reduced)
Pristine - perfect heads, no extra compensation
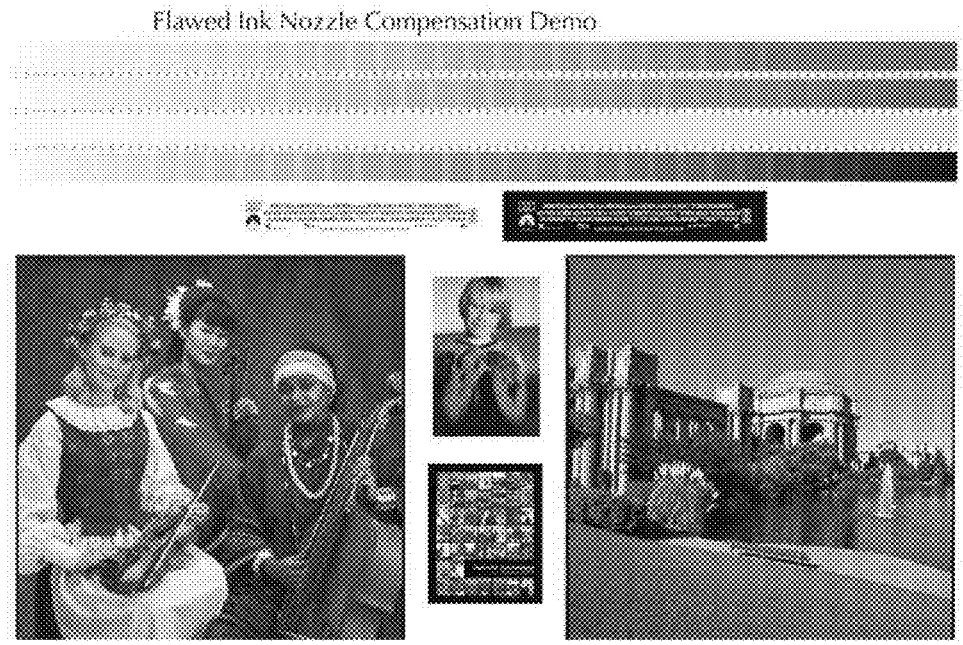
FIG. 63B – Aberrant heads alone
Note the lightened regions in the CMYK ramps.

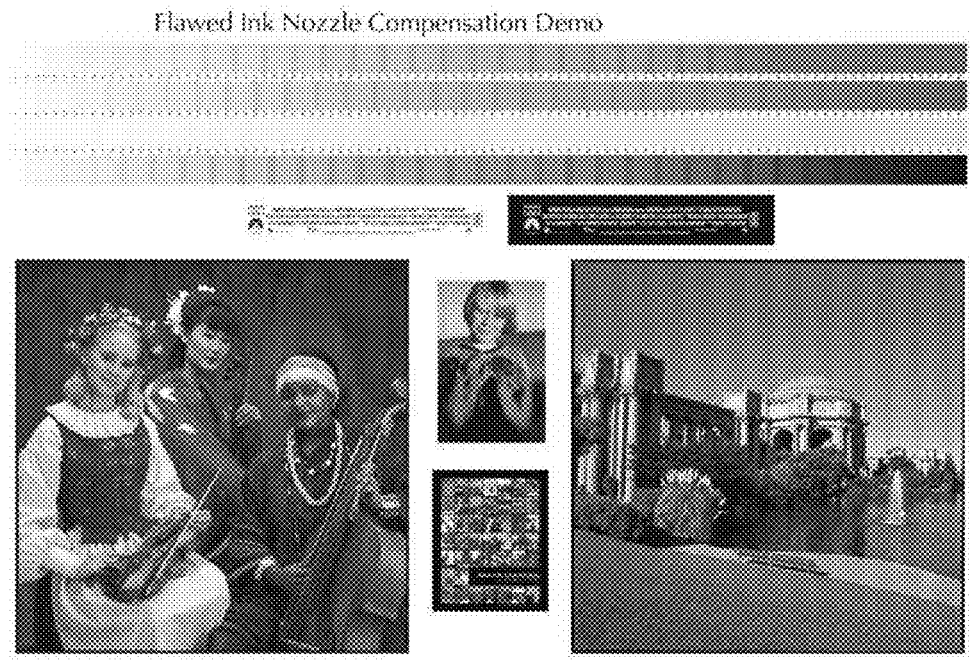
FIG. 64A – inventions's Compensation alone
Note the darkened regions in the CMYK ramps
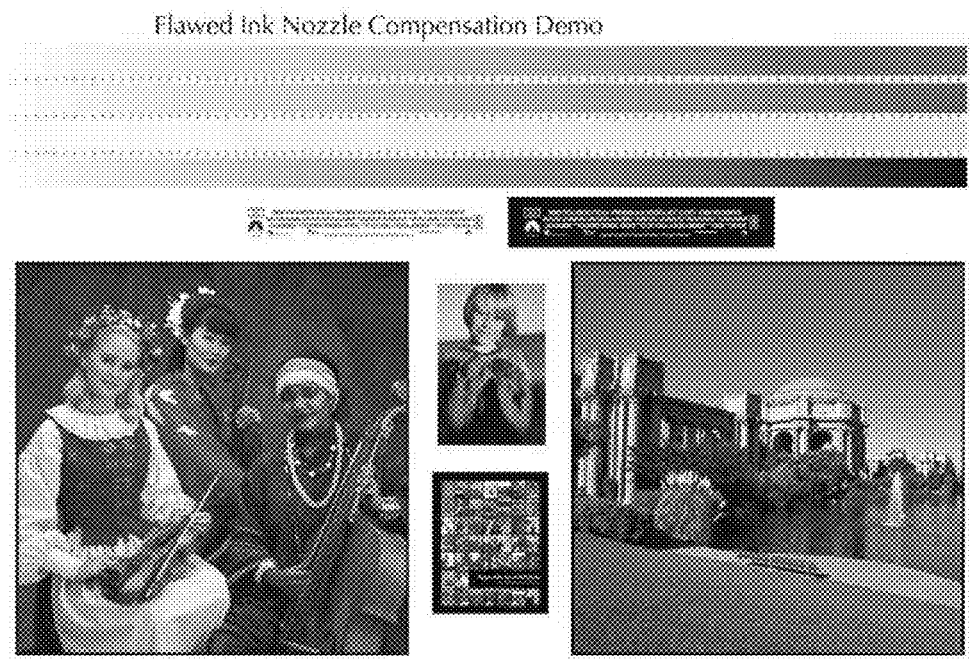
FIG. 64B – Aberrant heads WITH invention's Compensation

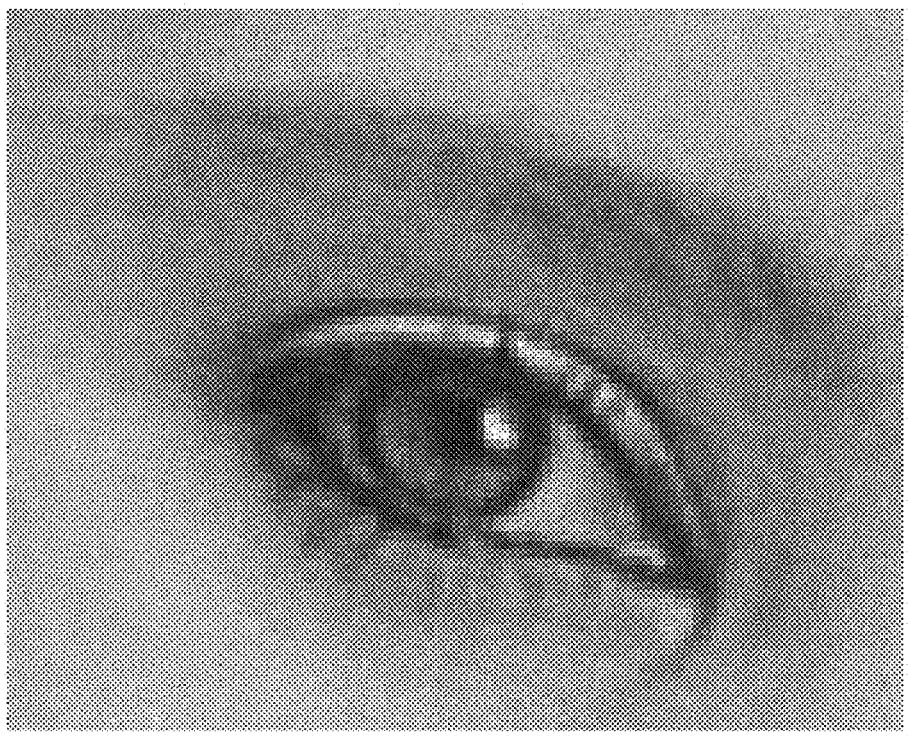
FIG. 65A – Closeup of Pristine nozzles - all separations
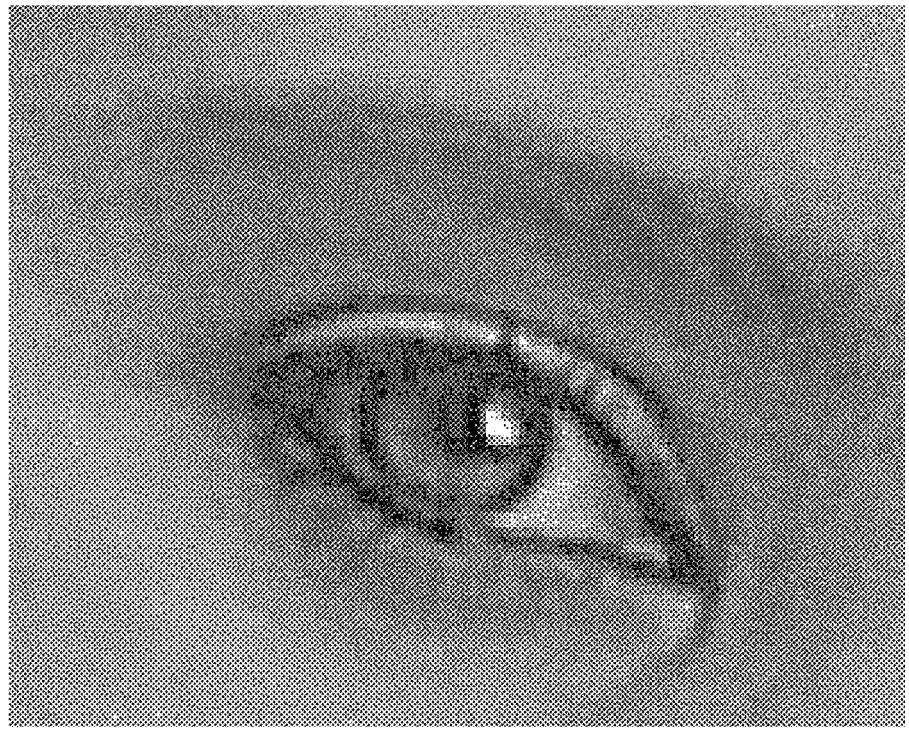
FIG. 65B – Closeup of Pristine nozzles - only Magenta separation

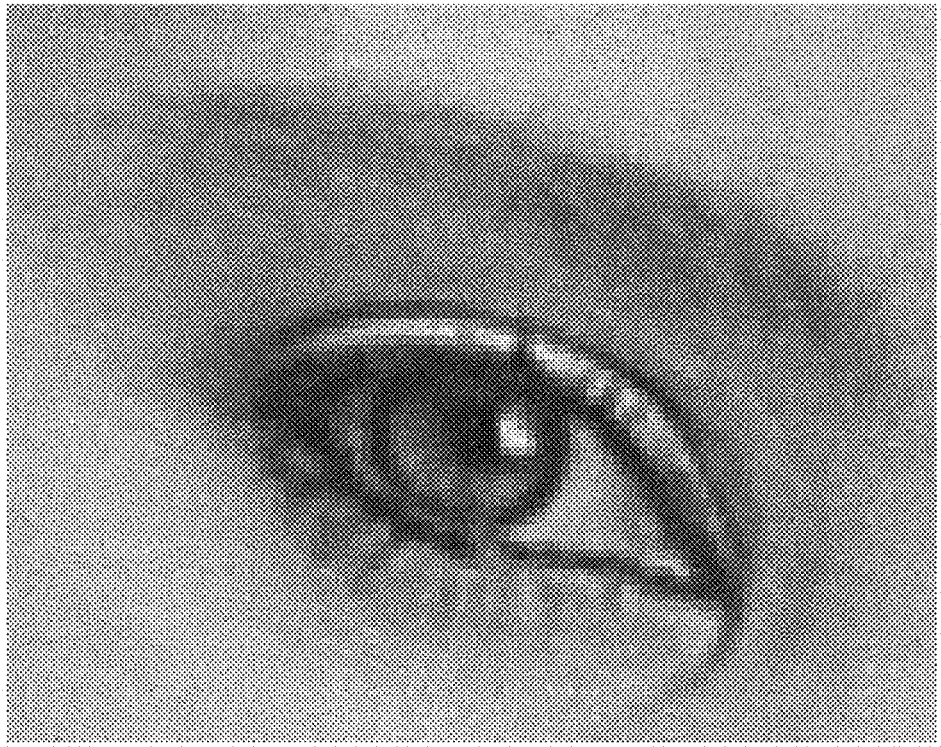
FIG. 66A – Closeup of Aberrant nozzles - all separations
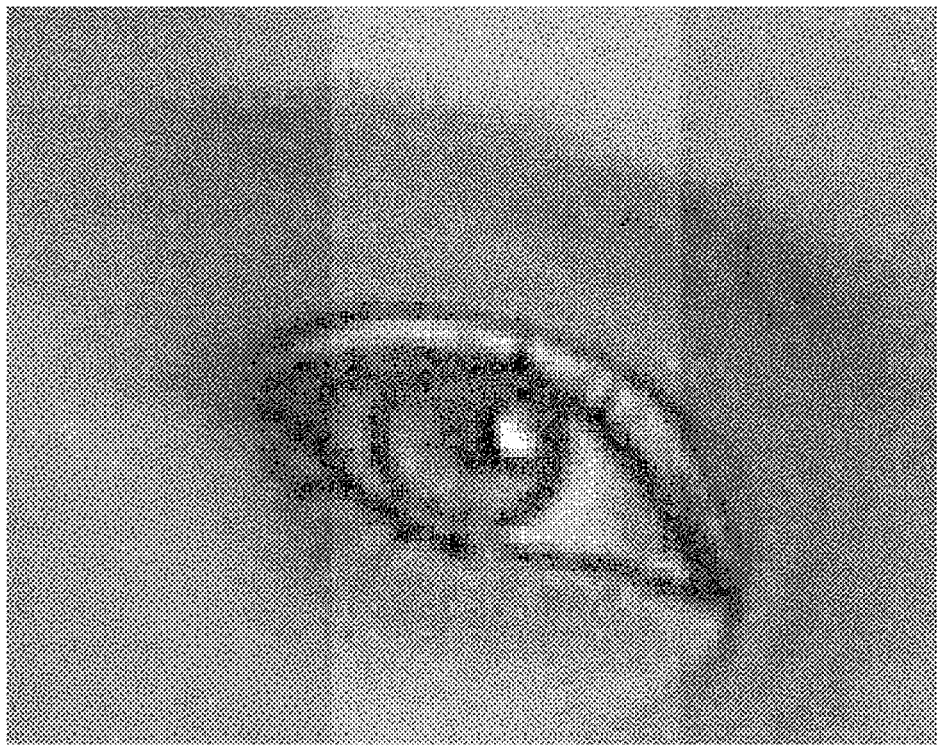
FIG. 66B – Closeup of Aberrant nozzles – only Magenta separation

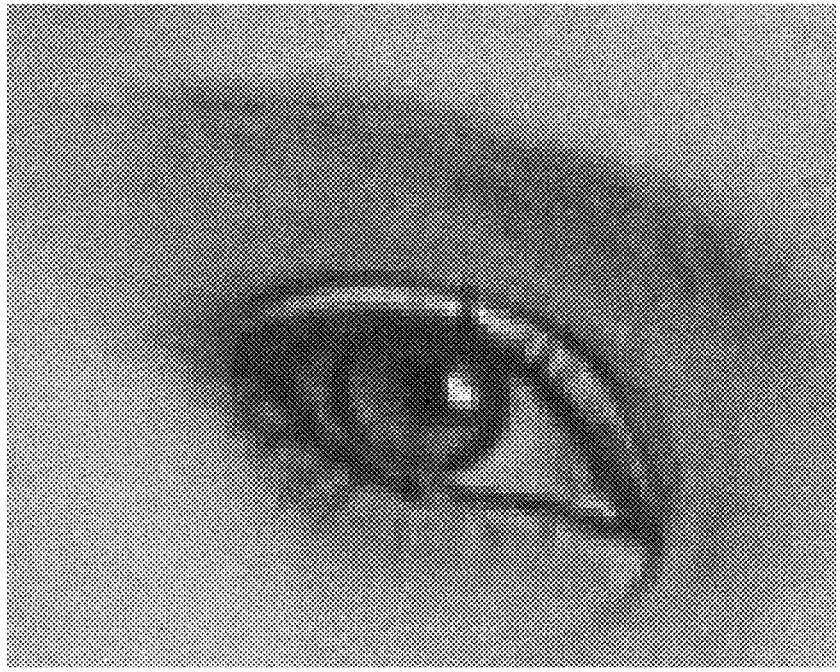
FIG. 67A – Closeup of just Compensation - all separations
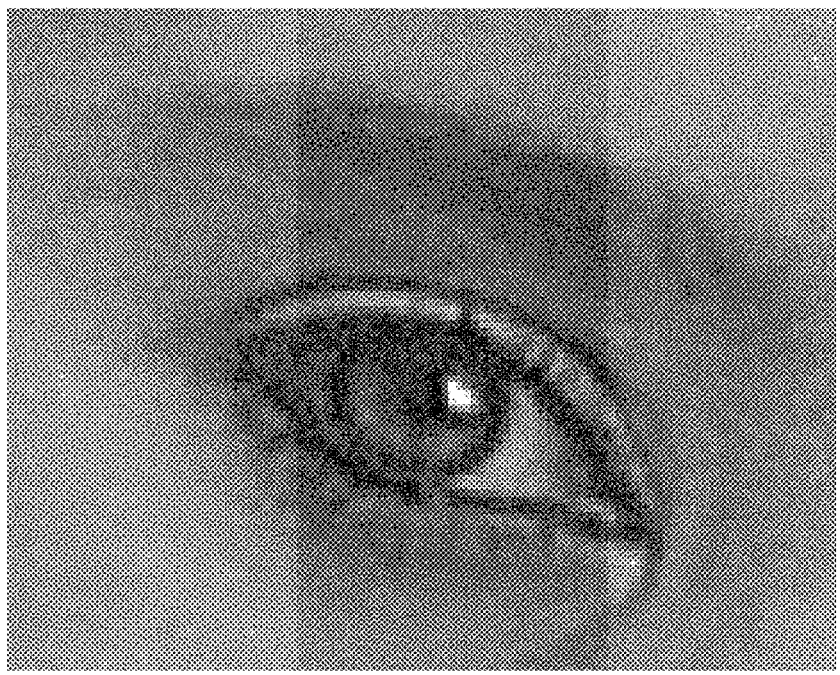
FIG. 67B – Closeup of just Compensation - only Magenta separation

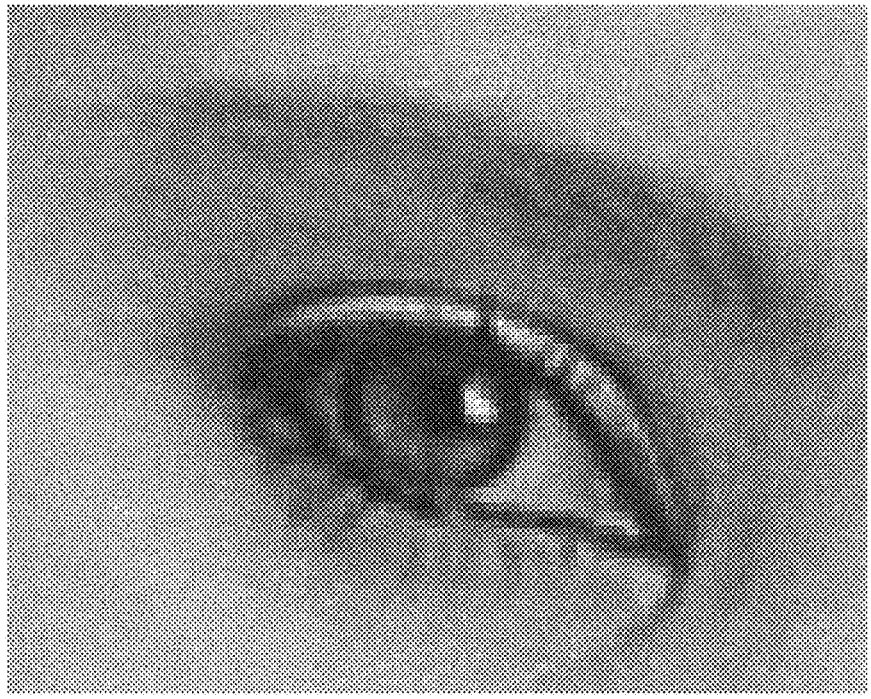
FIG. 68A – Closeup of Aberrant nozzles WITH Compensation - all separations
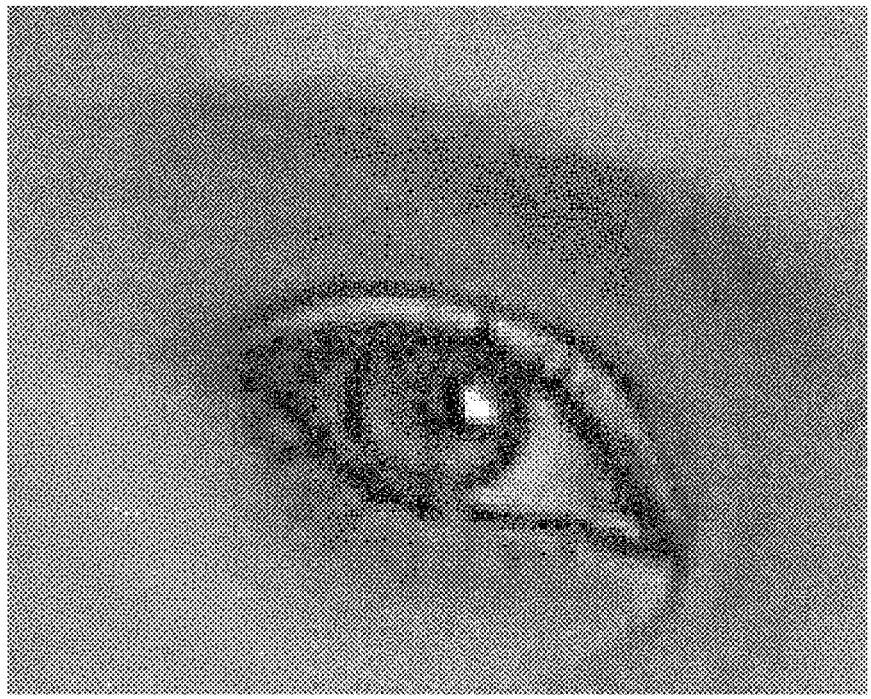
FIG. 68B – Closeup of Aberrant nozzles WITH Compensation - only Magenta separation Pristine Normal nozzles left of center | Compensated Aberrant nozzles right of center

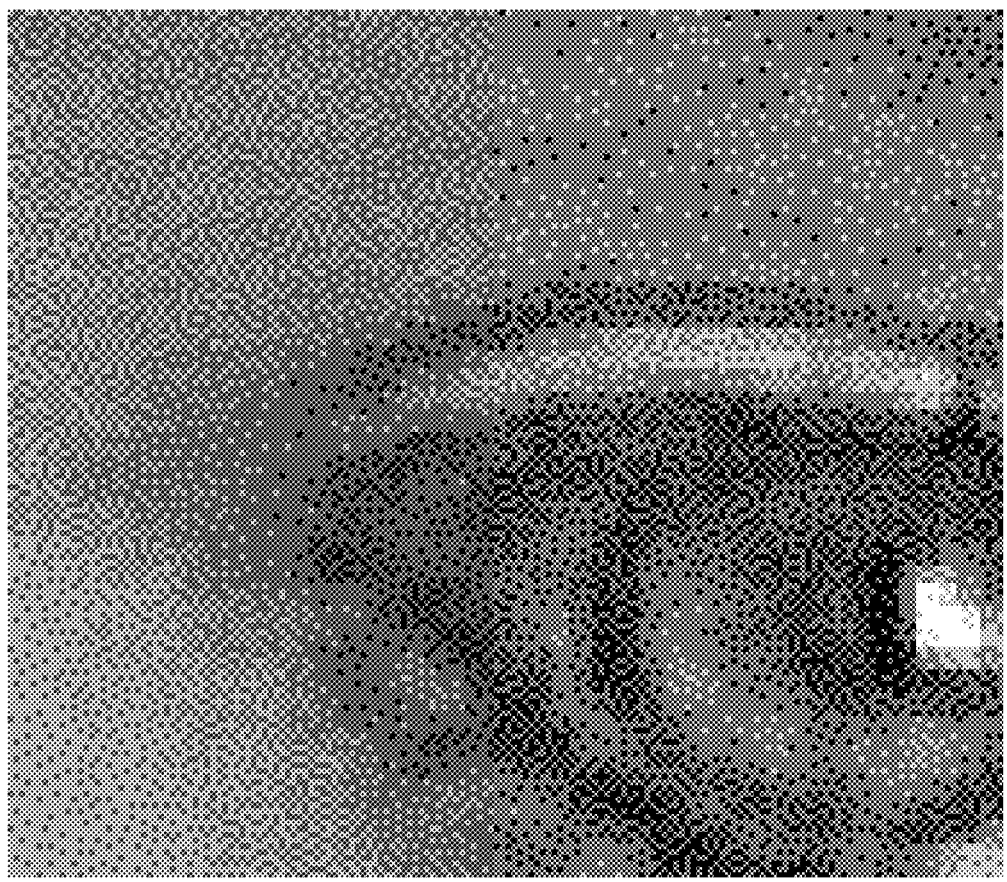

Pristine Normal nozzles left of center | Compensated Aberrant nozzles right of center FIG. 69 – Closeup of Aberrant nozzles WITH Compensation - only Magenta separation.
Extreme closeup of FIG 68B
Image is horizontally centered on left-right transition from normal to aberrant nozzles.

RASTER IMAGE PROCESSOR WITH PRINTHEAD PROFILE COMPENSATION FOR A MULTI LEVEL DIGITAL PRINTING MACHINE

CROSS-REFERENCE TO RELATED APPLICATIONS

This application claims priority to and is a continuation-in-part of U.S. Utility patent application Ser. No. 14/534,587 filed on Nov. 6, 2014, now pending, that claims priority to U.S. Provisional Application Ser. No. 62/067,790 filed on Oct. 23, 2014, now pending, U.S. Provisional Application Ser. No. 61/993,976 filed on May 15, 2014, now pending, and U.S. Provisional Application Ser. No. 61/932,848 filed on Jan. 29, 2014, all of which are hereby incorporated into this specification by reference in their entirety.

BACKGROUND OF THE INVENTION

FIG. 1 shows a conventional bi-level digital printing system 100 having a bi-level digital printing machine 102 and a raster image processor 104 widely used by commercial print shops to print high volume and high quality prints from an input file 80 such as a raster file format (tiff, JPEG, etc.) or a vector file format (pdf, Postscript, etc.). Bi-level digital printing machine 102 has a plurality of fixed print heads (not shown) each having a plurality of fixed nozzles (not shown) that can print a single sized dot or no dot as the paper passes under the nozzles. Raster image processor 104 has an interpretation module 106 and a rendering module 108. As is well known in the art, interpretation module 106 and rendering module 108 have computer instructions or code to produce an unscreened raster image file 110 from input file 80 that is in a non-raster image format (for example, pdf). If input file 80 is a raster file, then input file 80 requires only raster processes, such as scaling and color conversion, to produce unscreened raster image file 110. Examples of conventional bi-level digital printing systems having a digital printing machine and a raster image processor are the HP® Indigo® 20000 digital press sold by Hewlett-Packard Company (www8.hp.com/us/en/commercial-printers/indigo-presses/20000.htm); the KODAK NEXPRESS SX2700 digital press sold by Ricoh Corporation (http://rpp.ricoh-usa.com/products/production-printers/cutsheet/kodak-nexpress); and the Xerox® Color J75 digital press sold by Xerox Corporation www.xerox.com/digital-printing/printers/digital-press/xerox-j75/enus.html).

FIG. 2 shows a generic unscreened raster image file 110 produced by rendering module 108 (w pixels wide by h lines high). Each pixel of unscreened raster image file 110 has a continuous tone value (for example, 0-1023 for 10 bit tone values) for each colorant of Cyan, Magenta, Yellow and black (CMYK). In order to print unscreened raster image file 110 on bi-level digital printing machine 102, raster image processor 104 further comprises a screening module 114 (FIG. 1) that has computer instructions to screen or convert the continuous tone value of each pixel of unscreened raster image file 110 to a print level value (0 or 1) stored in an output bitmap file 116 (FIG. 1) using a well known half-toning algorithm such as threshold screening or AM screening.

FIG. 3 shows a high level flow chart of conventional screening module 114 of raster image processor 104. For each pixel on each line of an input unscreened raster file 110, whose coordinates are X and Y, the continuous tone value is processed into a 1-bit output value by a half-toning algorithm.

Multi level printing machines are being developed where a nozzle can print more than two (2) levels for each printed pixel, such as a four level machine. For example, in a four level machine, each nozzle can print no dot, a small dot, a medium dot or a large dot thereby allowing for a much finer quality print. FIG. 4 shows a generic screened 2-bit output bitmap file for a 4-level digital printing machine. Each pixel has a value of 0-3, with a set of raster data for each printing ink or colorant.

FIG. 5 shows a conventional way of partitioning the tone ranges in equal parts for a 4-level press having 3 dot sizes. One disadvantage of such contiguous sectioning of the printed tone range into equal parts, one for each output tone level for each colorant, is an artifact of flattening or visible loss of screening at the boundaries between the levels.

FIG. 6 is a graph illustrating a response that one would expect for a perfectly built and correctly operating or ideal digital printing machine. For such an ideal press, an input tone value of 33.3% from the unscreened raster file results in a patch of small size dots having a measured print strength of 33.3 percent. However, no digital printing machine operates in an ideal manner.

FIG. 7 is a graph illustrating a response for a digital printing machine that behaves in a non-ideal manner. In this example, an input tone value of 33.3% from the unscreened raster file results in a patch of small size dots having a measured print strength of 45 percent and not 33.3 percent. Further, an input tone value of 66.7 percent results in a patch of all medium size dots having a measured print strength of 55 percent and not 66.7 percent. As such, unwanted artifacts in the print are created as a result of the print heads of the digital printing machine producing a stronger or lighter intensity level for any continuous tone value of the unscreened raster file. These improper values and the intermediate values need to be carefully compensated.

Another drawback with conventional screening modules is the inability to compensate for variations in print strength of individual inkjet nozzles except by modifying the continuous tone input data. Aside from the difficulty in precisely specifying such corrections, for large compensations this can reduce the number of available printed screened tone levels, resulting in undesirable tone banding artifacts. This invention allows for an additional form of compensation that does not reduce the number of printed tone levels, while also simplifying the specification of the individual compensations.

SUMMARY OF THE INVENTION

One object of the present invention is to provide a raster image processor and method thereof that produces a high quality multi-level screened output bit map file for digital printing machines that easily, accurately, and precisely removes the flattened tone contour artifacts.

Another object of the present invention is to provide a raster image processor and method thereof that removes unwanted artifacts in the print created as a result of the print heads of the digital printing machine producing a stronger or lighter intensity levels.

Another object of the present invention is to provide a raster image processor and method thereof that produces a high quality multi-level screened output bit map file for digital printing machines that employs any bi-level half-toning algorithm.

Another object of the present invention is to provide a raster image processor and method thereof that produces a high quality multi-level screened output bit map file for digital printing machines with an arbitrary number of gray levels, not limited to a power of 2.

Another object of the present invention is to provide a raster image processor and method thereof that produces a high quality multi-level screened output bit map file for digital printing machines whose multiple gray levels are extremely far from being equally spaced in the tone range, thus giving expanded design leeway to designers of new digital printing machines.

Another object of the present invention is to provide a raster image processor and method thereof that produces a high quality multi-level screened output bit map file for digital printing machines with a calibration method and system that is straightforward, accurate, powerful, and quick, enabling rapid adaptation to changing print conditions, print heads, nozzles, electronics, and other physical varying factors.

Another object of the present invention is to provide a method of compensation of variations of individual print positions or nozzles, that does not reduce the number of printed tone levels, while also simplifying the specification of the individual compensations.

In one embodiment, the present invention is a system and method of calibration, screening, and compensation for multiple gray-level digital presses. Unequal quantization of the input range is employed with compensated overlapping of sub-ranges. Multiple instances of bi-level screening algorithms, tone modification functions, and a recombination algorithm are employed to produce calibrated screening on individual tone ranges. The method works with any bi-level screening algorithm and devices with any number of gray-levels. Quality imaging results from high detail, high tonal accuracy, low screening noise, and lack of printed artifacts. Dynamic re-calibration is facilitated. The elimination of the constraint of evenly spaced gray-levels also has advantages of cost and yield for both print head fabricators as well as digital press manufacturers. Multiple implementations of the system and method are given for both hardware and software embodiments of the invention. The present invention, which comprises a print profile for each colorant, is extended to further comprise additional print profiles, as needed, specifying the print characteristic of a single or group of aberrant nozzles. The present invention, which comprises a print profile for each colorant, is extended to further comprise additional print profiles, as needed, specifying the print characteristic of a single or group of aberrant nozzles.

BRIEF DESCRIPTION OF THE DRAWINGS

The following description of the invention will be further understood with reference to the accompanying drawings, in which:

FIG. 2 illustrates a conventional raster image file produced by a conventional rendering modules having a plurality of printable positions of a page defined by pixel location, line number, and CMYK value.

FIG. 4 illustrates a conventional screened bit map output file stored in a bitmap memory device for each of the colorants Cyan, Magenta, Yellow, and Black for printable positions of a page defined by pixel location and line number. Each of the printable positions of the bit map has a 4-level output value (0-3) indicative of no dot, a small dot, a medium dot, and a large dot.

FIG. 22 illustrates solid patches of large dots which may be purposely oversized to enable solid coverage and may require additional linearization using conventional dot gain compensation methods.

FIG. 23 illustrates a non-linear dot area response curve and its inverse function for input compensation.

FIG. 37A is a graph of a tone modification function for the first printable tone level (for example, a small size dot) with shifting and bi-directional overlapping.

FIG. 37B is a graph of a tone modification function for the second printable tone level (for example, a medium size dot) with shifting and bi-directional overlapping.

FIG. 37C is a graph of a tone modification function for the third printable tone level (for example, a large size dot) with shifting and bi-directional overlapping.

FIG. 38 is an example of calibration and screening parameter calculations for a single colorant.

FIG. 59A is a digital press profile for a normal nozzle or group of nozzles.

FIG. 59B is a digital press profile for an aberrant nozzle or group of aberrant nozzles.

FIG. 63A shows a print simulation of a test image containing photos and process color ramps for the case when all nozzles are pristine or functioning normally.

FIG. 63B shows a print simulation of the test image for the case when there are aberrant nozzles.

FIG. 64A shows a print simulation of the test image for the case when all nozzles are pristine but the compensation of the invention is in effect nevertheless.

FIG. 64B shows a print simulation of the test image for the case when there are aberrant nozzles and the compensation of the invention is in effect.

FIG. 65A shows a closeup of FIG. 63A (Pristine) for all separations.

FIG. 65B shows a closeup of FIG. 63A (Pristine) for just the Magenta separation.

FIG. 66A shows a closeup of FIG. 63B (Aberrant nozzles) for all separations.

FIG. 66B shows a closeup of FIG. 63B (Aberrant nozzles) for just the Magenta separation.

FIG. 67A shows a closeup of FIG. 64A (just Compensation) for all separations.

FIG. 67B shows a closeup of FIG. 64A (just Compensation) for just the Magenta separation.

FIG. 68A shows a closeup of FIG. 64B (Aberrant with Compensation) for all separations.

FIG. 68B shows a closeup of FIG. 64B (Aberrant with Compensation) for just the Magenta separation.

FIG. 69 shows an extreme closeup of FIG. 68B (Aberrant with Compensation for just the Magenta separation) with the image horizontally centered on the left-right transition from normal to aberrant nozzles.

DESCRIPTION OF THE INVENTION

Figure 1:
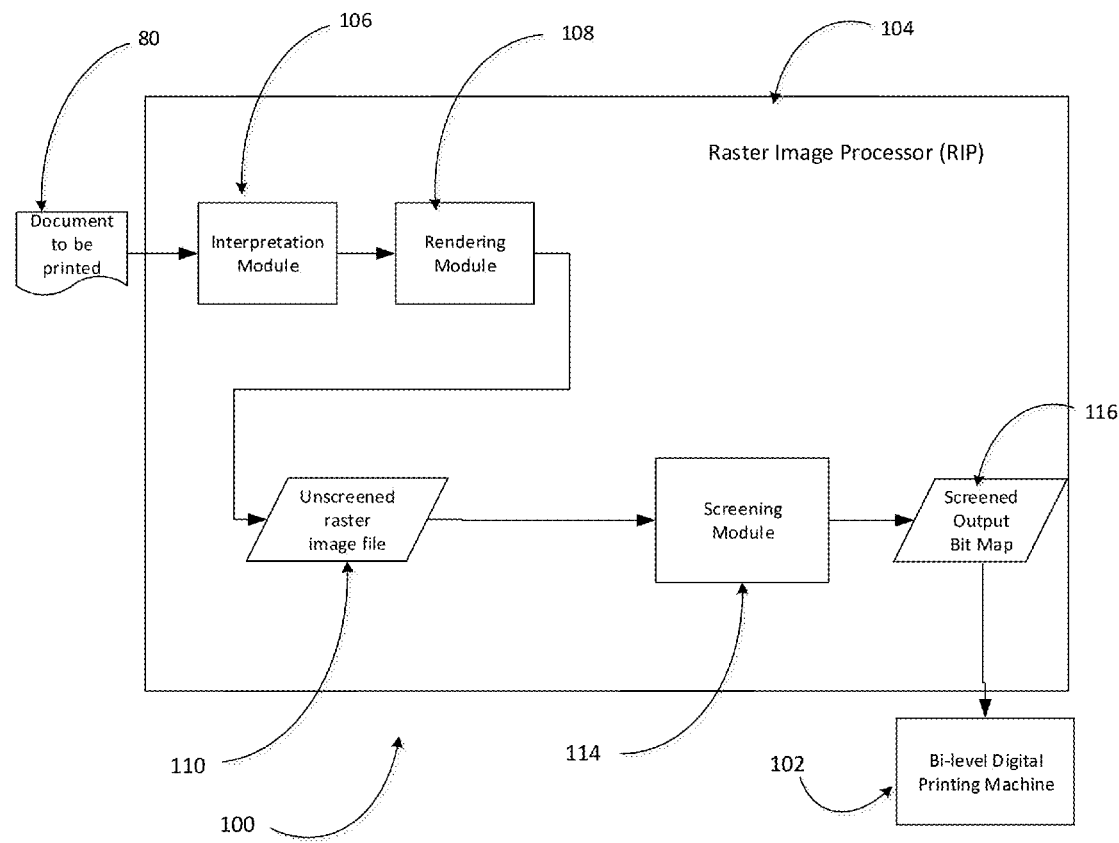
FIG. 1 is a high level block diagram showing the architecture of a conventional raster image processor used to produce a conventional output bit map file for a bi-level digital printing machine.
Figure 3:
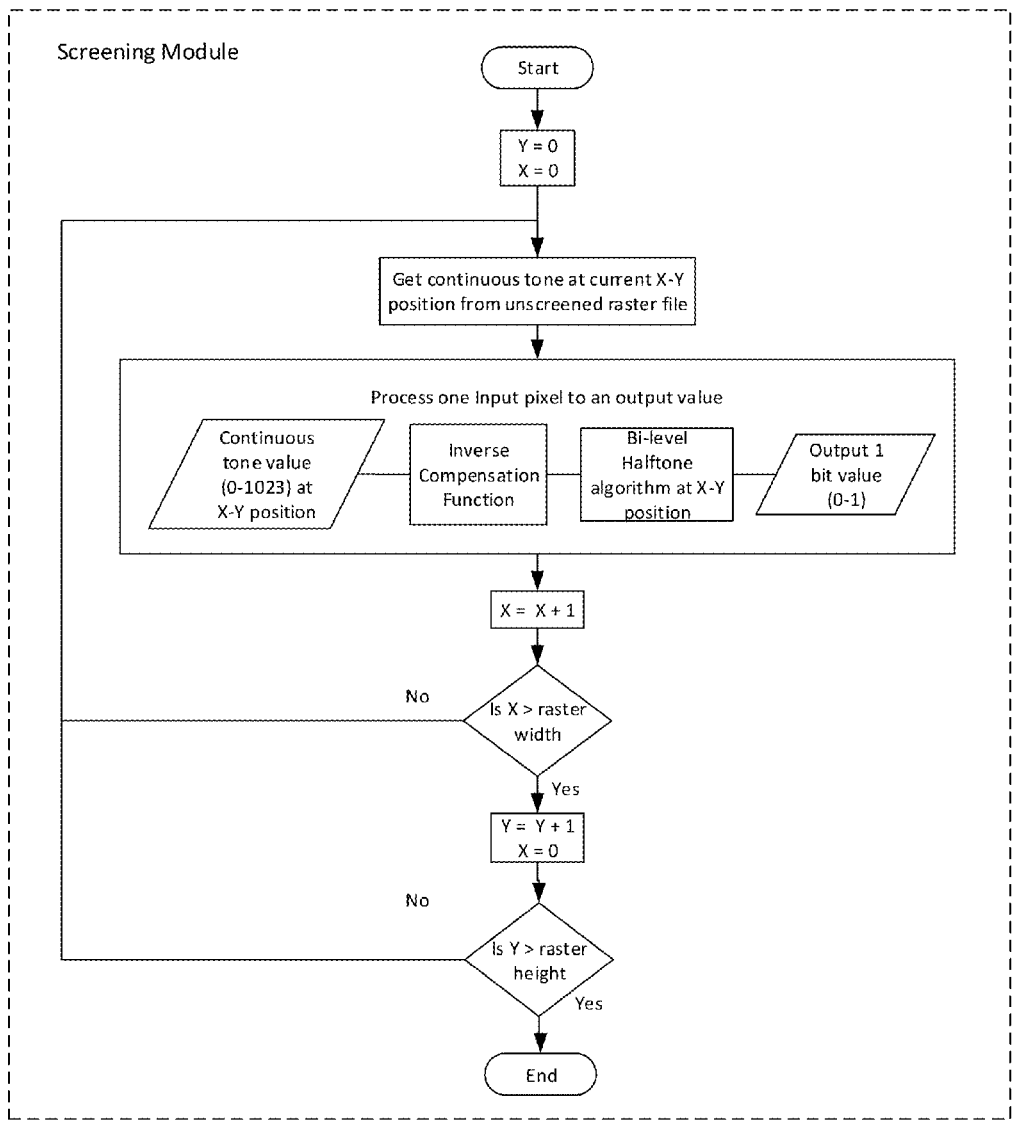
FIG. 3 shows a high level flow chart of a conventional screening module of a rip. For each pixel on each line of an input unscreened raster file, whose coordinates are X and Y, the continuous tone value is processed into a 1-bit output value via a half-toning algorithm.
Figure 5:
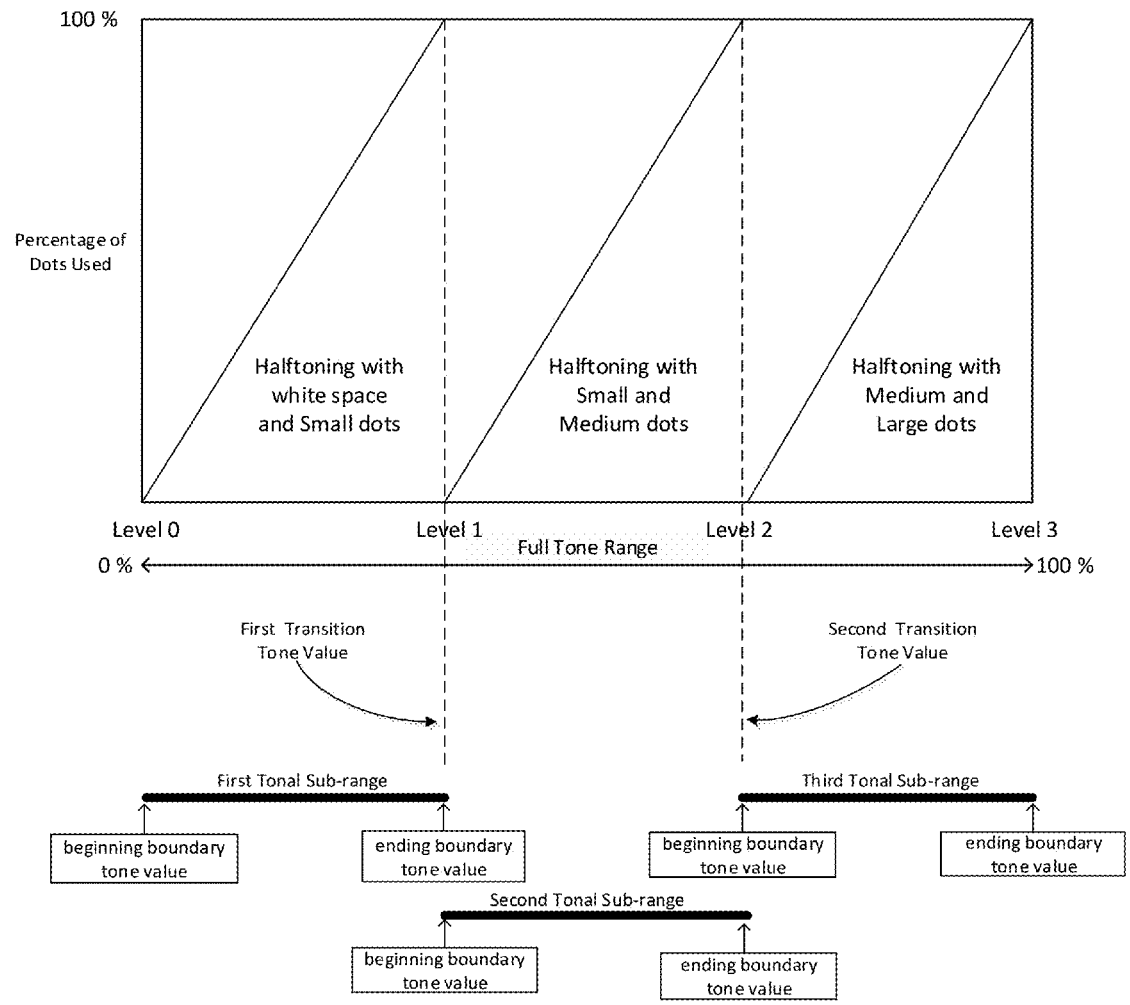
FIG. 5 illustrates a conventional full tone range for a first colorant having three equal tonal sub-ranges corresponding to small, medium, and large size dots, respectively.
Figure 6:
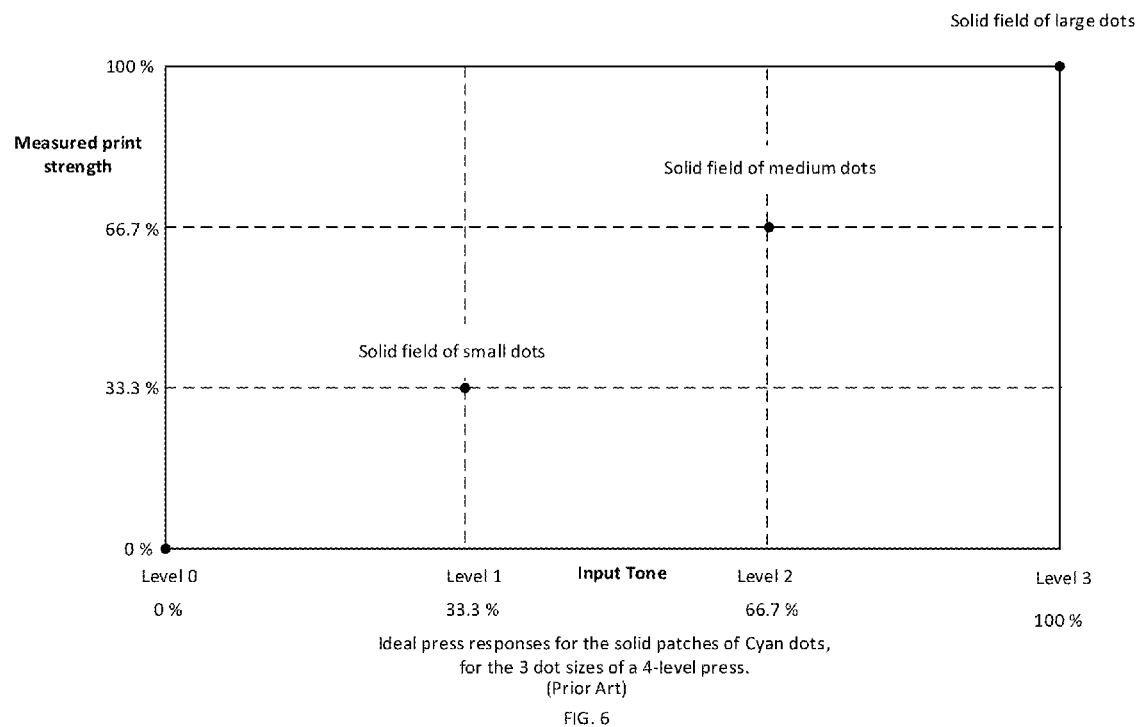
FIG. 6 is a graph illustrating a response that one would expect for a perfectly built and correctly operating or ideal digital printing machine.
Figure 7:
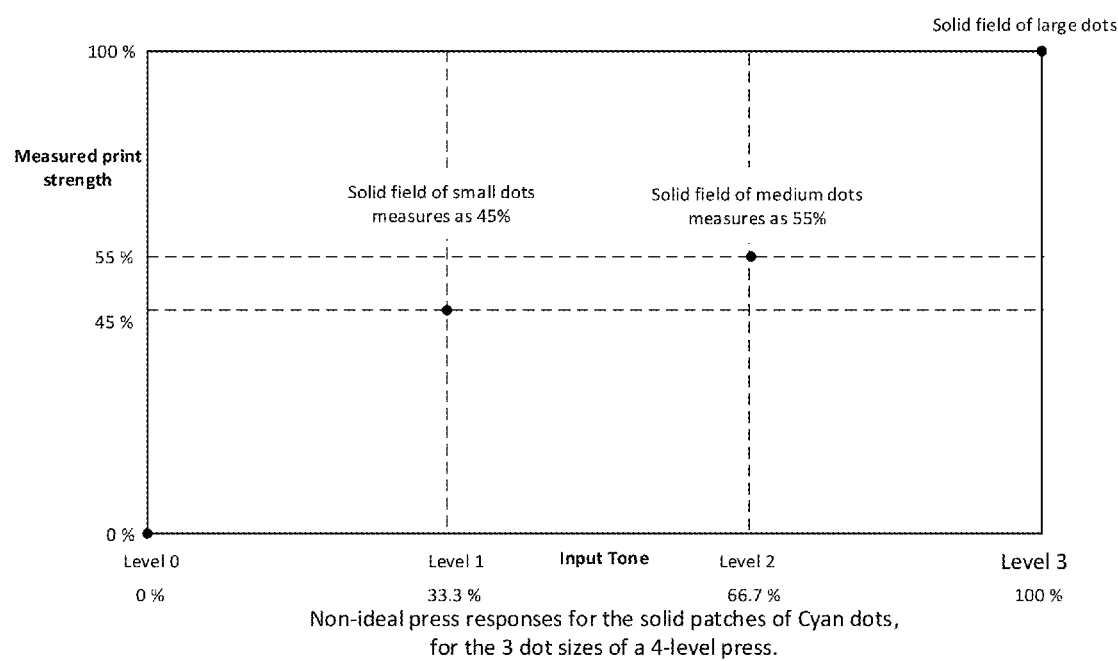
FIG. 7 is a graph illustrating a response for a digital printing machine that behaves in a non-ideal manner.
Figure 8:
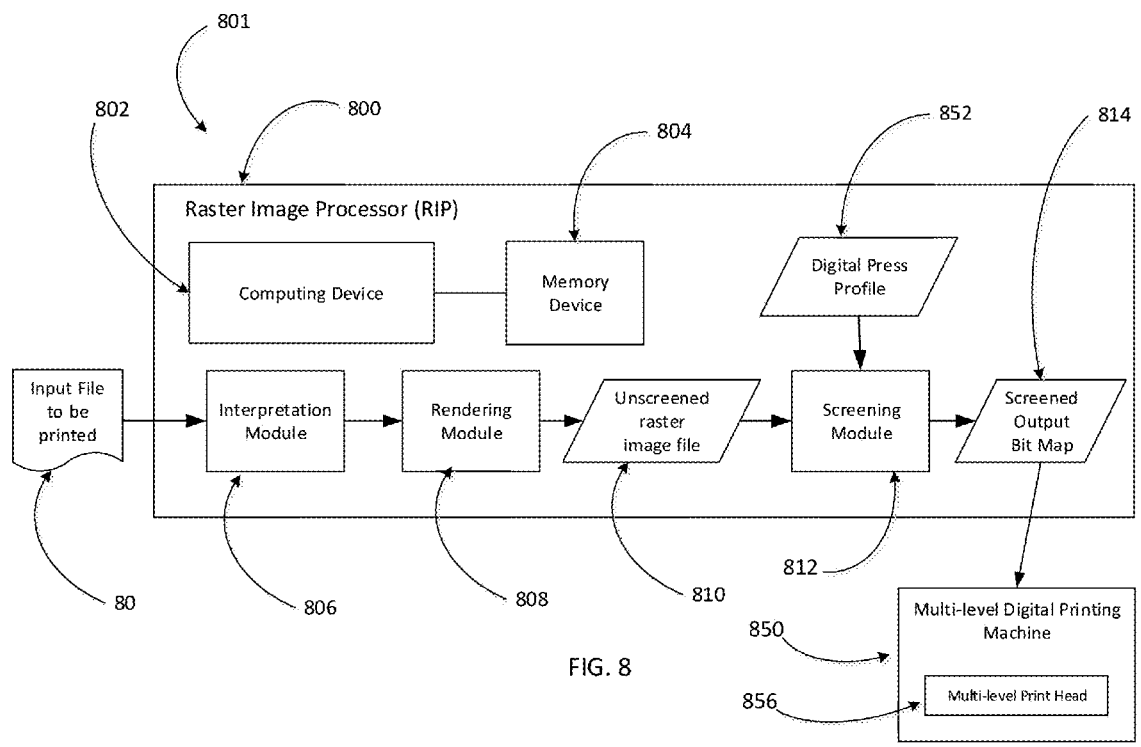
FIG. 8 is a high level block diagram showing the architecture of a raster image processor according to the present invention used to produce a bit map output file for a digital printing machine capable of printing multiple levels such as a no dot level, a small dot level, a medium dot level, and a large dot level.

Referring to FIG. 8, a system 801 according to the present invention comprises a raster image processor 800 connected with a multi level digital printing machine 850. In the embodiment shown, digital printing machine 850 is a four (4) printable level machine having at least one grayscale or multi-level print head 856. In other embodiments, digital printing machine 850 may be more or less than a four (4) printable level machine. Raster image processor 800 generally comprises a computing device 802, a memory device 804 connected with computing device 802, an interpretation module 806 stored on memory device 804, a rendering module 808 stored on memory device 804 adapted to produce an unscreened raster image file 810, and a screening module 812 adapted to produce a screened output bit map 814. Computing device 802 may be one or more of any type of presently known or futurely developed computational processing device, including but not limited, to central processing units, microprocessors, and graphic processing units. Memory device 804 may be any type of memory device capable of storing computer instructions or code. Interpretation module 806 comprises a set of well known computer instructions or code stored on memory device 804 to interpret input file 80 describing the page (not shown) to be printed. Rendering module 808 comprises a set of well known computer instructions or code stored on memory device 804 to produce unscreened raster image file 810 specifying a continuous tone value for a first, second, third, and fourth colorant (CMYK) value in the range of 0-1023 (in the case of a 10 bit tone) for each printable position on the page (not shown). As will be described herein, screening module 812 comprises a plurality of instructions to convert each of the continuous tone values to a four (4) level output bit map 814, namely, a tone value of 0, 1, 2 or 3 in a manner that significantly reduces contour artifacts and is easily, accurately, and precisely compensated. The term "module" means computer instructions or code that may be implemented in software or hardware. Such computer instructions or code may be programmed in any presently or futurely developed programming language such as C or C++for most types of computing devices and CUDA® for NVIDIA® graphic processing units. As will be described more fully herein, screening module 812 may be implemented as software stored on memory device 804 or discrete circuit hardware directly connected with computing device 802 and/or digital printing machine 850.

Figure 9:
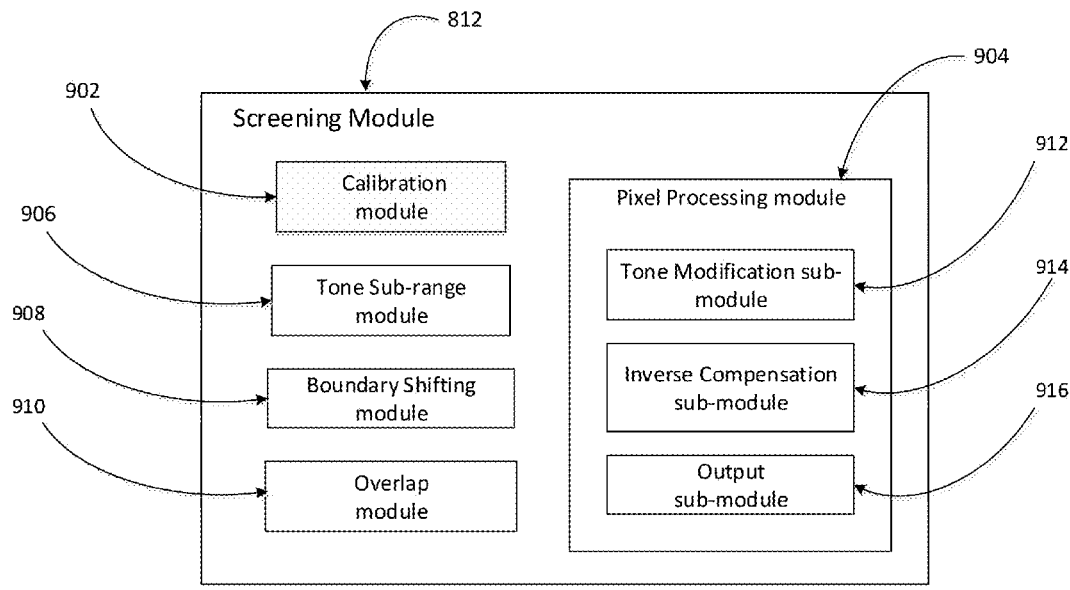
FIG. 9 is a high level block diagram showing the Screening Module according to the present invention comprising a Calibration Module and a Pixel Processing Module comprising a Tone Sub-range sub-module, a Boundary Shifting sub-module, an Overlap sub-module, a Tone Modification sub-module, and an Output sub-module.

Referring to FIG. 9, screening module 812 generally comprises a calibration module 902, a tone sub-range module 906, a boundary shifting module 908, and a pixel processing module 904 comprising a tone modification sub-module 912, an inverse compensation sub-module 914, and an output sub-module 916. In another embodiment of the invention, screening module 812 may further comprise an overlap module 910.

Figure 10:
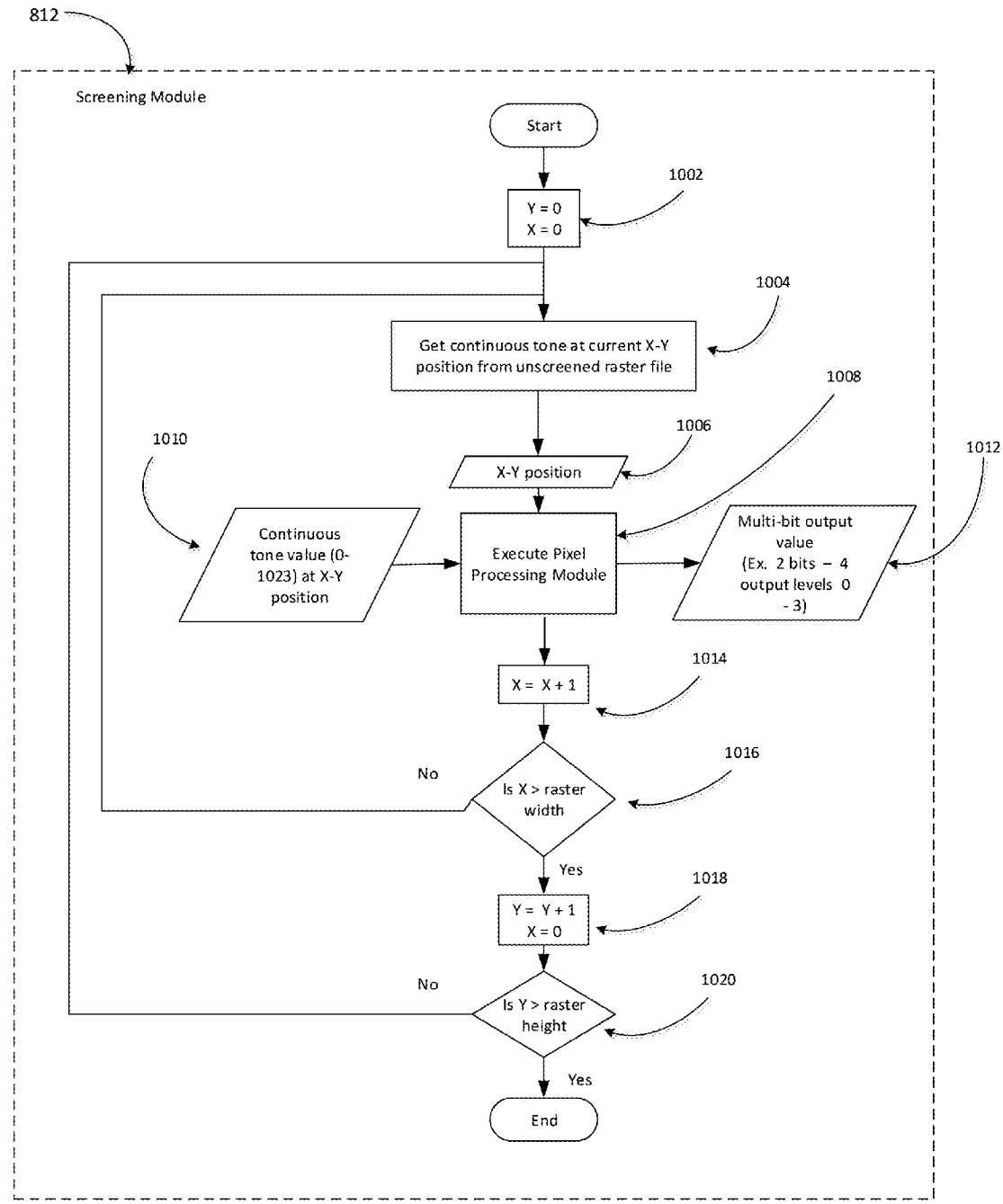
FIG. 10 is a high level flow chart showing the operation of the Screening Module according to the present invention.

Referring to FIG. 10, a high level flow chart shows the process of screening module 812 for digital printing machine 850 (FIG. 8). In this example, input file 810 from rendering module 808 may be either a composite file containing all colorants or separate files one for each colorant.

As indicated by step 1002, screening module 812 initializes variables X and Y to zero. As indicated by step 1004, screening module 812 is configured to obtain the continuous tone value 1010 for the current X-Y position 1006. As indicated by step 1008, continuous tone value 1010 is processed by pixel processing module 1008 to produced a multi bit output value 1012 for X-Y position 1006. For example, a value of 575 from a 10 bit continuous tone range of input file 810 from rendering module 808 at X-Y position 1006 is processed by pixel processing module 904 to generate a two bit output 1012 of values 0, 1, 2 or 3. As indicated by step 1014, position X is incremented to point to the next pixel to the right. As indicated by step 1016, screening module 812 determines if the rightmost limit of X exceeds the raster width. If not, control is returned where the next X-Y position is processed by pixel processing module 904 to produce the next two bit output 1012. If the rightmost limit of X exceeds the raster width then, as indicated by step 1018, screening module 812 sets the position of X to the left beginning of the next line Y. As indicated by step 1020, screening module 812 is configured to determine if the last line Y has been processed and if so, ends execution of the module. If not, control is returned where the next X-Y position is processed by pixel processing module 904 to produce the next two bit output 1012.

Figure 11:
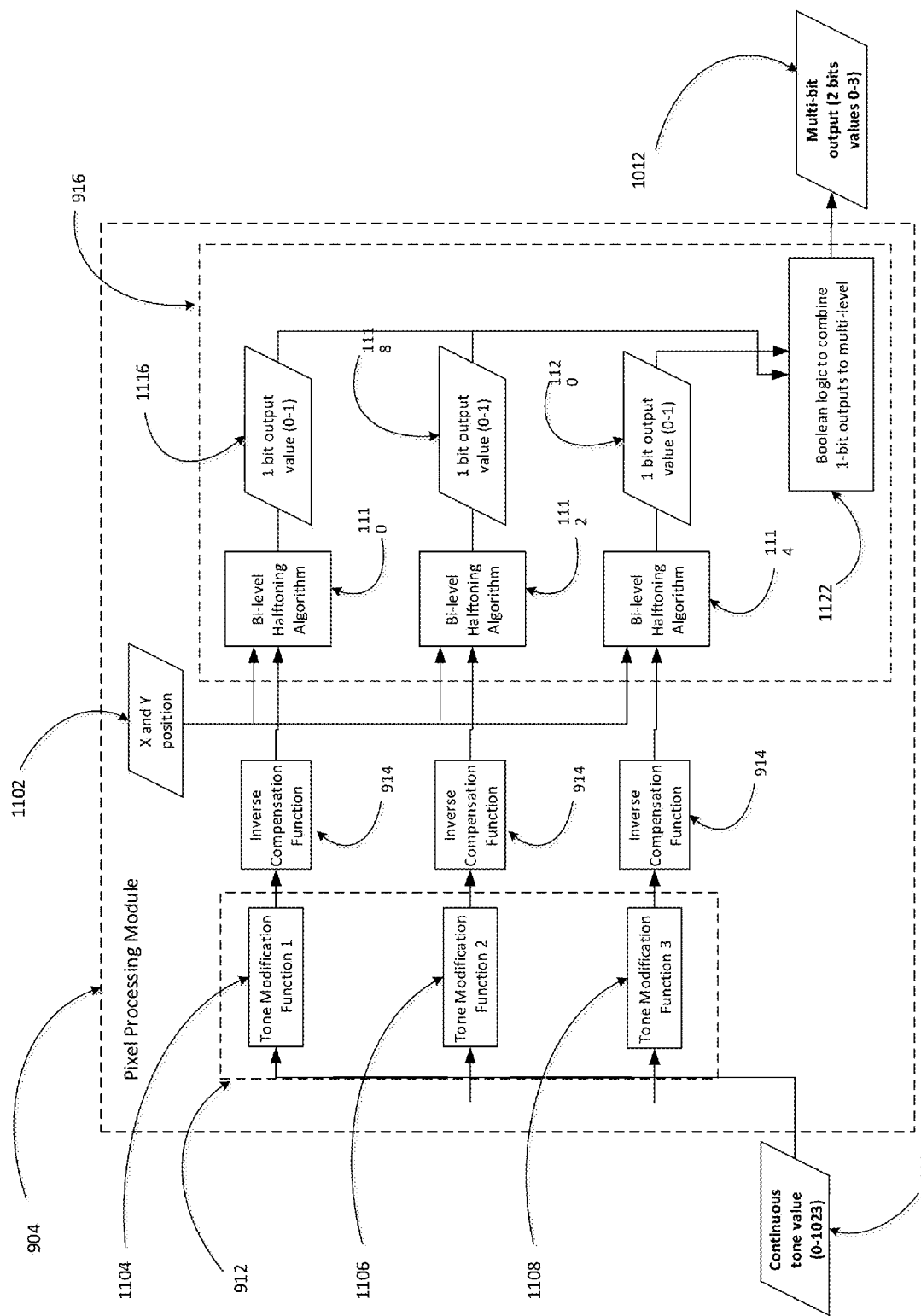
FIG. 11 is a high level flow chart showing the operation of the pixel processing module of the screening module according to the present invention.

Referring to FIG. 11, where a high level flow chart shows the operation of pixel processing module 904 according to the present invention for a four-level digital printing machine 850. As indicated by a block 1102, a current X and Y printable position is input to each of bi-level half-toning algorithms 1110, 1112, and 1114 of output sub-module 916. The continuous tone value corresponding to the current X and Y position from input file 1010, for each of the four (4) colorants, is the input value to each of first, second, and third tone modification functions 1104, 1106, and 1108 of tone modification sub-module 912. The output from first, second, and third tone modification functions 1104, 1106, and 1108 are then each passed through an inverse compensation function appropriate for that colorant and dot size from the Inverse Compensation module 914. The outputs of the compensation functions are the inputs to bi-level half-toning algorithms 1110, 1112, and 1114, respectively, that generate three one bit output values 1116, 1118, and 1120, each having a value of 0 or 1. As indicated by block 1122, these three one bit output values are combined by Boolean logic to produce a single 2-bit output value 1012 (0, 1, 2 or 3) that is stored in output bit map 814 (FIG. 8).

Figure 12:
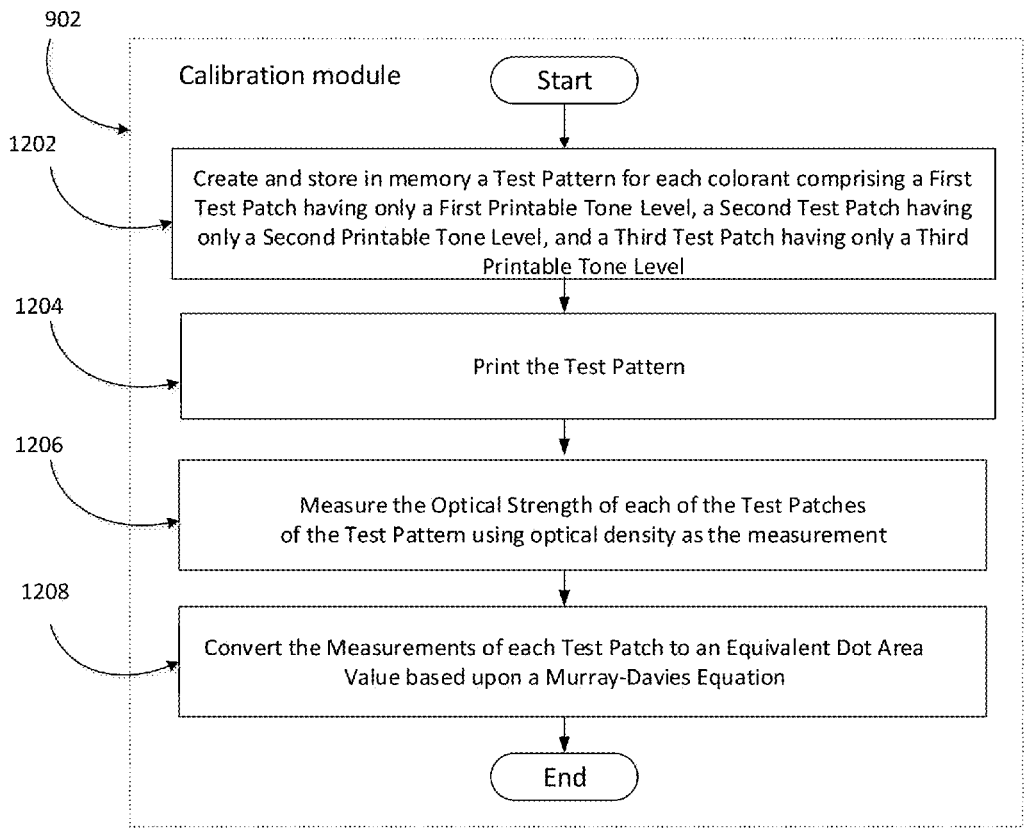
FIG. 12 is a high level flow chart showing the operation of the calibration module of the screening module.

Referring to FIG. 12, a high level flow chart shows the process of calibration module 902. Calibration module 902 comprises a set of instructions 1202 to create a test pattern for each colorant comprising a first test patch having only a first printable tone level (for example, only small size dots), a second test patch having only a second printable tone level (for example, only medium size dots), and a third test patch having only a third printable tone level (for example, only large size dots). Calibration module 902 further comprises a set of instructions 1204 to print the test patterns for each colorant. Calibration module 902 further comprises a set of instructions 1206 to measure the optical strength of each of the first, second, and third test patches of each colorant of test pattern 1402 using optical density as the measurement and to store these values in digital press profile 852 (FIGS. 8 and 15) for use as needed. Calibration module 902 further comprises a set of instructions 1208 to convert the measurements of each of the first, second, and third test patches to an equivalent dot area value using a well known Murray-Davies equation (www.xrite.com/documents/apps/public/ whitepapers/Ga00005a.pdf) that converts from optical density to percentage dot area as follows:

$$\text{percentage dot area } (0\text{-}100\%) = \frac{1 - 10^{\wedge}(-Dtone)}{1 - 10^{\wedge}(-D\max)} \times 100$$

where Dmax represents the measured maximum optical density, and Dtone represents the measured density of a patch for which to produce the percentage dot area.

Example densities: 0.0 0.479 1.08 2.5---->0 67% 92% 100%

Example2 densities 0.0 0.1752 0.4735 2.5---->0 33% 67% 100%

Figure 13:
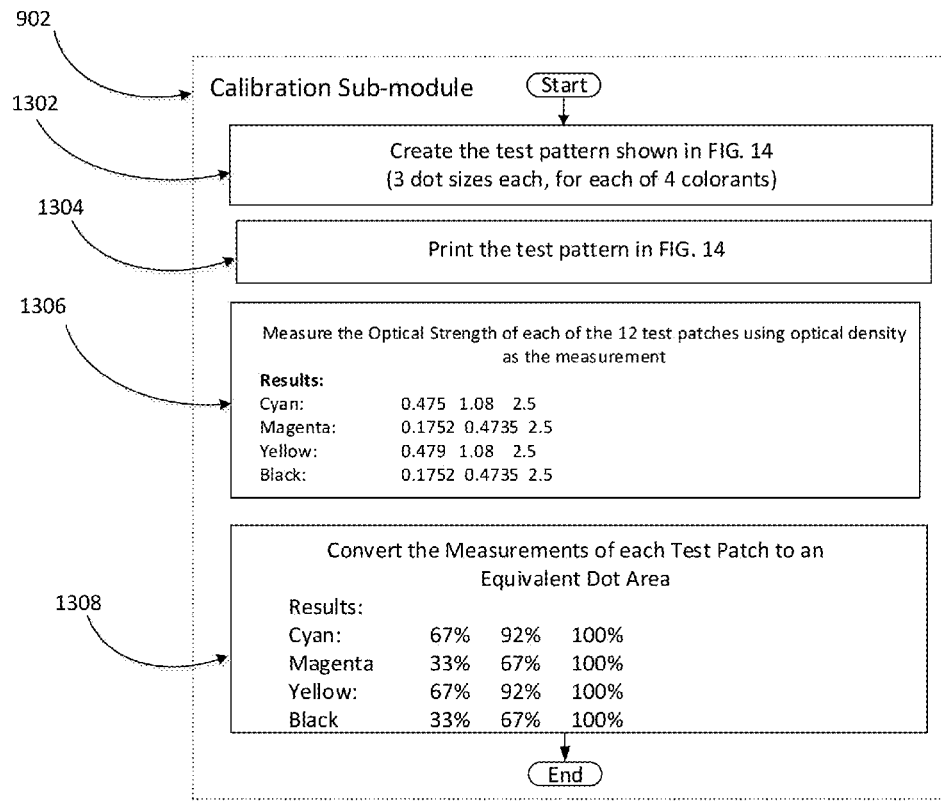
FIG. 13 is a high level flow chart showing an example of the process of the Calibration Sub-module.
Figure 14:
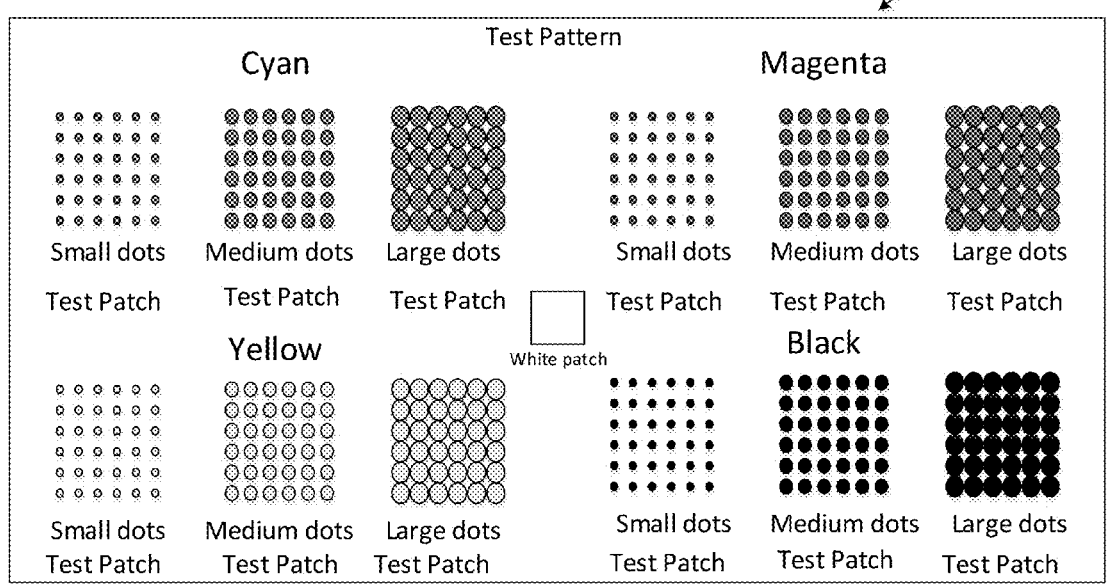
FIG. 14 illustrates a test pattern of the calibration module.

Referring to FIGS. 13 and 14, where an example is given for the process of calibration module 902. As indicated by block 1302, calibration module 902 comprises a set of instructions to create a test pattern having twelve test patches as shown in FIG. 14 (3 printable levels or dot sizes each, for each of the four colorants, CMYK). The three (3) dot sizes may be small, medium, and large dots or other dot sizes. Calibration module 902 further comprises a set of instructions 1304 to print the test pattern. Calibration module 902 further comprises a set of instructions 1306 to measure the optical strength of each of the twelve test patches using optical density as the measurement. In the example shown, for the colorant Cyan, the measured density is 0.475 for the first printable tone level of digital printing machine 850 (for example, small size dots); 1.08 for the second printable tone level of digital printing machine 850 (for example, medium size dots), and 2.5 for the third printable tone level of digital printing machine 850 (for example, large size dots). Also shown are optical densities values for the colorants Magenta, Yellow, and Black. The optical density for each of the first, second, and third test patches of each colorant is converted to an equivalent dot area using the Murray-Davies equation. In the example shown, Cyan has an equivalent dot area of 67% for the first printable tone level (for example small size dots), 92% for the second printable tone level (for example, medium size dots), and 100% for the third printable tone level (for example, large size dots). The optical density is measured using a well known densitometer such as the X-Rite eXact available from X-Rite, Inc., 4300 44th St. SE, Grand Rapids, Mich. 49512 U.S.A. (www.xrite.com), or a similar device, that may be part of digital printing machine 850 or a separate machine connected with raster processor 800 and digital printing machine 850.

Figure 15:
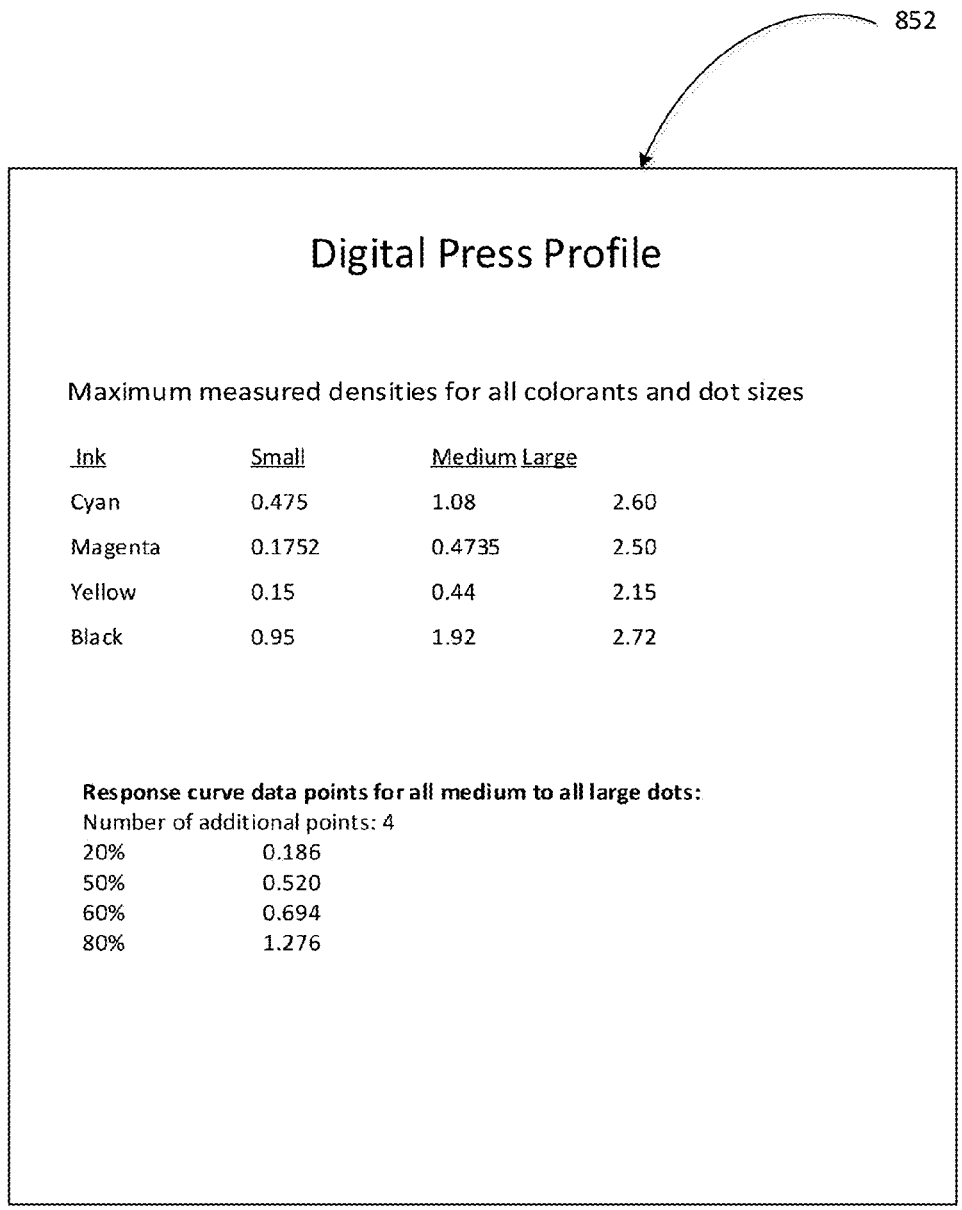
FIG. 15 illustrates a digital press profile according to the present invention.

Referring to FIG. 15, where digital press profile 852 (FIG. 8) is further illustrated. Data stored in Digital Press Profile 1502 includes maximum measured densities for all colorants and dot sizes. It also includes curve data points when they are used.

Figure 16:
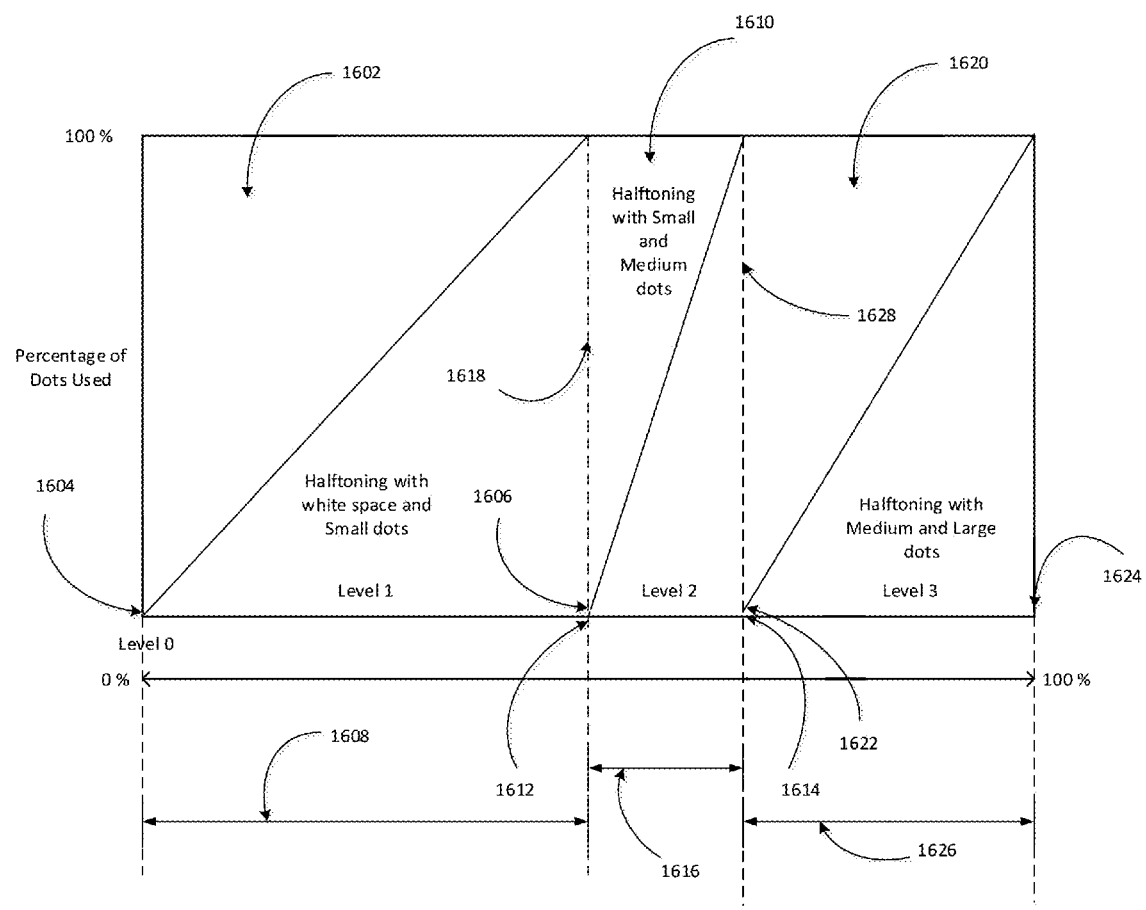
FIG. 16 illustrates a full tone range for a first colorant comprising three tonal sub-ranges corresponding to a first printable tone level (for example, a small size dot), a second printable tone level (for example, a medium size dot), and a third printable tone level (for example, a large size dot), respectively, with the tonal sub-ranges shifted.

Referring to FIG. 16, tone sub-range module 906 (FIG. 9) comprises a first set of computer instructions configured to create and store a first tonal sub-range 1602 corresponding substantially to increasing percentages of the first printable tone level of digital printing machine 850 for each of the four colorants. Tone sub-range module 906 further comprises a second set of computer instructions to create and store a second tonal sub-range 1610 corresponding substantially to increasing percentages of the second printable tone level of digital printing machine 850 for each of the four colorants. Tone sub-range module 906 further comprises a third set of computer instructions to create and store a third tonal sub-range 1620 corresponding substantially to increasing percentages of the third printable tone level of digital printing machine 850 for each of the four colorants. The sub-ranges may and probably will be different for each of the colorants. First tonal sub-range 1602 comprises a beginning boundary tone value 1604 and an ending boundary tone value 1606 defining a first tone range span 1608. Second tonal sub-range 1610 comprises a beginning boundary tone value 1612 and an ending boundary tone value 1614 defining a second tone range span 1616 and a first transition tone value 1618 to be the value of both ending boundary tone value 1606 of first tonal sub-range 1602 and beginning boundary tone value 1612 of second tonal sub-range 1610. Third tonal sub-range 1620 comprises a beginning boundary tone value 1622 and an ending boundary tone value 1624 defining a third tone range span 1626 and a second transition tone value 1628 to be the value of both ending boundary tone value 1614 of second tonal sub-range 1610 and beginning boundary tone value 1622 of third tonal sub-range 1620.

With continued reference to FIG. 16, boundary shifting module 908 generally comprises a set of instructions to shift the positions of first and/or second transition tone values 1618 and 1628 depending upon the calibration data of digital printing machine 850 from calibration module 902 stored in digital press profile 852. For example, boundary shifting module 908 may comprise a set of instructions that shift the position of first transition tone value 1618 so that, for example, first tone range span 1608 (size of first tonal sub-range 1602) is different from second tone range span 1616 (size of second tonal sub-range 1610). By way of further example, boundary shifting module 908 may comprise a set of instructions that shift the position of second transition tone value 1628 so that second tone range span 1616 (size of second tonal sub-range 1610) is different from third tone range span 1626 (size of third tonal sub-range 1620). Boundary shifting module 908 further comprises a set of instructions to set the first transition tone value 1618, for a given colorant, using the measured density of the patch of small size dots for the colorant and the highest measured optical density of the test patch of large size dots for the colorant as the Dmax value used in the Murray-Davies equation. Boundary shifting module 908 further comprises a set of instructions to set the second transition tone value 1628, for a given colorant, using the measured density of the patch of medium size dots for the colorant and the highest measured optical density of the test patch of large size dots for the colorant as the Dmax value used in the Murray-Davies equation.

Figure 17A:
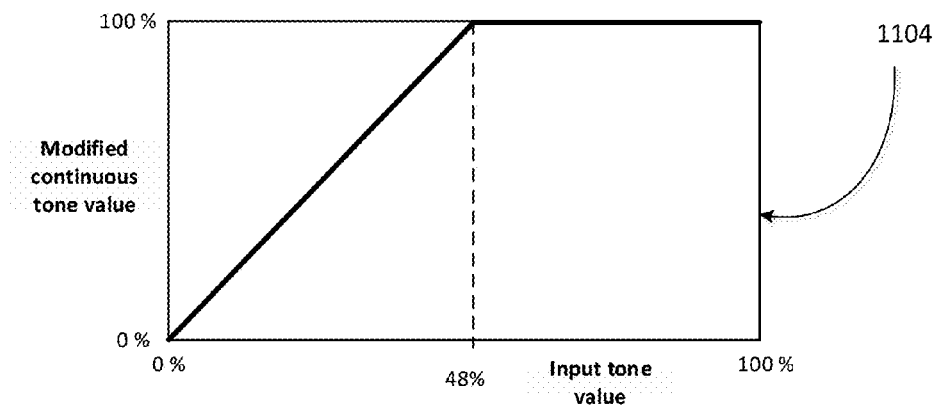
FIG. 17A illustrates a tone modification function for a first printable tone level (for example, a small size dot) after transition point shifting according to the present invention.
Figure 17B:
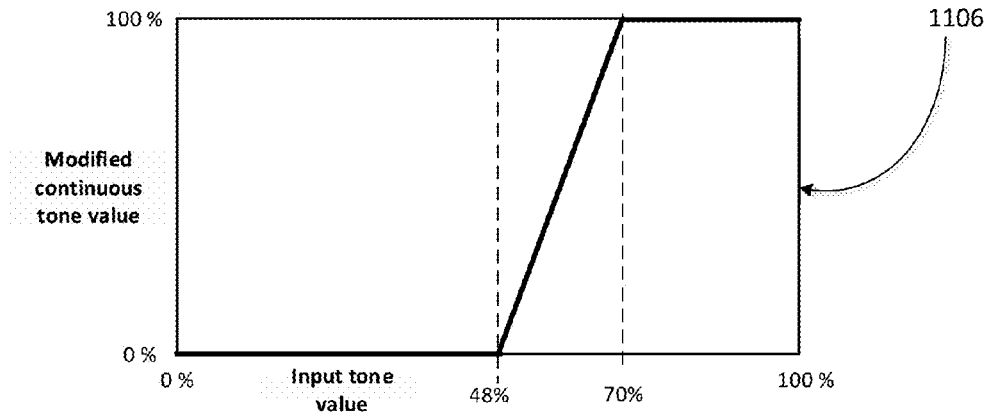
FIG. 17B illustrates a tone modification function for a second printable tone level (for example, a medium size dot) after transition point shifting according to the present invention.
Figure 17C:
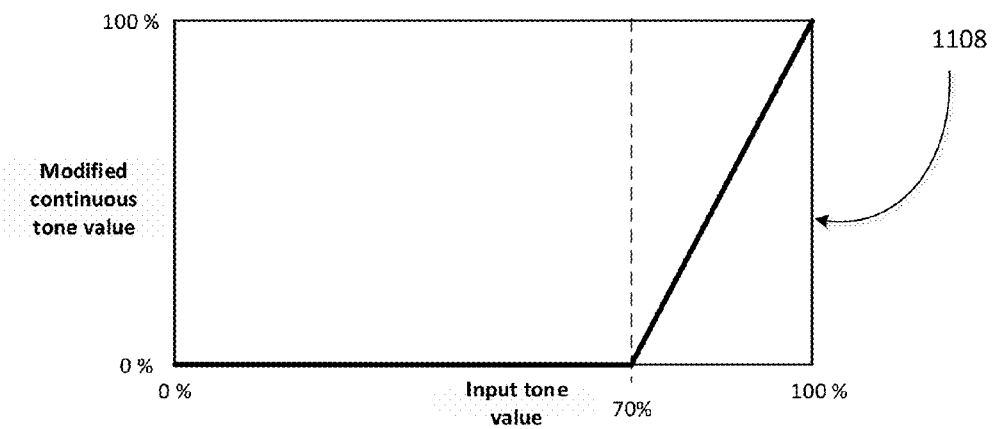
FIG. 17C illustrates a tone modification function for a third printable tone level (for example, a large size dot) after transition point shifting according to the present invention.

Referring to FIGS. 17A-17C, where the process of tone modification sub-module 912 and tone modifications 1104, 1106 and 1108 (FIG. 11) is illustrated for an example where first and second transition tone values 1618 and 1628 (FIG. 16) are set to 48% and 70%, respectively, by boundary shifting module 908. As shown by FIG. 17A, tone modification sub-module 912 comprises a set of instructions to create or produce first tone modification function 1104 for the first printable tone level that is used for each colorant (CMYK). For example, an input tone value of 24% would be modified to a continuous tone value of 50% and an input tone value of 48% or higher would be modified to a value of 100%. As shown by FIG. 17B, tone modification sub-module 912 further comprises a set of instructions to create or produce second tone modification function 1106 for a second printable tone level that is used for each colorant (CMYK). For example, an input tone value of 48% or less would be modified to a value of 0%, input tone values of 70% or higher would be modified to values of 100% and input values between 48% and 70% would be modified to values between 0% and 100%. As shown by FIG. 17C, tone modification sub-module 912 comprises a set of instructions to produce a third tone modification function 1108 for a third printable tone level that is used for each colorant (CMYK). For example, an input tone value of 70% or lower would be modified to a continuous tone value of 0% and an input tone value of greater than 70% would be modified to values between 0% and 100%.

Figure 18:
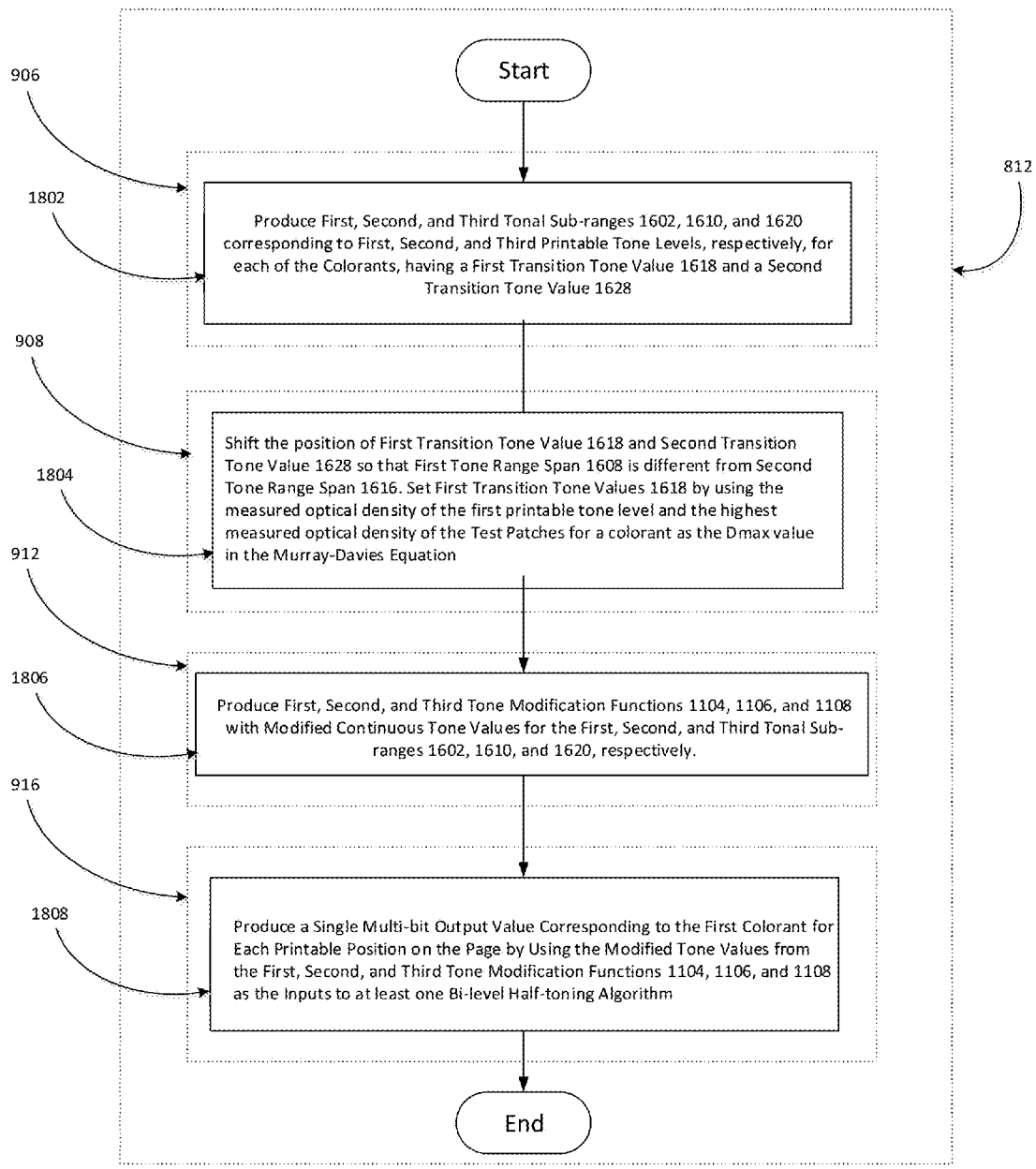
FIG. 18 is a high level flow chart showing the process of raster image processor according to the present invention.

Referring to FIG. 18, where a high level flow chart shows a method of screening module 812. As indicated by block 1802, tone sub-range module 906 comprises a step of producing for each colorant, first, second, and third tonal sub-ranges corresponding to the first, second, and third printable tone levels, respectively, having first and second transition tone values. As indicated by block 1804, boundary shifting module 908 comprises a step of shifting the position of first transition tone value 1618 and second transition tone value 1628 so that the first tone range span is different from the second tone range span, and to set first and second transition tone values 1618 and 1628, for each colorant, by using the highest measured optical density of the test patches of test pattern 1402 (FIG. 14) of digital printing machine 850 (FIG. 8) for the Dmax value used in the Murray-Davies Equation. As indicated by block 1806, tone modification sub-module 912 comprises a step of producing first, second, and third tone modification functions for the first, second, and third tonal sub-ranges, respectively. As indicated by block 1808, output sub-module 916 comprises a step of producing a single multi-bit output value corresponding to each colorant for each printable position on the page by using the modified tone value of the first, second, and third tone modification functions as the inputs to a bi-level half-toning algorithm.

Figure 19:
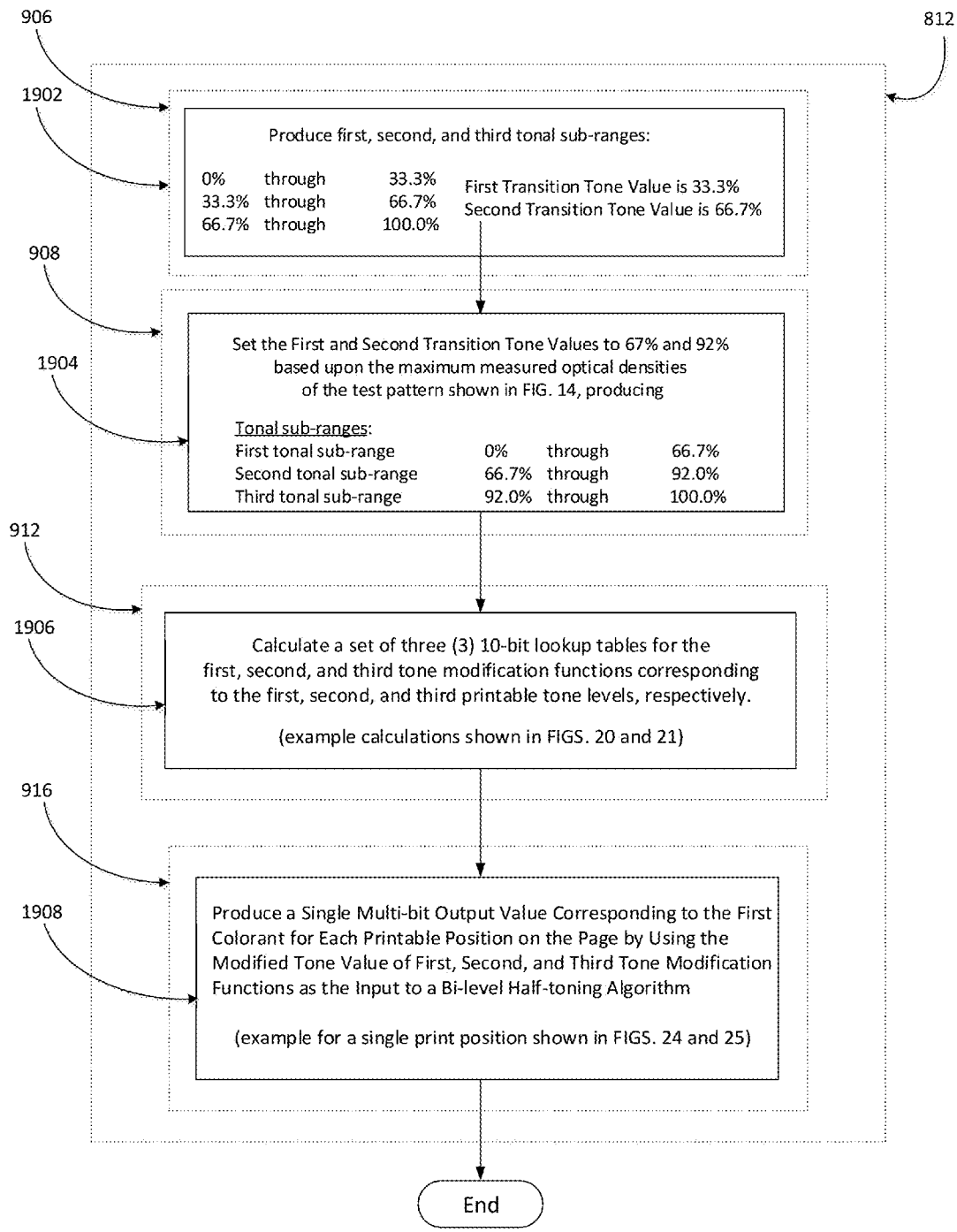
FIG. 19 is a flow chart showing the operation of the Screening Module according to the present invention using example measurements.

Referring to FIG. 19, where an example of the method of screening module 812 is illustrated. As indicated by a block 1902, tone sub-range module 906 comprises a step of creating or producing first, second, and third tonal sub-ranges 1602, 1610, and 1620 (FIG. 16), initially equally spaced, whose beginning and ending boundary tone value pairs are respectively, 0% and 33.3%, 33.3% and 66.7%, and 66.7% and 100.0%. First and second transition tone values 1618 and 1628 are thus initially 33.3% and 66.7%, respectively. As indicated by block 1904, boundary shifting module 908 comprises a step of setting first and second transition tone values 1618 and 1628 to 67% and 92% based on the measurements shown in digital press profile 852 (FIG. 15) of 0.475 and 1.08 for the test patches for small and medium dots, respectively, using the Murray-Davies with a DMax value of 2.5, shown by instructions 1308 of calibration module 902 (FIG. 13). As indicated by a block 1906, tone modification sub-module 912 comprises a step of creating the first, second, and third tone modification functions stored in the form of three 10-bit lookup tables. This process will be shown in two more levels of detail in FIGS. 20 and 21, containing a descriptive flowchart and pseudo-code using example measurements, respectively. As indicated by a block 1908, output sub-module 916 comprises a step of producing a single multi-bit output value corresponding to the first colorant for each printable position on the page by using the modified tone values of first, second, and third tone modification functions as the input to a bi-level half-toning algorithm. This process will be shown in two more levels of detail in FIGS. 24 and 25, containing a descriptive flowchart and pseudo-code using example measurements, respectively. The effect of this step in block 1908, when looked at for the whole image sets of small, medium, and large 1-bit data as a whole is to merge the images together as one would a set of image masks one on top of another. Where there is a mask bit value of 1, that data and level is used; where there is a 0 value, whatever data on the lower mask levels is allowed to appear.

Figure 20:
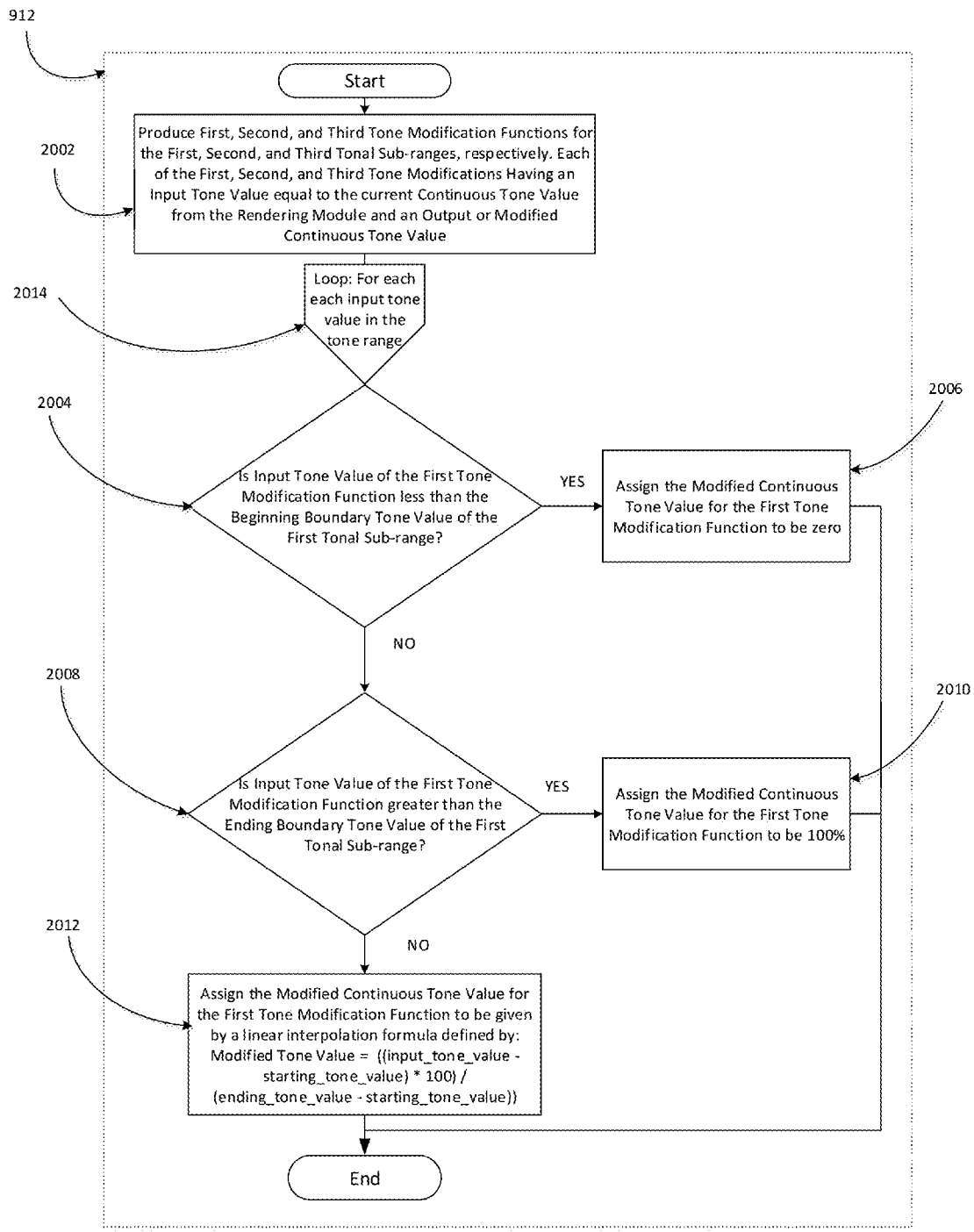
FIG. 20 is a flow chart showing the process of the tone modification sub-module of the pixel processing module.

Referring to FIG. 20, where the process of tone modification sub-module 912 is shown in greater detail with example calculations. Step 2002 summarizes the function of creating or producing the tone modification functions and their inputs and outputs as previously described in connection with FIGS. 17A-17C. Step 2014 marks the start of loops or iterations describing the calculations to produce a tone modification function's particular modified tone value for a specific input value. As indicated by a decisional block 2004, tone modification sub-module 912 comprises a set of instructions to determine if the input tone value of the first tone modification function is less than the beginning boundary tone value of the first tonal sub-range. If so, control is passed to a block 2006 where tone modification sub-module 912 comprises a set of instructions to assign the continuous modified tone value to be the value of zero percent (0%). If not, control is passed to a decisional block 2008 where tone modification sub-module 912 comprises a set of instructions to determine if the input tone value of the first tone modification function is greater than the ending boundary tone value of the first tonal sub-range. If so, control is passed to a block 2010 where tone modification sub-module 912 comprises a set of instructions to assign the continuous modified tone value to be the value of one hundred percent (100%). If not, control is passed to block 2012, where tone modification sub-module 912 comprises a set of instructions to assign the continuous modified tone values for input tone values that fall between the first tonal sub-range's beginning and ending boundary tone values. Conventional linear interpolation is used, mapping the within-boundaries input tone range to the full tone range 0 through 100% with values given by a linear interpolation formula defined by: output tone value=((input_tone_value−starting_tone_value)*100)/(ending_tone_value−starting_tone_value)).

Figure 21:
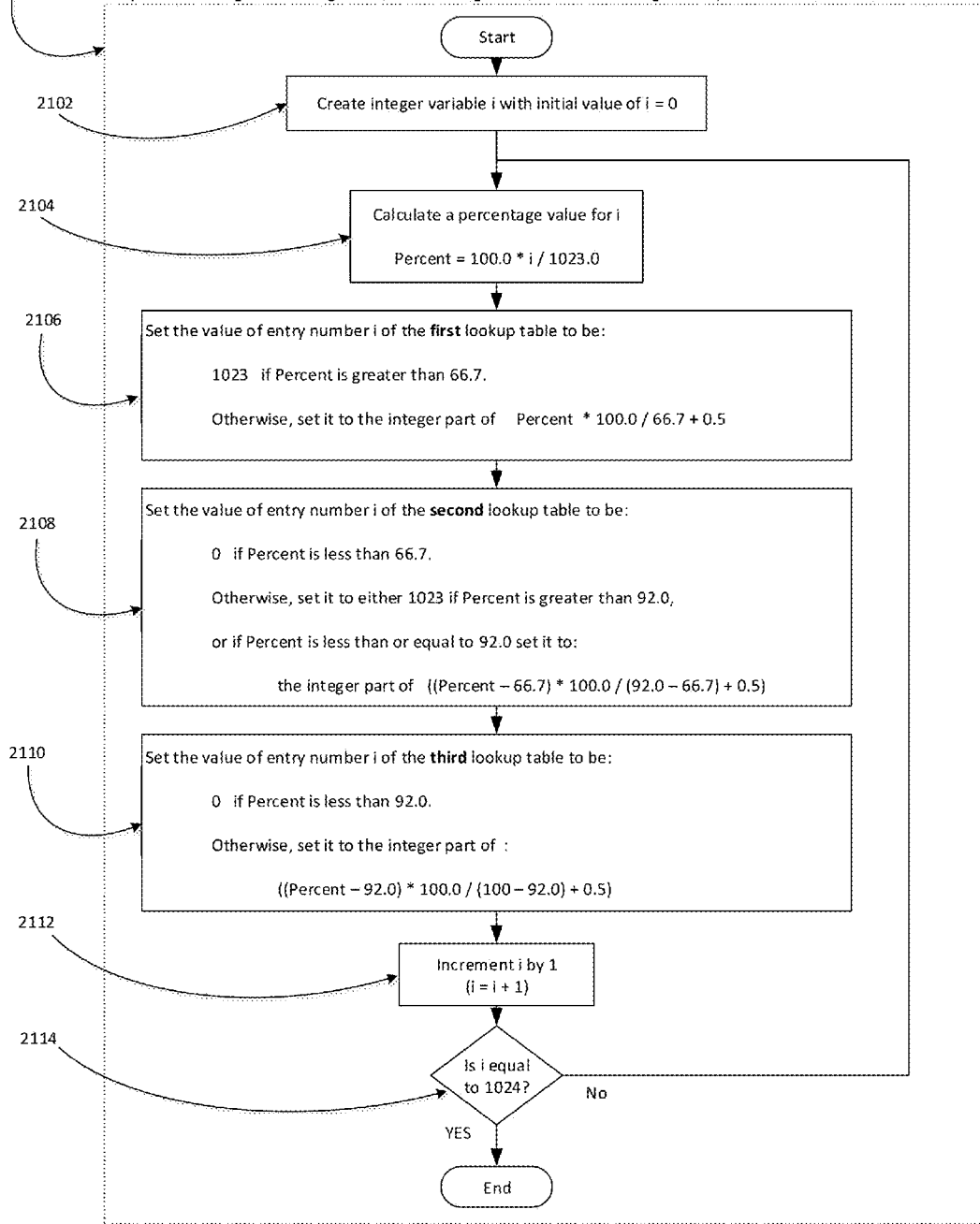
FIG. 21 is a flow chart showing an example of the process of the tone modification sub-module with example calculations.

Referring to FIG. 21, where example pseudo code is shown to calculate the 1024 values for the lookup tables for each of the three tone modification functions. A single loop is used for all three tables. The tonal sub-ranges are for the Cyan colorant shifted based on the measured tone densities. Step 2102 creates an iterating integer index, "i". Step 2104 calculates a floating point percentage value in the range 0 through 100, based on the value of "i". Step 2106 sets the value for the ith entry in the first or small dot lookup table to be either 1023, indicative of 100%, or a fractionally lower value depending on the floating point percentage. Step 2108 sets the value for the ith entry in the second or medium dot lookup table to be one of the values 0, 1023, or a fractionally intermediate value between 0 and 1023, depending on whether the floating point percentage is below, above, or within the tonal sub-range, respectively. Step 2110 sets the value for the ith entry of the lookup table for the third or large dot lookup table to be either 0 or a fractionally intermediate value between 0 and 1023, depending on whether the floating point percentage is below or within the tonal sub-range. Step 2112 increments i for the next lookup table entries. Step 2114 checks for completion by seeing if i has reached 1024 indicating that all the entries of indices 0 through 1023 have been calculated.

Referring to FIG. 22, patches 2202, 2204, and 2206 each show a printed patch five (5) printing dots wide by six (6) printing dots high, of dots of increasing sizes and overlap. One dot is shown missing in each of patches 2204, 2204, and 2206. The amount of dot area missing decreases with increasing dot size. As 100% coverage is reached there is diminishing increase in dot area. This non-linear effect is similar to traditional "dot gain".

Referring to FIG. 23, a graph illustrates compensation for the non-linear response of increasing tone value and a conventional inverse function used to compensate for it. For example for input tone values in the proximity of 50% the output tone values as points on curve 2302 are in the proximity of 75%. Compensating for this dot gain, when the system requires an output tone value of 50%, the necessary input tone needed is therefore less than 50% or about 20% as shown on inverse function 2304.

Figure 24:
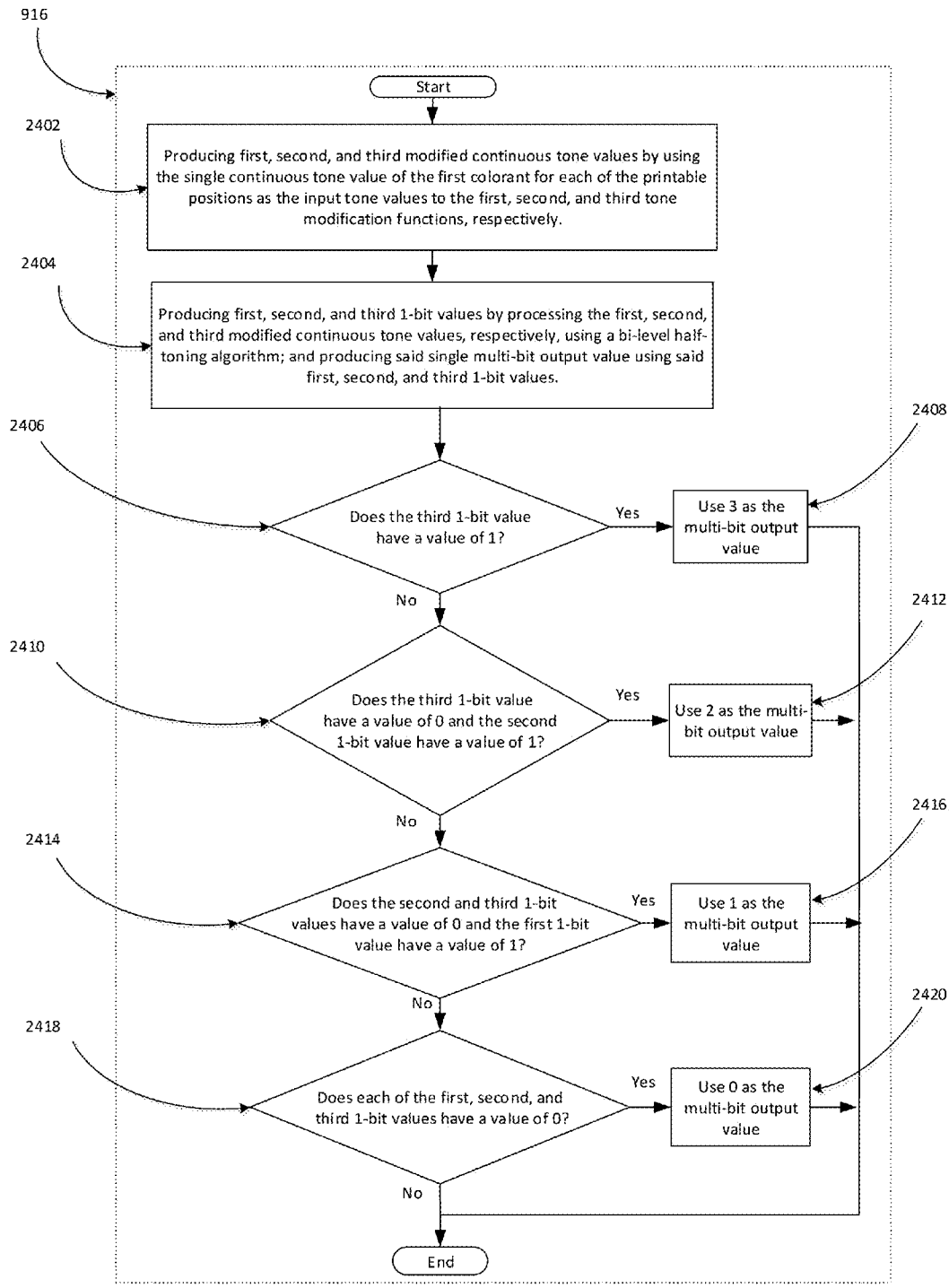
FIG. 24 is a flow chart showing the operation of the pixel processing module.

Referring to FIG. 24, where a high level flow chart shows the operation of output sub-module 916. Step 2402 gets modified continuous tone values produced from the output of the tone modification functions 1104, 1106, and 1108. Step 2404 processes the modified continuous tone values with bi-level half-toning algorithms producing three 1-bit values. Decision blocks 2406, 2410, 2414, and 2418 check the values of the three 1-bit values to select among multi-bit output values 3, 2, 1, and 0 via statement blocks 2408, 2412, 2416, and 2420 respectively.

Figure 25:
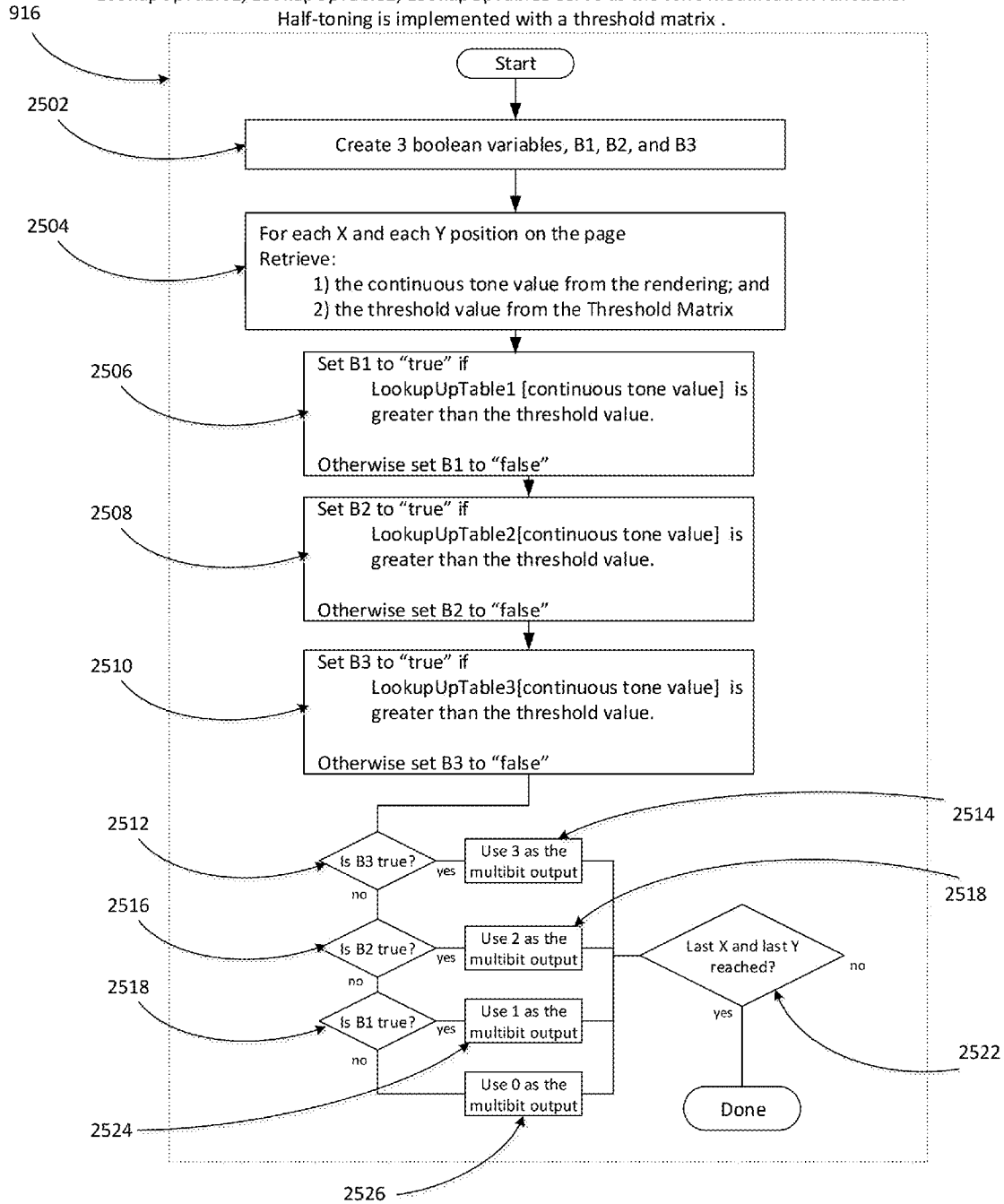
FIG. 25 is a flow chart of example pseudo code showing the operation of the pixel processing module.

Referring to FIG. 25, where a detailed pseudo code flowchart of pixel processing module 904 is shown. Step 2502 creates three Boolean variables, B1, B2, and B3, for small, medium, and large dots, respectively. For each pixel on the page Step 2504 retrieves the corresponding continuous tone value from the rendering and the corresponding threshold matrix value from the screening threshold matrix. Step 2506 performs tone modification 1 by selecting a value from LookUpTable1 based on the continuous tone value from the rendering. Step 2506 sets the value of Boolean variable B1 to true if the looked up value is greater than the threshold matrix value. Otherwise Step 2506 sets the value of B1 to false. Steps 2508 and 2510 similarly set Boolean variable B2 and B3 using LookUpTable2 and LookUpTable3, respectively, and the continuous tone value from the rendering. Decision block 2512 and statement 2514 select 3 as the multi-bit output value if B3 is true. If B3 is false, decision block 2516 and statement 2518 select 2 as the multi-bit output value if B2 is true. If B2 is false, decision block 2518 and statement 2524 select 1 as the multi-bit output value if B1 is true. If B1 is false, statement 2526 selects 0 as the multi-bit output value. Decision block 2522 checks to see if the X-Y position just operated on is the last one on the page and either ends the module if the X-Y position is the last one on the page, or sets the control flow back to step 2504 to proceed with the next pixel to be processed.

Figure 26:
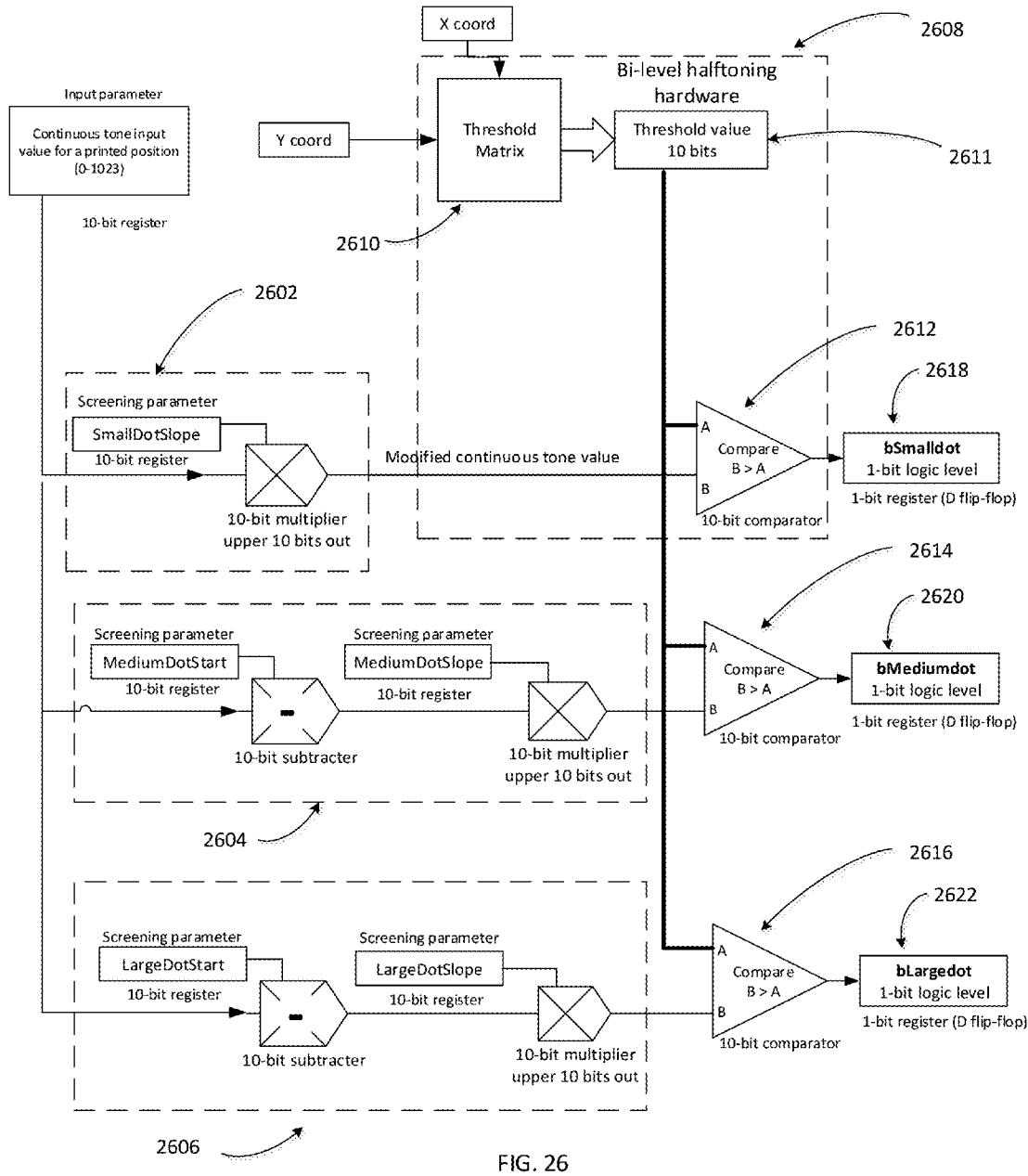
FIG. 26 is a high level schematic of the pixel processing module of the screening module shown in a hardware implementation for discrete logic, ASIC chips, FPGAs, etc, with threshold matrix or supercell type of screening.

Referring to FIG. 26, where a schematic for pixel processing module 904 is shown in a hardware implementation suitable for threshold matrix half-tone screening. Blocks 2602, 2604, and 2606 show first, second, and third tone modification functions for the first, second, and third printable tone levels, respectively (for example, small, medium, and large dots). Components used in the hardware for tone modification functions 1104, 1106, and 1108 include 10-bit registers to hold screening parameters, 10-bit subtractors, and 10-bit multipliers. Bi-level half-toning, shown by block 2608, comprises a threshold matrix 2610 that produces a threshold value 2611 for a given X-Y coordinate, and a comparator such as 2612 that compares the modified continuous tone value with the threshold value 2611 to determine a 1-bit output 2618 for the small size dots. Comparators 2614 and 2616 use the same threshold value 2611 to compare modified continuous tone values from Tone Modification functions 2604 and 2608 to produce 1-bit outputs 2620 and 2622 for the medium and large dots, respectively.

Figure 27:
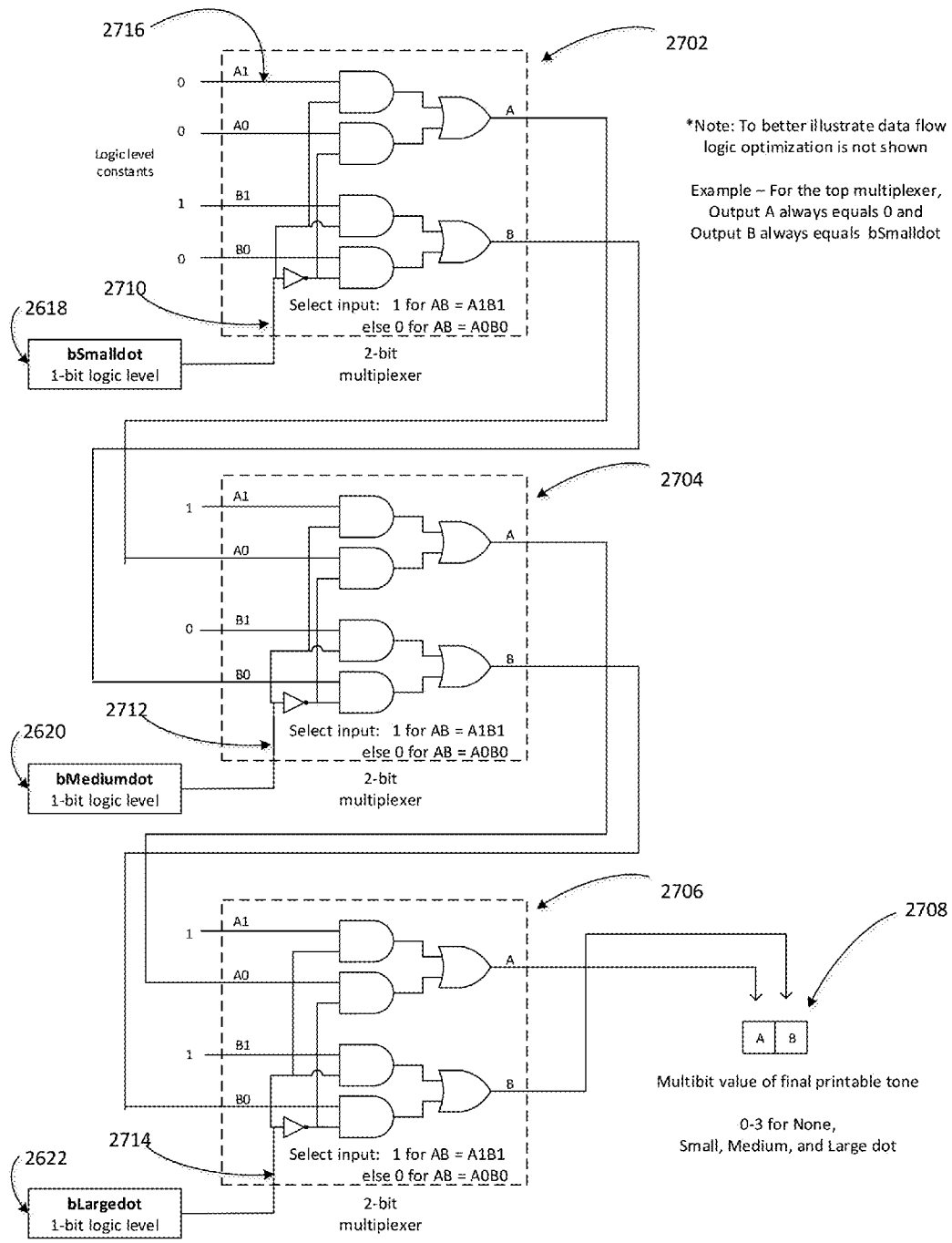
FIG. 27 is a high level schematic of the output sub-module of the screening module according to the present invention shown in a hardware implementation for discrete logic, ASIC chips, FPGAs, etc, where each output tone value is assigned a level of 0, 1, 2, or 3 corresponding to no dot, small dot, medium dot, and large dot, respectively.

Referring to FIG. 27, where a digital logic diagram is shown for producing multi-bit output 2708 from 1-bit logic levels 2618, 2620, and 2622 for small, medium, and large dots, respectively. Sections 2702, 2704, and 2706 are 2-bit multiplexers for data flow for the small, medium, and large dots, respectively. Each of 2-bit multiplexers 2702, 2704, and 2706 have as inputs selector lines 2710, 2712, and 2714, and input lines internally labeled A1, A0, B1, and B0. Each 2-bit multiplexer has two output lines internally labeled A and B. Each 2-bit multiplexer functions as a two state switch, copying the two logic levels on inputs A1 and B1 to outputs A and B if its selector line is connected to a high logic level, or copying the logic levels on inputs A0 and B0 to outputs A and B if its selector line is connected to a low logic level. Production of multi-bit output value 2708 is described as follows. If 1-bit logic level 2622 is high 2-bit multiplexer 2706 immediately copies input levels of 11 to its output levels A and B, 0b11 in binary or base 2, which is equal to a value of 3 in the common base 10 number system. This provides a value of 3 to output value 2708. If logic level 2622 is low, A0 and B0 inputs of multiplexer 2706 are selected for the output value 2708. Inputs A0 and B0 inputs of multiplexer 2706 are connected to the outputs A and B of 2-bit multiplexer 2704 and thus receive either the A1 and B1 inputs of multiplexer 2704, which have values of 1 and 0, respectively, or the outputs A and B of multiplexer 2702, depending on the logic level state 2620, the logic level for the medium dot.

With continued reference to FIG. 27, 2-bit multiplexer 2702 has its outputs A and B selected between the 2-bit values 01 from the A1 and B1 inputs or the 2-bit values 00 from the A0 and B0 inputs. In this manner the multi-bit output value 2708 is set to one of the four 2-bit binary values 00, 01, 10, or 11, depending on the 3 1-bit logic levels 2618, 2620, and 2622. The numbers 00, 01, 10, or 11 interpreted in binary (base-2) have the values 0, 1, 2, and 3 (base 10) respectively.

Figure 28:
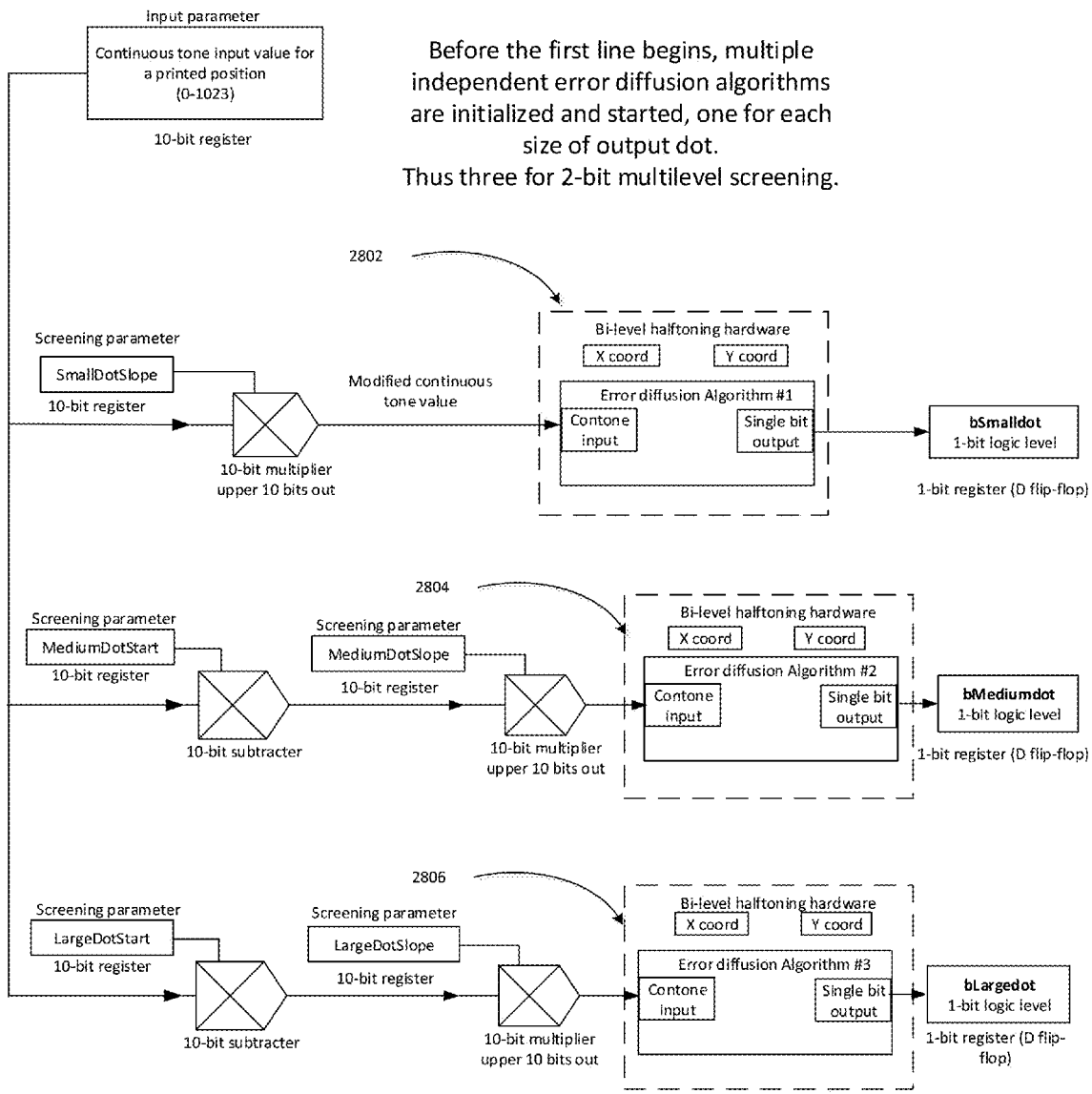
FIG. 28 is a high level schematic of the pixel processing module of the screening module shown in a hardware implementation for discrete logic, ASIC chips, FPGAs, etc, for an error diffusion type of screening.

Referring to FIG. 28, where an alternative hardware for pixel processing module 904 is implemented in a manner suitable for an error diffusion algorithm. Hardware bi-level half-toning modules 2802, 2804, 2806 are shown as implementing an error diffusion algorithm for the half-toning function. They must each be initialized at the start of page as is well known in the art. Modules 2802, 2804, 2806 operate in parallel, that is simultaneously with each other, each producing a 1-bit value for a particular dot size. These three 1-bit values are inputs to the 2-bit multiplexers (FIG. 27).

Figure 29:
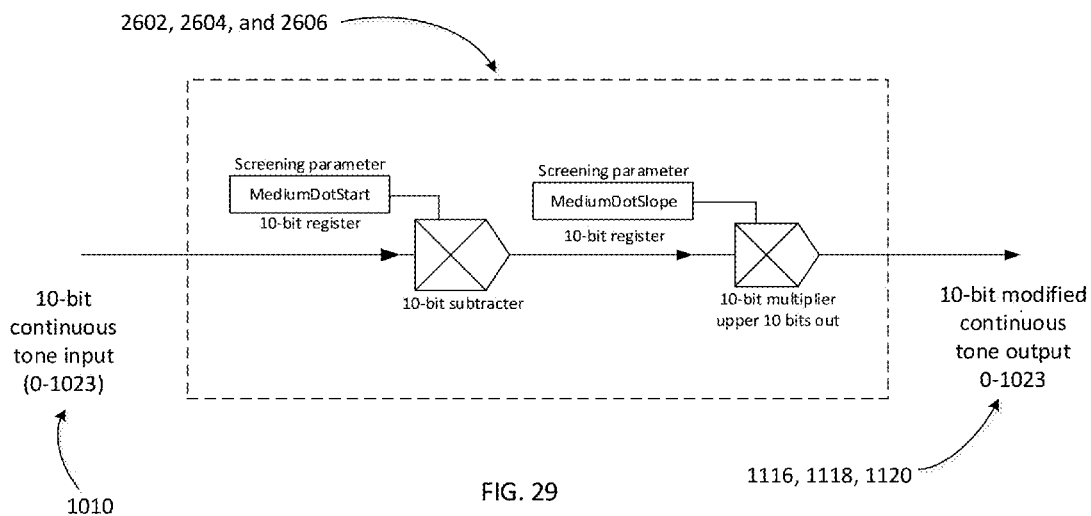
FIG. 29 is a high level schematic of one implementation of a tone modification function in hardware suitable for discrete logic, ASIC chips, FPGAs, etc.
Figure 30:
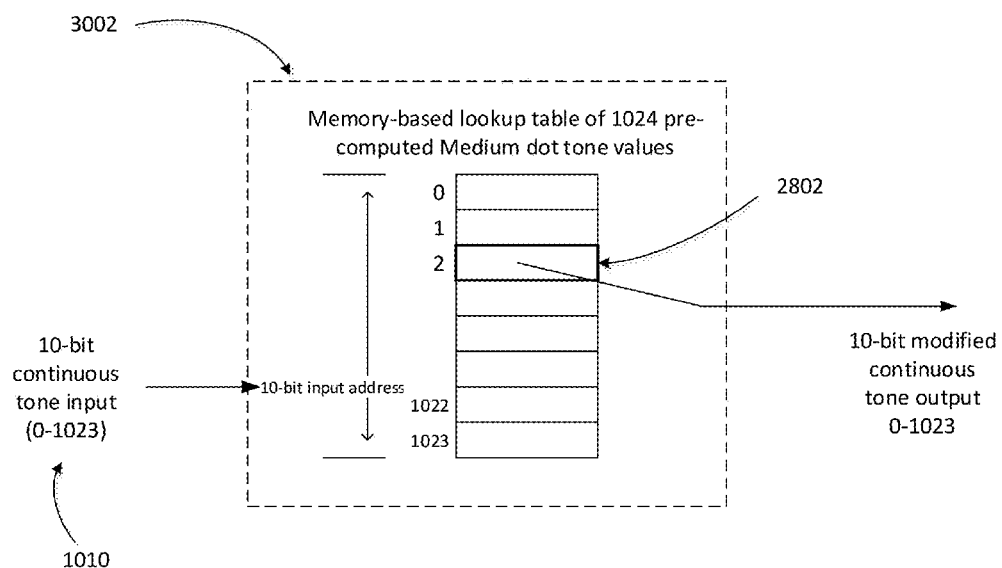
FIG. 30 is a block diagram illustrating an alternate implementation of a tone modification function employing a look-up table in memory, suitable for a hardware or a software implantation, comprising pre-computed tone modification values for a single printable tone level (for example, a small size dot, a medium size dot, or a large size dot).

Referring to FIGS. 29 and 30, two alternative implementations are shown for the 3 tone modification functions 2602, 2604, and 2606 (FIG. 26). For example, continuous tone input 1010 could have, in the range 0-1023, a value of 2. The implementation of FIG. 29 would perform a subtraction followed by a multiplication on the value 2 to produce the modified continuous tone 1116. The implementation of FIG. 30 would use the value 2 as an index into lookup table 3002, retrieving the third value 2802 as the output value in a single operation.

Figure 31:
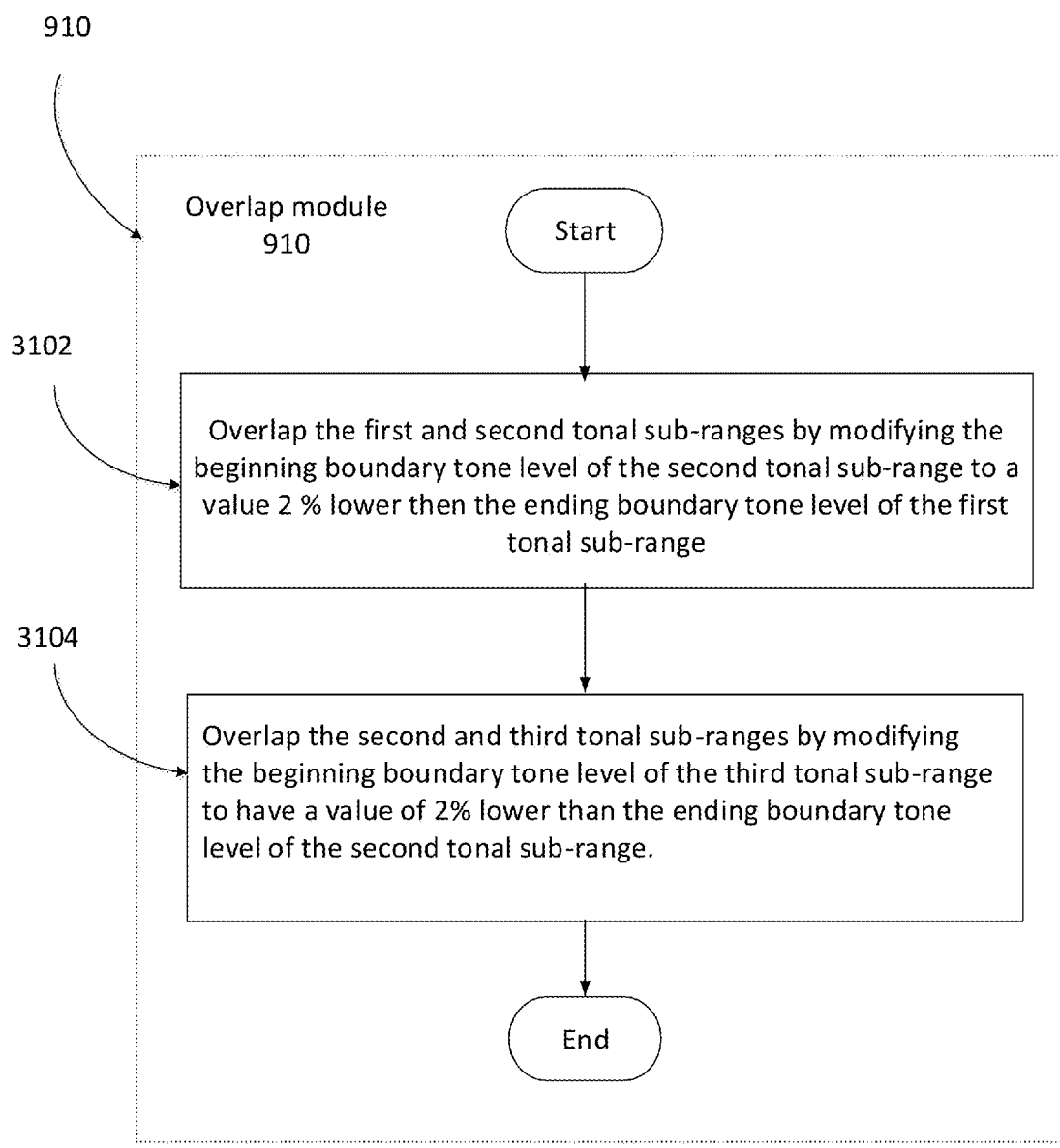
FIG. 31 is a high level flow chart showing the operation of a first embodiment of the overlap module with simple overlap.
Figure 32:
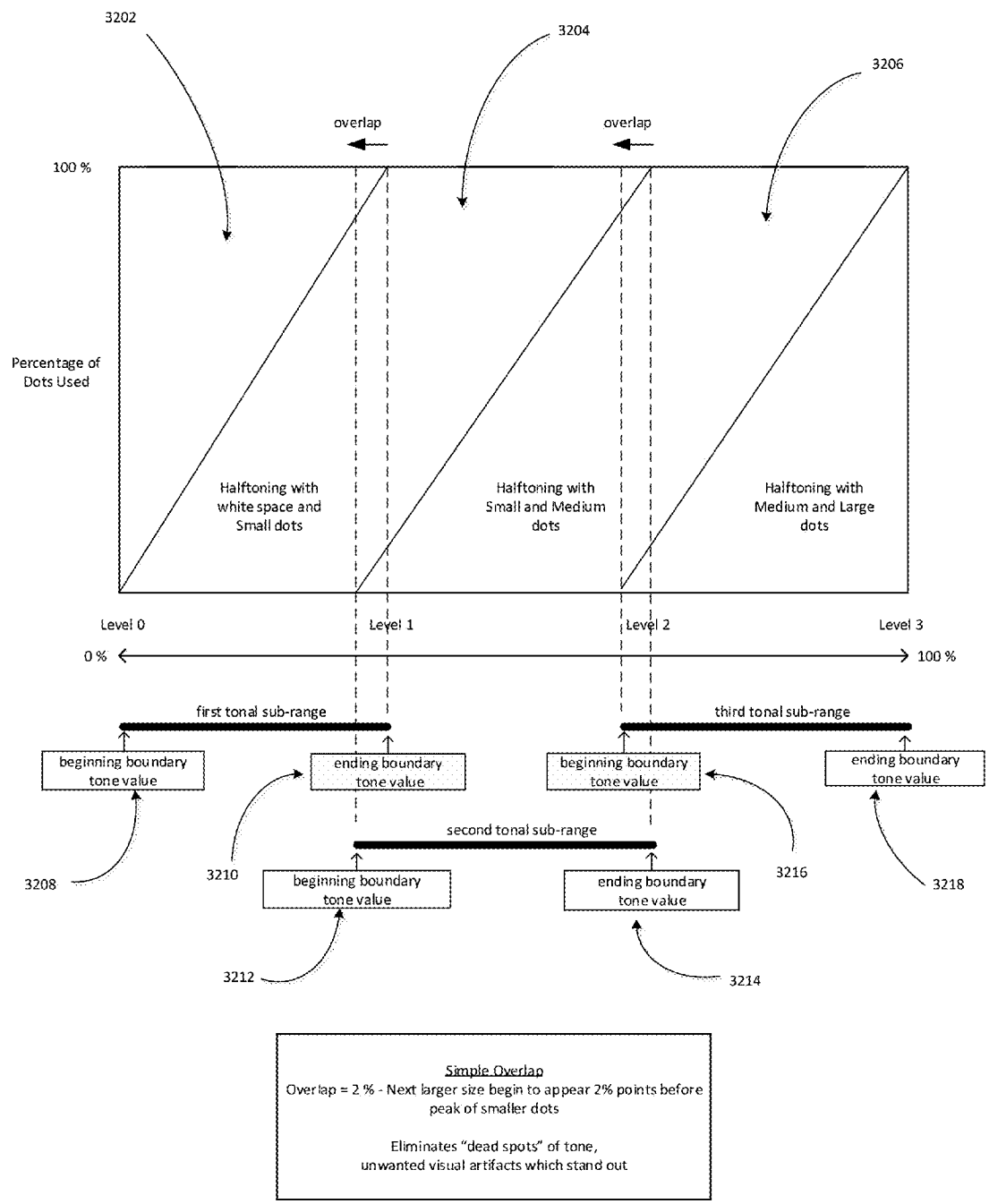
FIG. 32 is a graph showing a full tone range for a first colorant comprising three equally spaced tonal sub-ranges corresponding to a small dot size level, a medium dot size level, and a large dot size level, respectively, with the second tonal sub-range overlapping the first tonal sub-range and the third tonal sub-range overlapping the second tonal sub-range.

Referring to FIGS. 31 and 32, in a first embodiment, overlap module 910 comprises a set of instructions to overlap the first and second tonal sub-ranges 3202 and 3204 by modifying a beginning boundary tone level 3212 of second tonal sub-range 3204 to a value 2% (example) lower then an ending boundary tone level 3210 of first tonal sub-range 3202. Overlap module 910 further comprises a set of instructions to overlap second and third tonal sub-ranges 3204 and 3206 by modifying a beginning boundary tone level 3216 of third tonal sub-range 3206 to have a value of 2% lower than an ending boundary tone level 3214 of second tonal sub-range 3204.

Figure 33:
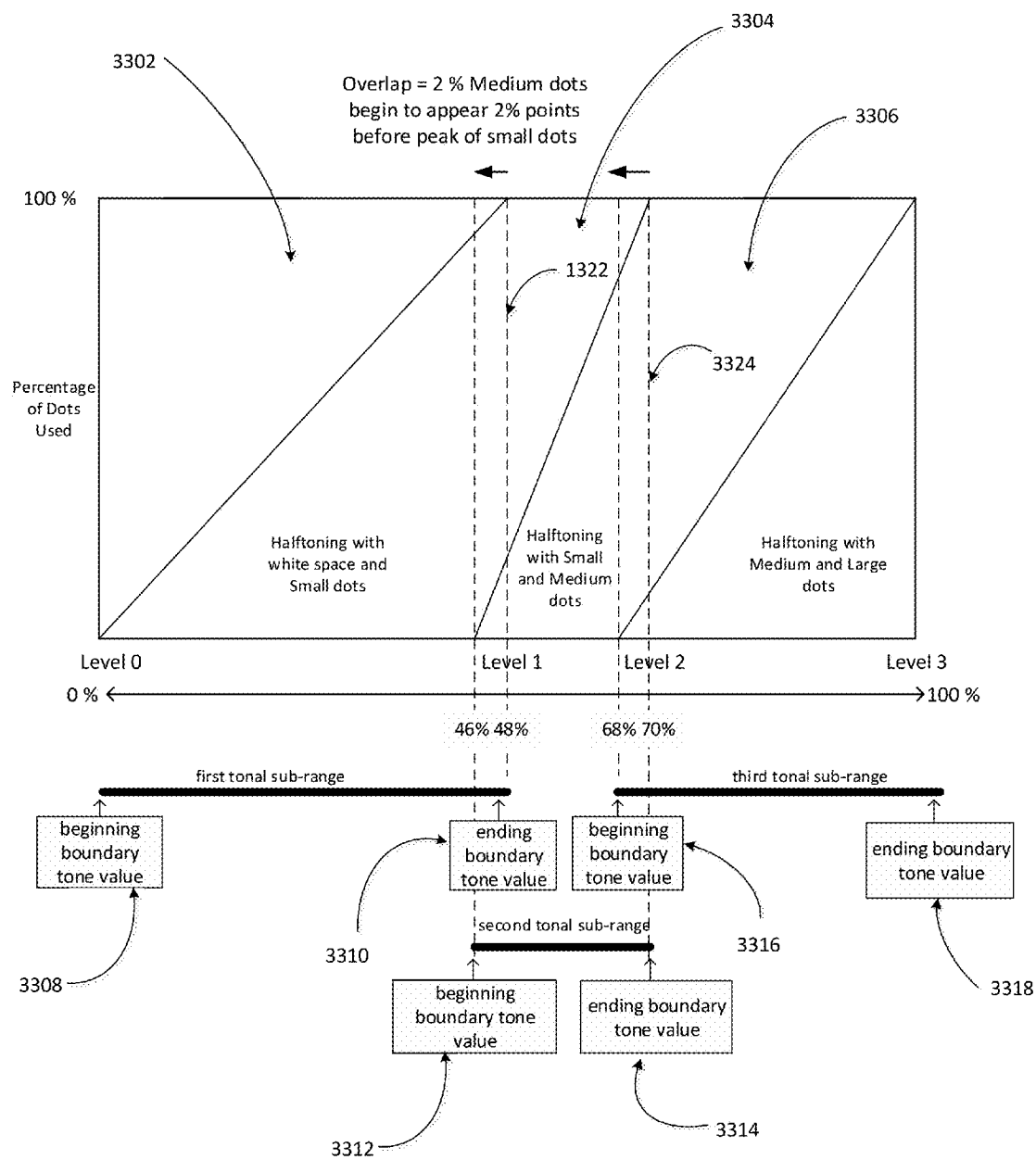
FIG. 33 illustrates a full tone range for a first colorant comprising three tonal sub-ranges corresponding to a first printable tone level (for example, a small size dot), a second printable tone level (for example, a medium size dot), and a third printable tone level (for example, a large size dot), respectively, with shifting and simple overlapping of the tonal sub-ranges.

Referring to FIG. 33, where both shifting and overlapping of a continuous tonal boundary is illustrated. Shown are first, second, and third tonal sub-ranges 3302, 3304, and 3306. First tonal sub-range 3302 has a beginning boundary tone value 3308 and an ending boundary tone value 3310. Second tonal sub-range 3304 has a beginning boundary tone value 3312 and an ending boundary tone value 3314. Third tonal sub-range 3306 has a beginning boundary tone value 3316 and an ending boundary tone value 3318. First and second transition tone values 3322 and 3324 are set at 48% and 70%, respectively. The beginning boundary tone value 3312 of second tonal sub-range 3304 has been moved a value of 2% lower than the ending boundary tone value 3310 of first tonal sub-range 3302 resulting in an overlap of first and second tonal sub-ranges 3302 and 3304. Similarly, the beginning boundary tone value 3316 of third tonal sub-range 3306 has been moved a value of 2% lower than the ending boundary tone value 3314 of second tonal sub-range 3304 resulting in an overlap of second and third tonal sub-ranges 3304 and 3306.

Figure 34A:
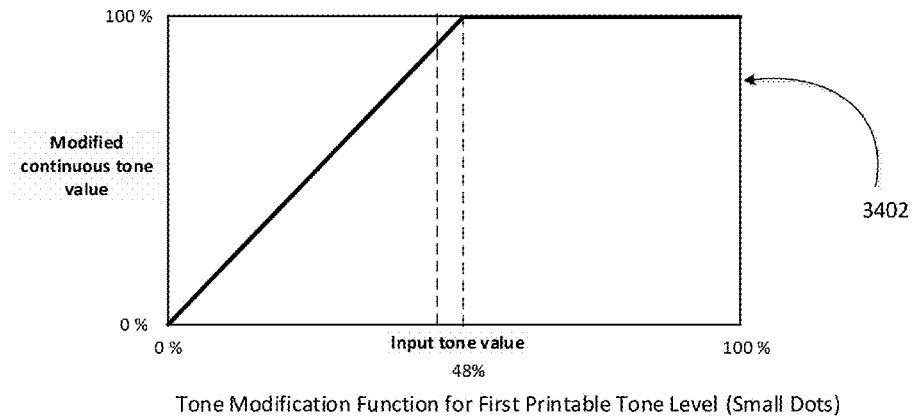
FIG. 34A is a graph of a tone modification function for the first printable tone level (for example, a small size dot) of a first colorant (for example, Cyan) with shifting and simple overlapping.
Figure 34B:
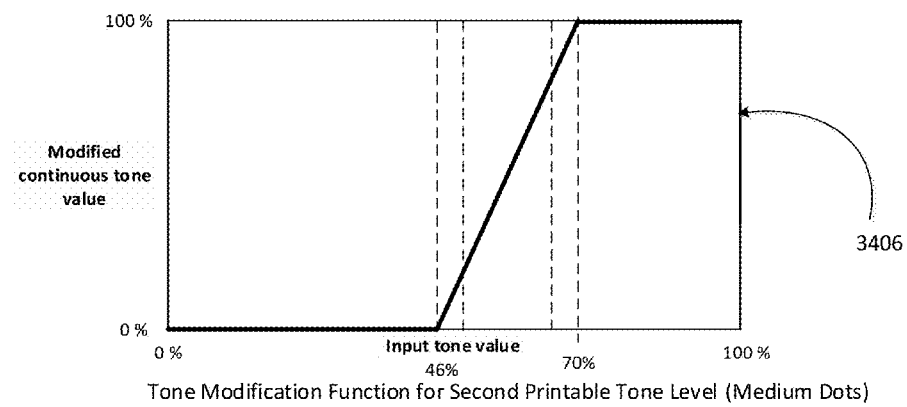
FIG. 34B is a graph of a tone modification function for the second printable tone level (for example, a medium size dot) of a first colorant (for example, Cyan) with shifting and simple overlapping.
Figure 34C:
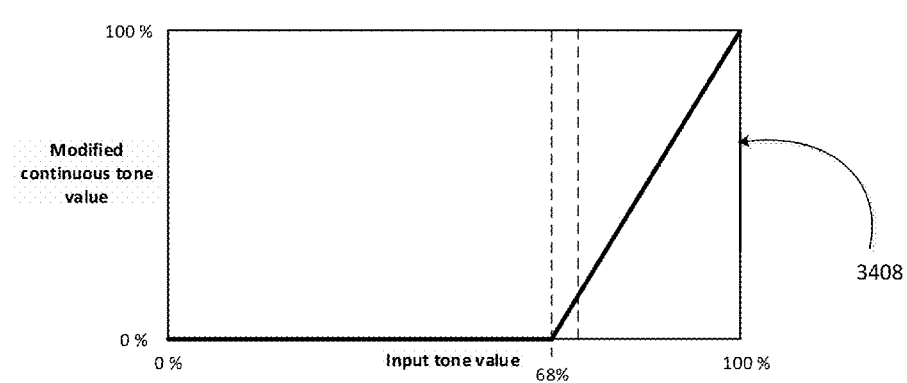
FIG. 34C is a graph of a tone modification function for the third printable tone level (for example, a large size dot) of a first colorant (for example, Cyan) with shifting and simple overlapping.

Referring to FIG. 34A-34C, where graphs illustrate tone modification functions for small size dots (FIG. 34A), medium size dots (FIG. 34B), and large size dots (FIG. 34C). The tone modifications for shifting with overlapping are determined in the same manner as the tone modifications for shifting without overlapping (FIGS. 16 and 17).

Figure 35:
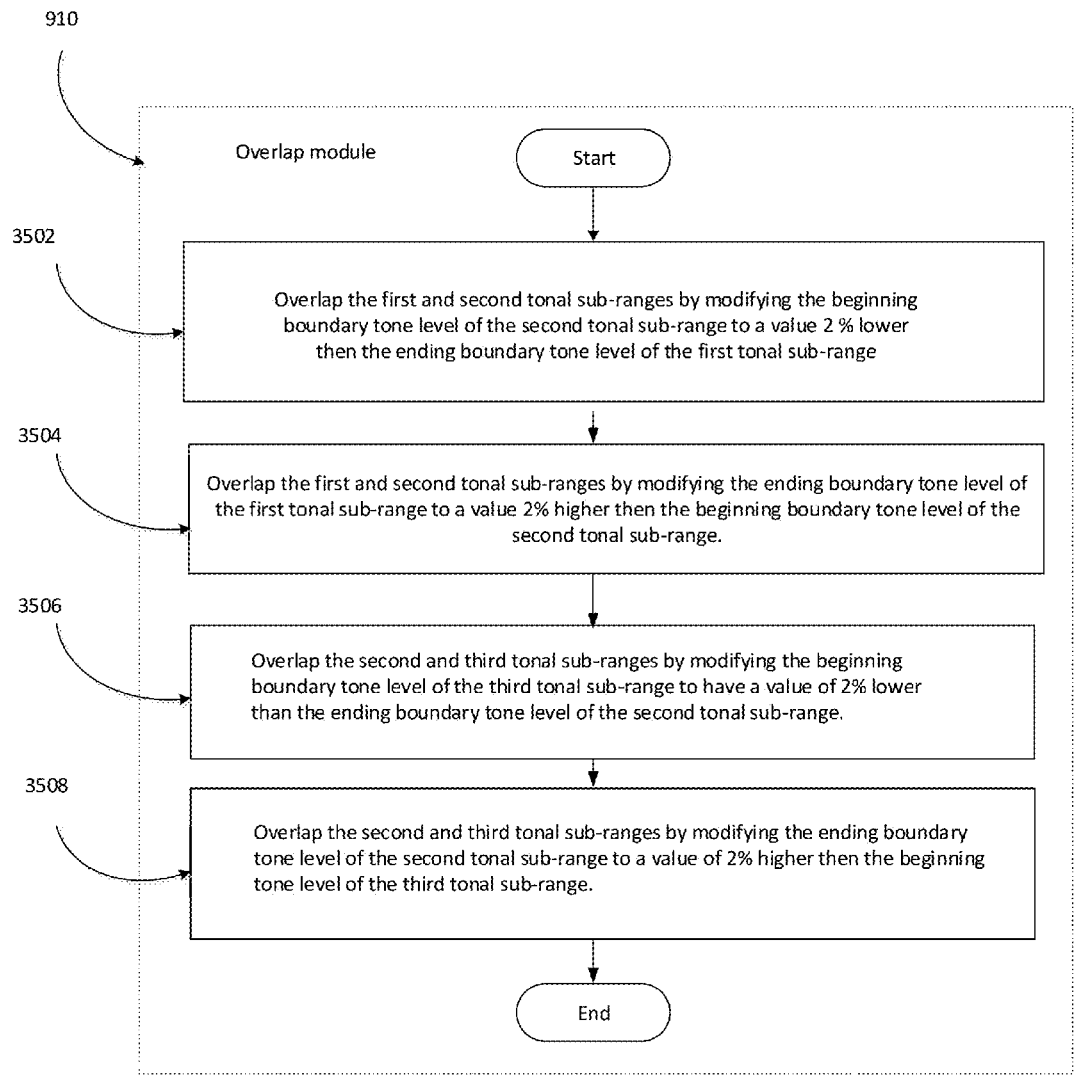
FIG. 35 is a high level flow chart showing the process of a second embodiment of the overlap module with shifting and bi-directional overlapping.
Figure 36:
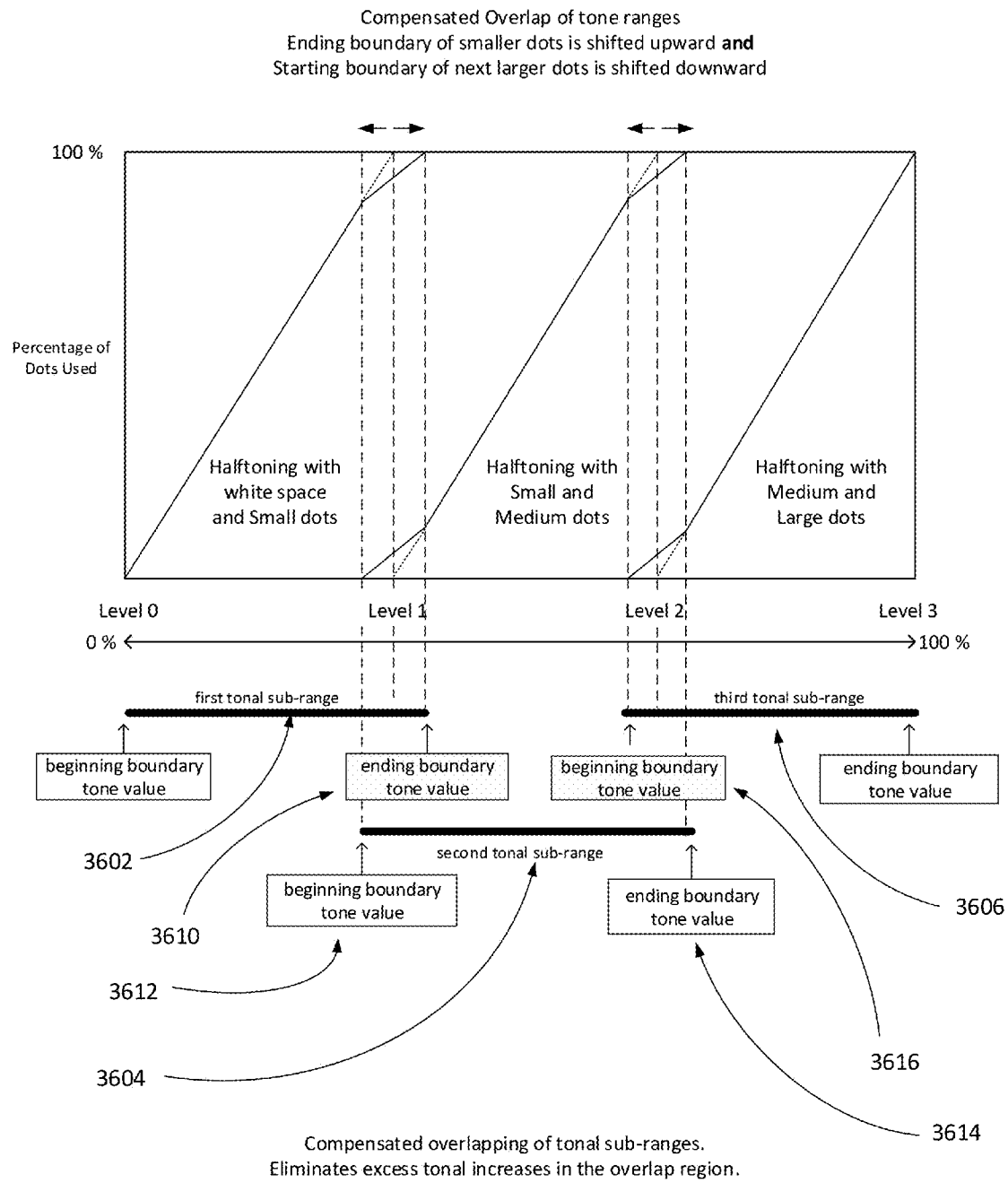
FIG. 36 is a graph showing a full tone range for a first colorant (for example, Cyan) comprising three equally spaced tonal sub-ranges corresponding to a first printable tone level (for example, a small dot size), a second printable tone level (for example, a medium dot size), and third printable tone level (for example, a large dot size), respectively, with the second tonal sub-range bi-directionally overlapping the first tonal sub-range and the third tonal sub-range bi-directionally overlapping the second tonal sub-range.

Referring to FIGS. 35 and 36, where a second embodiment of overlap module 910 is shown with bi-directional overlapping. Overlap module 910 comprises a first set of instructions 3502 to overlap the first and second tonal sub-ranges 3602 and 3604 by modifying beginning boundary tone level 3612 of second tonal sub-range 3604 to a value 2% lower then ending boundary tone level 3610 of first tonal sub-range 3602. Overlap module 910 comprises a second set of instructions 3504 to overlap first and second tonal sub-ranges 3602 and 3604 by modifying ending boundary tone level 3610 of first tonal sub-range 3602 to a value 2% higher then beginning boundary tone level 3612 of second tonal sub-range 3604. Overlap module 910 comprises a third set of instructions 3506 to overlap second and third tonal sub-ranges 3604 and 3606 by modifying beginning boundary tone level 3616 of third tonal sub-range 3606 to have a value of 2% lower than ending boundary tone level 3614 of second tonal sub-range 3604. Overlap module 910 comprises a fourth set of instructions 3508 to overlap second and third tonal sub-ranges 3604 and 3606 by modifying ending boundary tone level 3614 of second tonal sub-range 3604 to a value of 2% higher then beginning boundary tone level 3616 of third tonal sub-range 3606.

Referring to FIGS. 37A-37C, where graphs illustrate tone modification functions for small size dots (FIG. 37A), medium size dots (FIG. 37B), and large size dots (FIG. 37C), tone modification function 3702 is comprised of 3 segments labeled A through C. The value for the modified continuous tone value for this function is 100 if the input tone value falls within segment C. If the input tone value falls within segments A or B, the value for the modified continuous tone value is a standard linear interpolation between the common intersection point 3708 of line segments A and B, and the values 0% and 100%, respectively, as is generally known to one skilled in the art.

Referring to FIG. 38, where example calculations are shown for the screening parameters used for the tone modification functions, the screening parameter SmallDotPeak is calculated to have the 10-bit integer value 685. The Calculation column shows how the values are calculated. For example, in the case of the SmallDotPeak parameter, the Murray Davies equation is used with density 0.475 and the nominal Dmax value of 2.50 to produce an equivalent dot area value of 67% that is scaled to a 10-bit integer value by dividing by 100 and multiplying by 1023 to give result 685.

Referring to FIGS. 39-59, where a visual demonstration of screening calibration and compensation for a four gray-level digital printing machine is illustrated. The native PDF drawings filed with this application are electronically available at the USPTO web site (www.uspto.gov) via PAIR in the SCORE database using the Supplemental Content tab. These native drawings can be zoomed in and out as described herein. The first step in press control is to calibrate the print processes. For traditional lithographic printing, this mainly involved measuring the density of a dark film, as films are used for all inks. In the present invention, this includes measuring the print densities of each of the process color inks. For multiple gray level digital presses, and specifically for this calibration, this now includes measuring the density of solid patches of each of the dot sizes or printable tone levels of the digital printing machine. Though the scale and power of current desktop imaging programs is less than employed in current digital front ends for digital presses, current desktop imaging programs have excellent visual fidelity that can be used to well illustrate the processes of the invention.

Figure 39:
FIG. 39 is a rendered unscreened image of a test picture in CMYK.

Referring to FIG. 39, the Musicians image is used as a rendered unscreened test image or file because it has excellent detail as well as skin tones, which are traditionally hard, yet critical for quality printing. The file is small compared to rendered data for a modern digital press. It is about 6×6 inches with a resolution of 350 dpi. By comparison, a digital press today may print 30 inches by 40 inches with a resolution of 1200 dpi. The rendered data for digital press thus has over 390 times the number of pixels in the Musicians image. The processing is the same, however, and the data processed images are easier to see with the far smaller Musicians file as rendered data. Also, to make the processes more visible, this calibration demonstration will employ FM screening at ⅙th the resolution of what it would be for the digital press, 200 lpi versus 1200 lpi. Error diffusion will be used. There is one final and major difference between this demonstration on a small image file and a production system on a digital press as outlined in the invention. For speed and efficiency, each of the invention embodiments processes a complete pixel by pixel in one pass. For this demonstration, however, at each step of the process data has been collected and made into a visible image suitable for placing into drawings for illustration. In the following images, examining the four process color ramps about the border of the test image is an excellent way to navigate the process and see what is actually going on after individual processing steps of the invention.

Figure 40:
FIG. 40 is an image of the Cyan separation of the test picture of FIG. 39.

Referring to FIG. 40, shown is the rendered unscreened image data for the separation of Cyan. The ramp for Cyan is shown having extremely smooth and continuous tone of Cyan from 0 to 100 percent, easily verified by zooming in.

Figure 41:
FIG. 41 is an image of the Magenta separation of the test picture of FIG. 39.

Referring to FIG. 41, shown is the rendered unscreened image data for the separation of Magenta. The ramp for Magenta is shown having a smooth and continuous tone of Magenta from 0 to 100 percent.

Figure 42:
FIG. 42 is an image of the Yellow separation of the test picture of FIG. 39.

Referring to FIG. 42, shown is the rendered unscreened image data for the separation of Yellow. The ramp for Yellow is shown having a smooth and continuous tone of Yellow from 0 to 100 percent.

Figure 43:
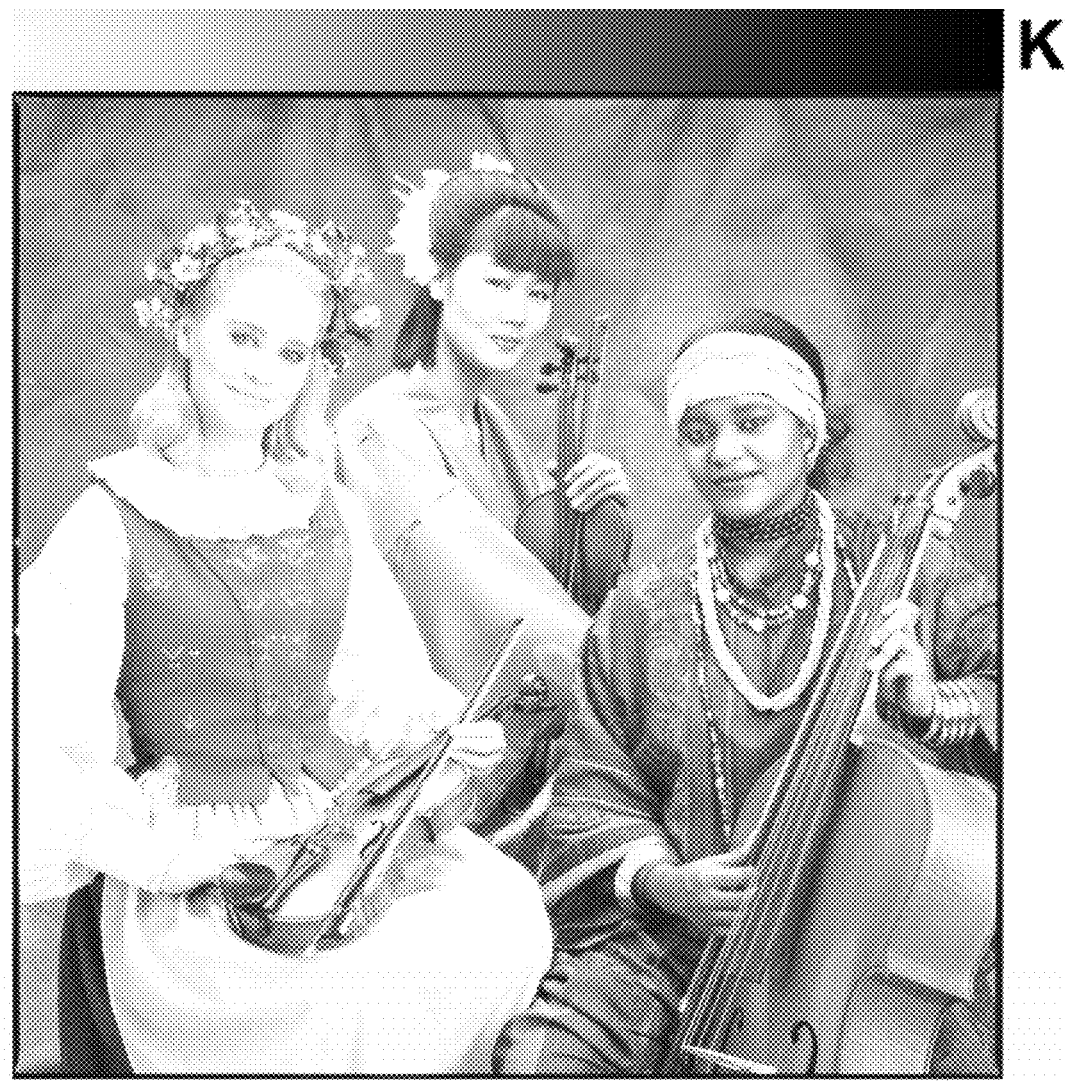
FIG. 43 is an image of the Black separation of the test picture of FIG. 39.

Referring to FIG. 43, shown is the rendered unscreened image data for the separation of Black. The ramp for Black is shown having a smooth and continuous tone of Black from 0 to 100 percent.

Figure 44:
FIG. 44 is an image of the test picture for the separation Cyan (FIG. 40) after processing by the small level tone modification function.
Figure 45:
FIG. 45 is an image of the test picture for the separation Cyan (FIG. 40) after processing by the medium level tone modification function.
Figure 46:
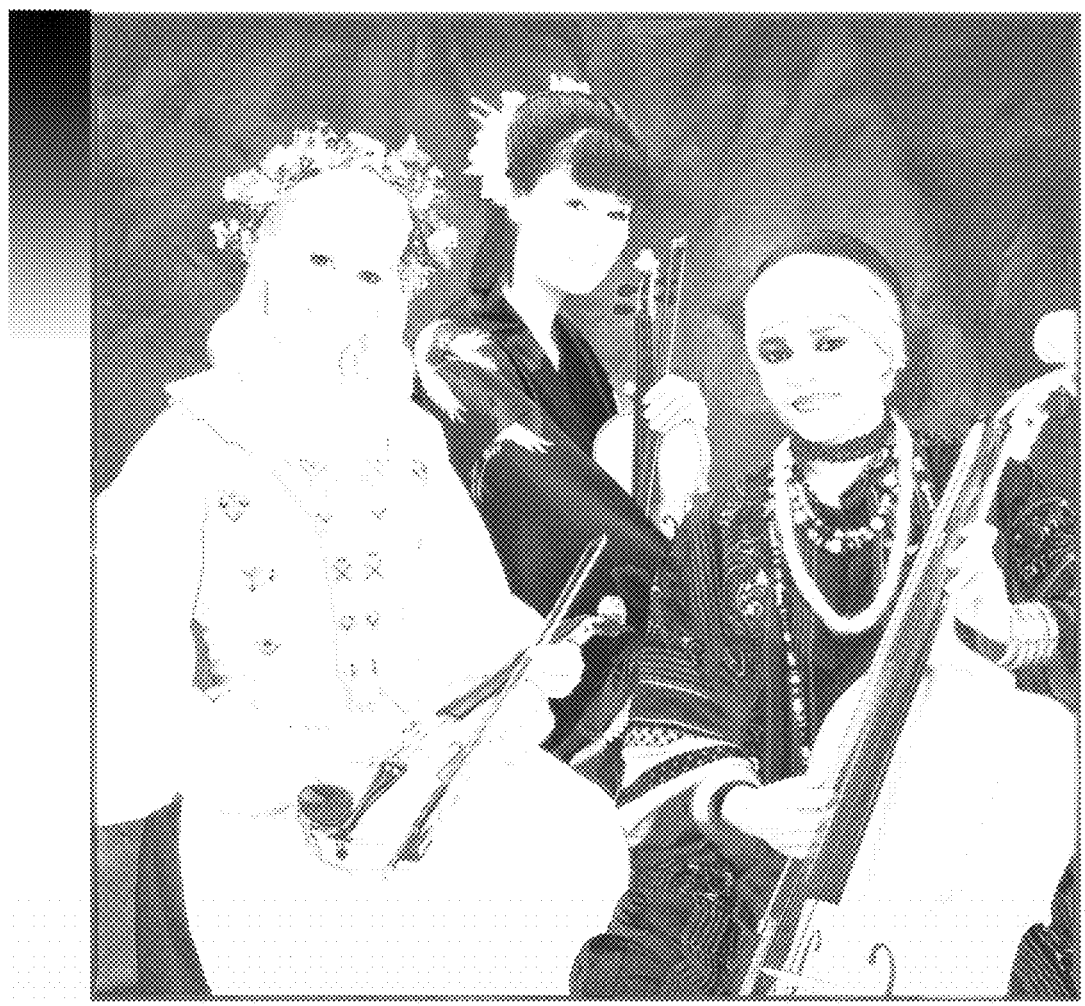
FIG. 46 is an image of the test picture for the separation Cyan (FIG. 40) after processing by the large level tone modification function.

Referring to FIGS. 44-49, the following steps of processing the test image will be shown for the Cyan separation only. The other process colors are processed similarly. In actual practice, there will be different measurements and tone modification functions for each of the separations. FIGS. 44-46 show images of the same rendered data after being processed by the three (3) tone modification functions. The gray levels used for the digital press are not the equidistant ones that a linear tone quantization would employ. Here, for all separations, the small, medium, and large dots, indicative of the 3 non-zero gray levels have been given equivalent dot areas of 45%, 75%, and 100%. This should be clear upon examination of the visible tone ramps. For example, in FIG. 45 the part of the ramp lower than 45% is white (0%) and the part of the ramp above 75% is black (100%).

Figure 47:
FIG. 47 is an image of the test picture for the tone modified Cyan separation (FIG. 44) after processing by a 1-bit half-toning algorithm.
Figure 48:
FIG. 48 is an image of the test picture for the tone modified Cyan separation (FIG. 45) after processing by a 1-bit half-toning algorithm.
Figure 49:
FIG. 49 is an image of the test picture for the tone modified Cyan separation (FIG. 46) after processing by a 1-bit half-toning algorithm.

Referring to FIGS. 47-49, where are images are shown after the data has passed through the half-toning algorithms. Zooming in on the ramps at points 45% and 75% of the way from light to dark is illustrative. Half-toning takes place only within each sub-range. Again, only the separation of Cyan is shown.

Figure 50:
FIG. 50 is an image for the separation Cyan after combining the half-toned images of the separation Cyan of the small dots (FIG. 47), medium dots (FIG. 48), and large dots (FIG. 49).
Figure 51:
FIG. 51 is an image for the separation Magenta after combining the half-toned images of the separation Magenta of the small dots, medium dots, and large dots.
Figure 52:
FIG. 52 is an image for the separation Yellow after combining the half-toned images of the separation Yellow of the small dots, medium dots, and large dots.
Figure 53:
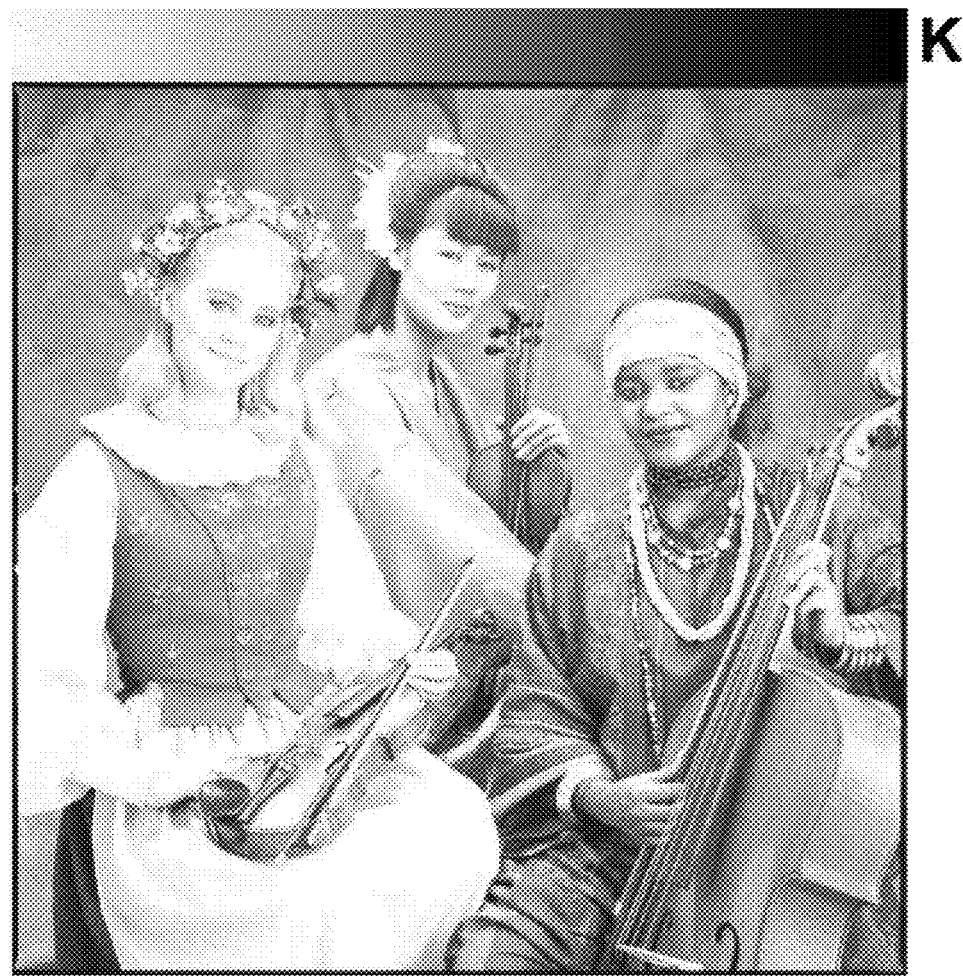
FIG. 53 is an image for the separation Black after combining the half-toned images of the separation Black of the small dots, medium dots, and large dots.

Referring to FIG. 50, where an image of the separation for Cyan is shown after being processed by the multi-layer combination logic. The four 2-bit output levels are represented by the four contone levels 0%, 45%, 75%, and 100% both for view ability as well as correspondence to the printed image. Zooming in on both transition points, 45% and 75%, on the Cyan ramp at a zoom of 200% or 300% readily shows both the transitioning at these points, as well as the overlapping. The other separations, after similar processing, are shown in FIG. 51 (Magenta), FIG. 52 (Yellow), and FIG. 53 (Black).

Figure 54:
FIG. 54 is a single CMYK composite image composed of the four combined output images of FIGS. 50-53.

Referring to FIG. 54, the four output images (FIGS. 50-53) are now combined into a single CMYK composite color image. This image still contains only 4 gray levels (3 dot sizes) per separation. Because of the high resolution of this image, at low zoom levels, display programs operating on this document may average it down to lower resolution, making it appear to be continuous tone. Though this removes all the screening that is to be shown, it has the advantage of showing the inherent visual fidelity of the image, as the zoomed out image looks virtually indistinguishable from the original CMYK continuous tone image.

Figure 55:
FIG. 55 is an extremely high level zoom of a small portion of the single CMYK composite image of FIG. 54 based upon calibrated tonal range output levels of 0%, 45%, 75%, and 100%.
Figure 56:
FIG. 56 shows the black separation of the CMYK image of FIG. 55.

Referring to FIGS. 55 and 56, zooming in on a small portion of CMYK image (FIG. 55) and the separation for black (FIG. 56) of that zoom shows the calibration and screening details. These images are an extremely high level zoom on a very small portion of FIG. 54 chosen for the very dynamic tonal changes and detail in this region. At this level of zoom, on a single separation, the advantages of the invention are easily seen. The placement of the transition points at the tone equivalency points lets the whole image appear continuous-tone-like, even though the image has only 4 tones. Close examination, or viewing the histogram, confirms this 4 gray-level nature. The image also shows the ability of a multi-level digital press to hold detail. The shading on the wrist employs all three dot-sizes and shows the extremely smooth hand-offs between changes of dot size and changes of dot frequency to produce visual tone change.

Figure 57:
FIG. 57 is an extremely high level zoom of a small portion of a single CMYK composite image after calibration and compensation after a drastic change of the printing levels (for whatever reason) to 0%, 25%, 50%, and 100%.
Figure 58:
FIG. 58 shows the black separation of the CMYK image of FIG. 57.

Referring to FIGS. 57 and 58, recall that the tonal range output levels for the rendered unscreened test image of FIG. 39 was set at 0%, 45%, 75%, and 100% resulting in the high quality screened images of FIGS. 54, 55, and 56. To demonstrate the flexibility and efficacy of the invention, FIGS. 57 and 58 show the same color and black separation zoom-ins as FIGS. 55 and 56, only this time after a re-calibration and compensation for a drastic change of the printing levels (for whatever reason) to 0%, 25%, 50%, and 100%. The small dots are now much lighter and the medium dots are now much darker. Nevertheless, the images of FIGS. 57 and 58 are virtually indistinguishable from the images of FIGS. 55 and 56, respectively. After careful analysis, especially at even higher zoom levels, one sees for example that the middle of the wrist in FIG. 56 is composed of mostly white with some small dots, whereas that same portion of the wrist in FIG. 58 is composed of mostly small dots with some medium dots. Back away, however, and the images rightly become indistinguishable.

The calibration, screening, and compensation, shown here for a 4 gray-level device, offers digital printing a calibrated and compensated screening system with low noise, high accuracy, precise imaging, dynamic re-calibration, and most-importantly, extremely high visual fidelity, making the most use of the inherent capabilities of the new generation of printing machines.

Figure 60A:
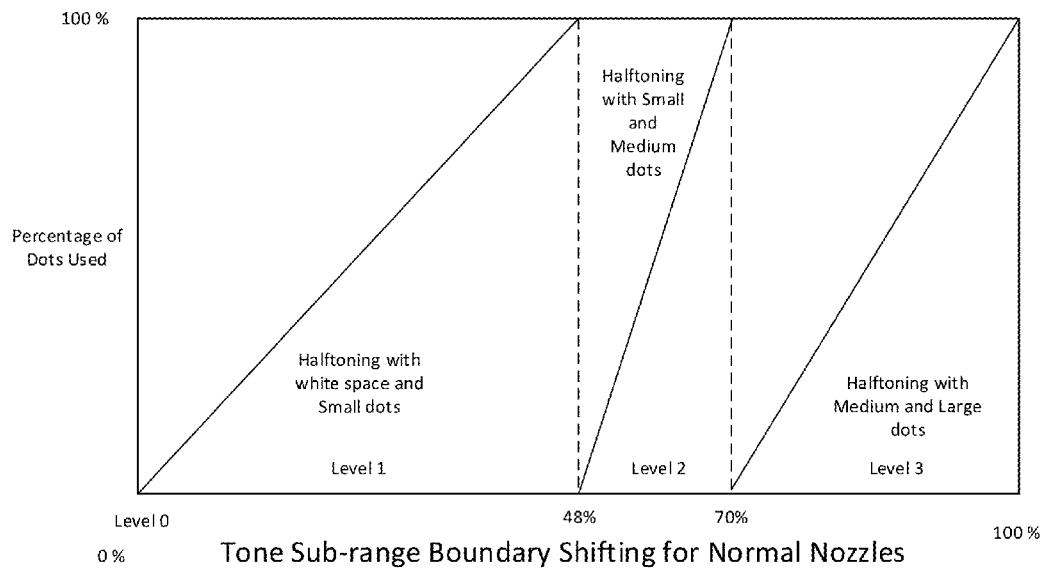
FIG. 60A illustrates a full tone range for a first colorant from a normal nozzle comprising three tonal sub-ranges corresponding to a first printable tone level (for example, a small size dot), a second printable tone level (for example, a medium size dot), and a third printable tone level (for example, a large size dot), respectively.
Figure 60B:
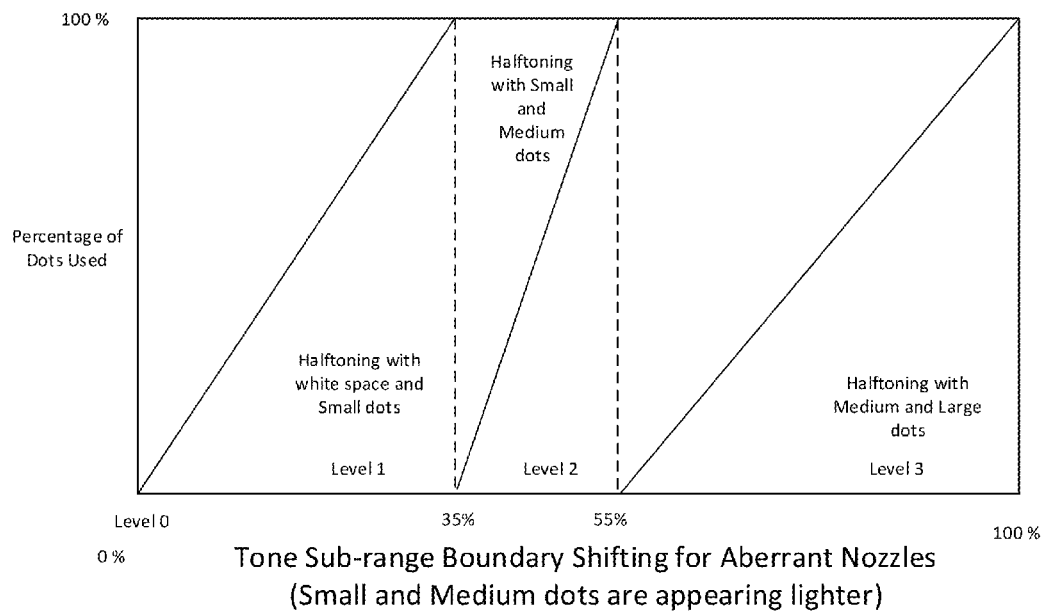
FIG. 60B illustrates a full tone range for a first colorant from an aberrant normal nozzle comprising three tonal sub-ranges corresponding to a first printable tone level (for example, a small size dot), a second printable tone level (for example, a medium size dot), and a third printable tone level (for example, a large size dot), respectively.

Referring to FIGS. 59A, 59B, 60A, and 60B, a further extension of the invention involves the ability to compensate for one or more aberrant print nozzles. The print in the pixel positions of one or more aberrant nozzles appears either lighter or darker than normal nozzles. As the invention shifts tone ranges based on measurements of solid fields of each drop size, all that is needed are additional measurements of solid fields of each drop size for each aberrant nozzle or groups of nozzles. FIG. 59A shows a digital press profile comprising measured density measurements of each colorant printed from a normal nozzle or group of nozzles. FIG. 59B shows a digital press profile comprising measured density measurements of each colorant printed from an aberrant nozzle or group of aberrant nozzles. In the case of aberrant nozzles, both the small and the medium size dots appear lighter than those from normal nozzles. FIG. 60A shows the tone sub-ranges for normal nozzles, for a single colorant (black), based on the digital press profile measurements for the normal nozzles (FIG. 59A). FIG. 60B shows the new tone sub-ranges for the aberrant nozzles, for a single colorant (black), based on the digital press profile measurements for the aberrant nozzles (FIG. 59B). Automatic computing and use of the new set of tone sub-ranges, results in a set of multi-level output data for the aberrant nozzles that does not appear lighter even though the printed dots themselves are lighter. Rather the automatic multi-phase compensation and screening assigns more dots and/or dots of the next larger dot size. This also has the visual effect of producing regions of print that appear darker. Similarly, by using a new set of shifted tone sub-ranges, aberrant nozzles which are producing darker dots are compensated as the shifted tone sub-ranges produce fewer dots and/or dots of the next smaller size for the aberrant nozzles.

Though it is more straight forward to implement the switching to additional tone modification functions in the context of a software embodiment of the invention, it is possible to do so with the example hardware embodiments as well. This is facilitated when using the said lookup table implementation of tone modification functions.

Figure 61A:
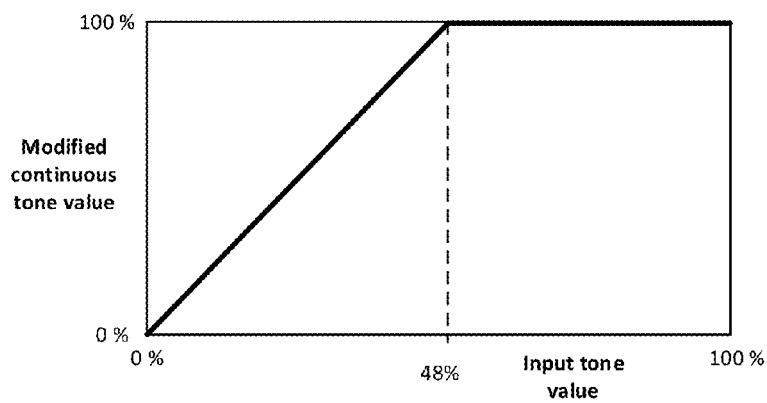
FIG. 61A shows the tone modification function for the first printable tone level for a normal nozzle or group of nozzles.
Figure 61B:
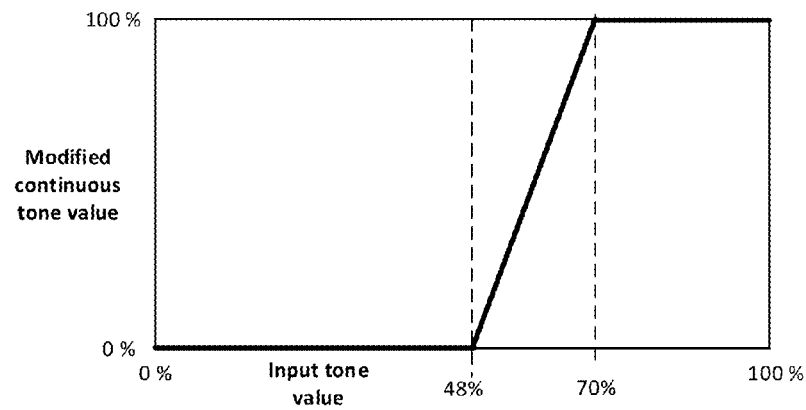
FIG. 61B shows the tone modification function for the second printable tone level for a normal nozzle or group of nozzles.
Figure 61C:
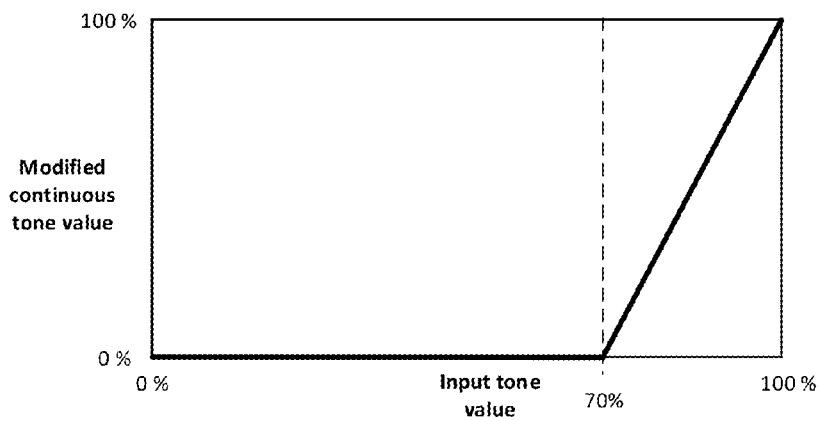
FIG. 61C shows the tone modification function for the third printable tone level for a normal nozzle or group of nozzles.

Referring to FIGS. 61A, 61B, and 61C, the corresponding set of tone modification functions are shown for the first, second, and third printable tone levels for normal nozzles.

Figure 62A:
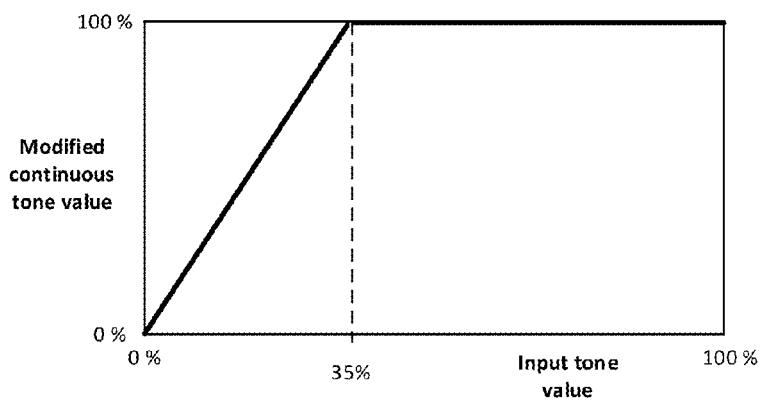
FIG. 62A shows the tone modification functions for the first printable tone level for an aberrant nozzle or group of nozzles.
Figure 62B:
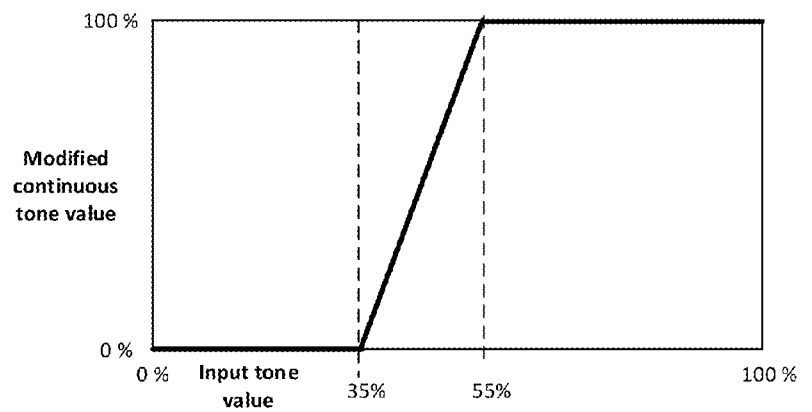
FIG. 62B shows the tone modification function for the second printable tone level for an aberrant nozzle or group of nozzles.
Figure 62C:
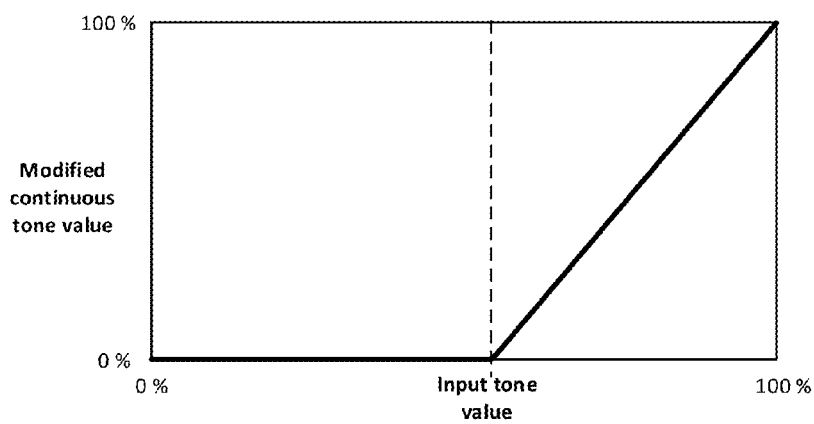
FIG. 62C shows the tone modification function for the third printable tone level for an aberrant nozzle or group of nozzles.

Referring to FIGS. 62A, 62B, and 62C, the corresponding set of tone modification functions are shown for the first, second, and third printable tone levels for an aberrant nozzle or group of nozzles.

Referring to FIG. 63A a test image is shown which includes both photographs and four tone ramps for the four process ink colorants, Cyan, Magenta, Yellow, and Black. This image, a CMYK continuous tone image, actually contains only four gray levels for each of the colorants. It is made from multibit screened data wherein each of the colorant output values is represented by a 2-bit value 0-3. The visual tone values of these levels are assumed to be equally spaced. Thus each colorant contains these 4 monochrome or "gray" levels: 0% (white), 33.3% (a light gray), 67% (a dark gray), and 100% (full black). This simulated print image is made by mapping the four different 2-bit values, 0 through 3, of the screened data to these four 8-bit tone values, 0, 85, 170, and 255. These four 8-bit values are equally spaced, each 85 tone units apart from the next.

Referring to FIG. 63B the same screened data values for the test image has been used to show the effect of aberrant print heads. Specifically, 25 tone units, about 10% of the 8-bit 0-255 range, is subtracted from the value 85 representing the Small tone value (1), and also from the value 170 representing the Medium tone value (2). Thus 8-bit tone levels 60 and 145 are used to represent the Small and Medium dots in the aberrant region. The 150 nozzle locations from left to right where the nozzles are aberrant are staggered for the four colorants. Thus one can see in the tone ramps that the very same screened 2-bit data now appears lighter in staggered approximately 1/10 inch vertical bands, as visible in both the photographs and the tone ramps.

Referring to FIG. 64A, the image represents the simulated print of the case where pristine nozzles are again used, and the compensation method of the invention is in place. This has an effect on the number and placement of the Small, Medium, and Large output dots. The 8-bit tone values representing Small and Medium, 85 and 170, have been restored to the original equally spaced normal levels. To be noted are the bands which appear to be darker within the photos and tone ramps. It is key to comprehending the compensation method of the invention to understand that each and every pixel in this image uses only one of the four equally spaced 8-bit tone levels, 0, 85, 17, and 255. The darkening appears because the screening has changed. More Medium dots are used where before Small dots were used. Similarly more Large dots are used where before Medium dots were used. This will become clearer with subsequent further zoomed images of a single colorant.

Referring to FIG. 64B, the image represents the simulated print of the case where both the lightening, due to aberrant nozzles, is in effect as well as the darkening, due to the compensated screening changes is in effect. The simulated print image of 64B thus now appears to be free from artifact, the intended and very desirable result. The subsequent images will visibly reveal how this takes place.

Referring to FIGS. 65A and 65B, a zoom in of a region which would contain a single, would-be aberrant Magenta band is shown. There is no lightening of the individual pixels as well as no change of screening in the band as this is for the normal nozzle case with no screening compensation.

Referring to FIGS. 66A and 66B, this same region is now shown for the case when the normal screened data is represented by the aberrant tone values. FIG. 66A shows the lightened color shift and FIG. 66B with close examination reveals the use of screened Small and Medium dots each of which becomes lighter in the aberrant region.

Referring to FIGS. 67A and 67B, this same region is now shown for the case when the screened data has changed in the aberrant region represented use of the compensation method of the invention, shifted tone sub-ranges based on newly measured dot densities. FIG. 67A shows the darkening color shift due to this new screening. FIG. 67B with close examination reveals the use of more frequent Medium and Large dots to produce this darkening. Only the screening pattern has changed; the tones used to represent Small and Medium dots has not. There is individual continuity of individual dot tones across the region boundaries.

Referring to FIGS. 68A and 68B, the aberrant region is shown for the case when both the aberrant nozzles are shown lightened due to use of the lighter 8-bit tone values 60 and 145 and the compensated screening of the invention is in effect causing perceived darkening. FIG. 68A appears very normal, with the aberrant band appearing neither lighter nor darker. FIG. 68B, showing just the Magenta channel appears normal at first glance. Further and extreme zoom-in of FIG. 68B will enable both the lightening and darkening effects to be seen.

Referring to FIG. 69, an extreme zoom of FIG. 68B is shown. It is centered on the left normal to aberrant vertical transition line. When viewed from afar FIG. 69, too, appears to be normal and without artifact. Close examination reveals the lightening effect of Small and Medium dots changing between the left and right halves of the image. Examination also reveals that the screening changed across the transition and that the use of increased numbers of next larger level pixels has a darkening effect. These two effects effectively cancel each other out, thus illustrating the invention's method of compensating for aberrant nozzles through the use of altered screening.

While particular embodiments of the invention have been shown and described, it will be obvious to those skilled in the art that changes and modifications may be made without departing from the scope of the claimed invention.

What is claimed:

1. A method of generating a screened multi-bit data output file for a digital printing machine having first and second nozzles that each can print on a page a first printable tone level, a second printable tone level, and a third printable tone level, from an unscreened raster data file specifying a continuous tone value for a first colorant for each printable position of the page, the method comprising the steps of:
   (a) creating a first printer profile comprising density measurements for the first colorant from the first nozzle;
   (b) creating a first set of tonal sub-ranges based upon said first printer profile of the first nozzle; said first set of tonal sub-ranges comprising first and second tonal sub-ranges corresponding to the first and second printable tone levels, respectively, for the first colorant;
   (c) creating a second printer profile comprising density measurements for the first colorant from the second nozzle that are different that the density measurements of the first printer profile; and
   (d) creating a second set of tonal sub-ranges based upon said second printer profile of the second nozzle; said second set of tonal sub-ranges comprising first and second tonal sub-ranges corresponding to the first and second printable tone levels, respectively, for the first colorant.

2. The method of claim 1, wherein step (b) further comprises the step of creating beginning and ending boundary tone values for each of the first and second tonal sub-ranges defining first and second tone range spans and a first transition tone value to be both said ending boundary tone value of said first tonal sub-range and said beginning boundary tone value of said second tonal sub-range.

3. The method of claim 2, wherein step (d) further comprises the step of creating beginning and ending boundary tone values for each of the first and second tonal sub-ranges defining first and second tone range spans and a first transition tone value to be both said ending boundary tone value of said first tonal sub-range and said beginning boundary tone value of said second tonal sub-range.

4. The method of claim 3, further comprising a step (e) of shifting the position of said first transition tone value of said second set of tonal sub-ranges so that said first tone range span of said second set of tonal sub-ranges is different from said first tone range span of said first set of tonal sub-ranges.

5. The method of claim 4, further comprising a step (f) of producing a modified output tone value for said first and second sub-ranges of said second set of tonal sub-ranges by first and second tone modification functions, respectively.

6. The method of claim 5, further comprising a step (g) of producing a single multi-bit output value corresponding to the first colorant for each printable position on the page by using said modified output tone value of said first and second tone modification functions as inputs to at least one half-toning algorithm.

7. A method of generating a screened multi-bit data file for a digital printing machine that can print on a page a first printable level, a second printable level, and a third printable level, from an unscreened raster data file specifying a continuous tone value for a first colorant for each printable position of the page, the method comprising the steps of:
   providing a first tonal sub-range corresponding substantially to increasing percentages of the first printable level for the first colorant; each of said first tonal sub-range comprises a beginning boundary value and an ending boundary value
   providing a second tonal sub-range corresponding substantially to increasing percentages of the second printable tone level for the first colorant; said second tonal sub-range comprises a beginning boundary value and an ending boundary value
   providing a third tonal sub-range corresponding substantially to increasing percentages of the third printable tone level for the first colorant; said third tonal sub-range comprises a beginning boundary value and an ending boundary value; and
   setting the size of the first tonal sub-range based on the density of the first printable level printed by the digital printing machine.

8. The method of claim 7, further comprising the step of setting the size of the second tonal sub-range based on the density of the second printable level printed by the digital printing machine.

9. The method of claim 8, further comprising the step of processing the continuous tone value for the first colorant for each printable position of the page using the first, second and third tonal sub-ranges to produce a modified continuous tone value for the first colorant for each printable position on the page.

10. The method of claim 9, further comprising the step of processing the modified continuous tone value through at least one bi-level half-toning algorithm to produce a multi-bit value for each printable position on the page.

11. The method of claim 10, wherein said ending boundary value of said first tonal sub-range is 33%; said ending boundary value of said second sub-range is 67%; and said ending boundary value of said third tonal sub-range is 100%.

12. The method of claim 7, further comprising the step of overlapping said first tonal sub-range and said second tonal sub-range such that the beginning boundary value of the second tonal sub-range is closer to the ending boundary value of the first tonal sub-range than to the beginning boundary value of the first tonal sub-range.

13. The method of claim 12, further comprising the step of overlapping said first tonal sub-range and said second tonal sub-range prior to the step of setting the size of the first tonal sub-range based on the first density.

14. The method of claim 13, further comprising the step of overlapping said second tonal sub-range and said third tonal sub-range such that the beginning boundary value of the third tonal sub-range is closer to the ending boundary value of the second tonal sub-range than to the beginning boundary value of the second tonal sub-range.

15. The method of claim 12, wherein the first, second, and third tonal sub-ranges are of equal size.

16. A raster image processor for generating a screened multi-bit data file for a digital printing machine that can print on a page a first printable level, a second printable level, and a third printable level, from an unscreened raster data file specifying a continuous tone value for a first colorant for each printable position of the page, the raster image processor comprises:
a tone sub-range module comprises a first set of computer instructions to create a first tonal sub-range corresponding substantially to increasing percentages of the first printable level for the first colorant; a second set of instructions to create a second tonal sub-range corresponding substantially to increasing percentages of the second printable tone level for the first colorant; and a third set of instructions to create a third tonal sub-range corresponding substantially to increasing percentages of the third printable tone level for the first colorant; each of said first, second, and third tonal sub-ranges comprise a beginning and ending boundary value; and
a shifting module comprises a first set of computer instructions to set the size of said first tonal sub-range based on the density of the first printable level printed by the digital printing machine.

17. The raster image processor of claim 16, wherein said shifting module further comprises a second set of computer instructions to set the size of said second tonal sub-range based on the density of the second printable level printed by the digital printing machine.

18. The raster image processor of claim 17, further comprises a tone modification sub-module comprising a first set of computer instructions to process the continuous tone value for the first colorant for each printable position of the page using the first, second and third tonal sub-ranges to produce a first modified continuous tone value for the first colorant for each printable position on the page.

19. The raster image processor of claim 18, further comprises an output sub-module comprising a first set of computer instructions to process the modified continuous tone values through at least one bi-level half-toning algorithm to produce a multi-bit value for each printable position on the page.

20. The raster image processor of claim 19, wherein said ending boundary value of said first tonal sub-range is 33%; said ending boundary value of said second sub-range is 67%; and said ending boundary value of said third tonal sub-range is 100%.

21. The raster image processor of claim 16, further comprises an overlap module comprising a first set of instructions to overlap said first tonal sub-range and said second tonal sub-range such that the beginning boundary value of said second tonal sub-range is closer to said ending boundary value of said first tonal sub-range than to said beginning boundary value of said first tonal sub-range.

22. The raster image processor of claim 21, wherein said first set of computer instructions of said overlap module overlap said first tonal sub-range and said second tonal sub-range prior to said shifting module setting the size of the first tonal sub-range based on the first density.

23. The raster image processor of claim 22, wherein said overlap module further comprises a second set of instructions to overlap said second tonal sub-range and said third tonal sub-range such that said beginning boundary value of said third tonal sub-range is closer to said ending boundary value of said second tonal sub-range than to said beginning boundary value of said second tonal sub-range.

24. The raster image processor of claim 23, wherein said first, second, and third tonal sub-ranges are of equal size.

* * * * *